US012709520B2

(12) United States Patent
Eells

(10) Patent No.: US 12,709,520 B2
(45) **Date of Patent: *Aug. 18, 2026**

(54) MULTIFUNCTIONAL GRAPPLE-HEEL COMBINATION DEVICE FOR USE WITH A MANIPULATION MACHINE

(71) Applicant: Treklos, LLC, Molalla, OR (US)

(72) Inventor: Brett Wade Eells, Molalla, OR (US)

(73) Assignee: Treklos, LLC, Mollala, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,275

(22) Filed: Jan. 29, 2024

(65) Prior Publication Data

US 2024/0166474 A1 May 23, 2024

Related U.S. Application Data

(63) Continuation of application No. 18/266,602, filed as application No. PCT/IB2021/053174 on Apr. 16, 2021, now Pat. No. 11,884,523.

(60) Provisional application No. 63/124,636, filed on Dec. 11, 2020.

(51) Int. Cl.

| | |
|---|---|
| ***A01G 23/00*** | (2006.01) |
| ***B66C 1/58*** | (2006.01) |
| ***B66C 3/16*** | (2006.01) |
| ***B66C 3/20*** | (2006.01) |
| ***E02F 3/96*** | (2006.01) |
| *B66C 1/42* | (2006.01) |

(52) U.S. Cl.

CPC .............. *B66C 3/16* (2013.01); *A01G 23/003* (2013.01); *B66C 1/585* (2013.01); *B66C 3/20* (2013.01); *E02F 3/962* (2013.01); *B66C 1/427* (2013.01)

(58) Field of Classification Search

CPC .......... A01G 23/00; B66C 1/585; E02F 3/962

See application file for complete search history.

(56) References Cited

U.S. PATENT DOCUMENTS

| | | | | |
|---|---|---|---|---|
| 2,813,409 A | | 11/1957 | Wolcott | |
| 3,102,752 A | | 9/1963 | Jenkins | |
| 3,204,795 A | * | 9/1965 | Larson | B66C 23/54 414/731 |
| 3,231,303 A | | 1/1966 | Le Tourneau | |
| 3,237,795 A | | 3/1966 | Kromer | |

(Continued)

FOREIGN PATENT DOCUMENTS

WO WO2004073383 A2 9/2004

OTHER PUBLICATIONS marketbook.ca; "2023 CCL Mini Ex Rack Log Grapple"; at least as early as 2023; https://www.marketbook.ca/listing/for-sale/224884227/2023-ccl-mini-ex-heel-rack-log-grapple-grapple-log; 1 page.

(Continued)

*Primary Examiner* — Ronald P Jarrett

(74) *Attorney, Agent, or Firm* — Law Office of Karen Dana Oster, LLC

(57) ABSTRACT

A grapple-heel rack having a frame, a grapple, and first and second angle-enabler catches. A grapple attachment (which may be or may include a universal joint) may be used to support the grapple from a nose of the frame. A mechanical grapple return system may be used to return the grapple from a non-neutral position to a neutral position. At least one method for using the grapple-heel rack.

25 Claims, 36 Drawing Sheets

(56) References Cited

U.S. PATENT DOCUMENTS

| | | | | | |
|---|---|---|---|---|---|
| 3,527,495 | A | | 9/1970 | Maradyn | |
| 3,620,394 | A | * | 11/1971 | Symons | B66C 3/20 414/733 |
| 3,631,995 | A | | 1/1972 | Jones | |
| 3,759,564 | A | | 9/1973 | Seaberg | |
| 3,802,731 | A | | 4/1974 | La Bounty | |
| 3,964,622 | A | | 6/1976 | Blair et al. | |
| 4,005,894 | A | | 2/1977 | Tucek | |
| 4,212,577 | A | | 7/1980 | Swanson | |
| 4,397,604 | A | | 8/1983 | McCain | |
| 4,426,110 | A | * | 1/1984 | Mitchell | B66C 3/16 294/198 |
| 4,519,739 | A | | 5/1985 | Risch | |
| 4,804,309 | A | | 2/1989 | Risch | |
| 4,917,567 | A | | 4/1990 | Renfro et al. | |
| 4,963,071 | A | | 10/1990 | Larwin et al. | |
| 5,205,181 | A | * | 4/1993 | Wright | E02F 9/2004 180/323 |
| 5,320,149 | A | * | 6/1994 | Peterson | B27L 7/00 144/195.1 |
| 5,544,435 | A | | 8/1996 | Somero | |
| 5,863,086 | A | | 1/1999 | Christenson | |
| 6,108,951 | A | | 8/2000 | Renfrow et al. | |
| 6,148,254 | A | | 11/2000 | Barden | |
| 6,315,344 | B1 | * | 11/2001 | Mattson | B66C 1/585 414/739 |
| 6,385,870 | B1 | | 5/2002 | Webel et al. | |
| 6,457,761 | B1 | | 10/2002 | Benoit | |
| 6,539,650 | B2 | | 4/2003 | Kaczmarski et al. | |
| 6,964,122 | B2 | | 11/2005 | Cunningham | |
| 7,311,489 | B2 | * | 12/2007 | Ekman | E02F 9/2275 37/468 |
| 7,383,681 | B2 | | 6/2008 | Connolly et al. | |
| 7,533,481 | B2 | | 5/2009 | McCoy | |
| 7,537,428 | B2 | | 5/2009 | Hutchinson | |
| 8,333,526 | B2 | * | 12/2012 | Long | F16D 3/40 403/57 |
| 10,206,501 | B1 | | 2/2019 | Kindred, Jr. | |
| 2002/0150457 | A1 | | 10/2002 | Perron et al. | |
| 2004/0168568 | A1 | | 9/2004 | Roy et al. | |
| 2008/0129066 | A1 | | 6/2008 | Hutchinson et al. | |
| 2009/0007465 | A1 | | 1/2009 | Robl et al. | |
| 2009/0290966 | A1 | | 11/2009 | King | |

OTHER PUBLICATIONS machinerytrader.com; "2023 CCL Mini Ex Heel Rack Log Grapple"; at least as early as 2023; https://www.machinerytrader.com/listing/for-sale/224884227/2023-ccl-mini-ex-heel-rack-log-grapple-grapple-log; 3 pages.

sleequipment.com; "Wallenstein LXG420S Mini-Skidsteer Log Grapple Attachment"; https://sleequipment.com/wallenstein-lxg420s-mini-skidsteer-log-grapple-attachment.html?msclkid-f74d913307ed168b57dbf4910504298f; 3 pages.

Forest Service; "Forest Operations Equipment Catalog: Log Loaders"; Forest Service webpage; at least as early as Oct. 30, 2020; accessed online at: https://www.fs.fed.us/forestmanagement/equipment-catalog-logloaders.shtml; 4 pages.

International Construction Machinery (ICM) Equipment NA Corp.; "Log Grapples"; ICM Equipment NA Corp. product description; at least as early as May 14, 2020; accessed online at: https://icm-equipment-north-america.myshopify.com/collections/log-grapples; 5 pages.

International Preliminary Examining Authority (IPEA); "Corrected International Preliminary Report on Patentability of PCT/IB2021/053174"; Notification mailed Mar. 27, 2023 and Report dated Mar. 23, 2023; IPEA; 84 pages.

International Preliminary Examining Authority (IPEA); "International Preliminary Report on Patentability of PCT/IB2021/053174"; Notification mailed Mar. 22, 2023 and Report dated Mar. 17, 2023; IPEA; 67 pages.

International Searching Authority (ISA); "International Search Report and Written Opinion of PCT/IB2021/053174"; Jul. 7, 2021; ISA; 10 pages.

Pierce Pacific Manufacturing, Inc.; "Forestry Grapples"; Pierce Pacific Manufacturing, Inc. product brochure; at least as early as Oct. 30, 2020; accessed online at piercepacific.com/products/forestry/forestry-grapples; 12 pages.

Pierce Pacific Manufacturing, Inc.; "Pierce Live Heel Forestry Booms: Simply Beyond Compare"; Pierce Pacific Manufacturing product description; at least as early as Mar. 14, 2020; accessed online at: piercepacific.com/products/forestry/forestry-booms; 23 pages.

Pierce Pacific Manufacturing, Inc. & Pierce Denharco, Inc.; "Forestry Booms"; Pierce Pacific Manufacturing, Inc. and Pierce Denharco, Inc. product description; at least as early as May 15, 2020; 6 pages.

PSM Corp; "Clamshells & Grapples"; PSM Corp product description; at least as early as Oct. 27, 2020; accessed online via psmcorp.com/products/clamshells-grapples; 2 pages.

PSM Corp; "Grapples & Live Heel Racks"; PSM Corp product description; accessed Mar. 14, 2020; accessed online at: psmcopr.com/products/grapples-live-heel-racks; 1 page.

ROBOTEC; "Bunching Grapples"; online product description; at least as early as May 14, 2020; Robotec; accessed online at robotec.com/attachments/log-bunching-grapples; 9 pages.

Simpson, J.W.; "Converting Hydraulic Excavators to Log Loading"; N.Z. Logging Industry Research Assoc. (LIRA) Inc. Report; 1985; pp. 1-4; vol. 10, No. 13; LIRA; 4 pages.

Weldco-Beales Mfg.; "Butt-N-Top Grapple"; Weldco-Beales Mfg. product description; last revised: Dec. 4, 2018; accessed online via www.weldco-beales.com; 2 pages.

ritchielist.com; "2023 Others CCL Mini Ex Heel Rack Log Grapple"; at least as early as 2023; accessed online at: https://www.ritchielist.com/construction/miscellaneous-attachments-grapple/other-ccl-mini-ex-heel-rack-log-grapple/4b050288-fa7f-4ec8-9951-1042a25d06c6.html; 1 page.

* cited by examiner

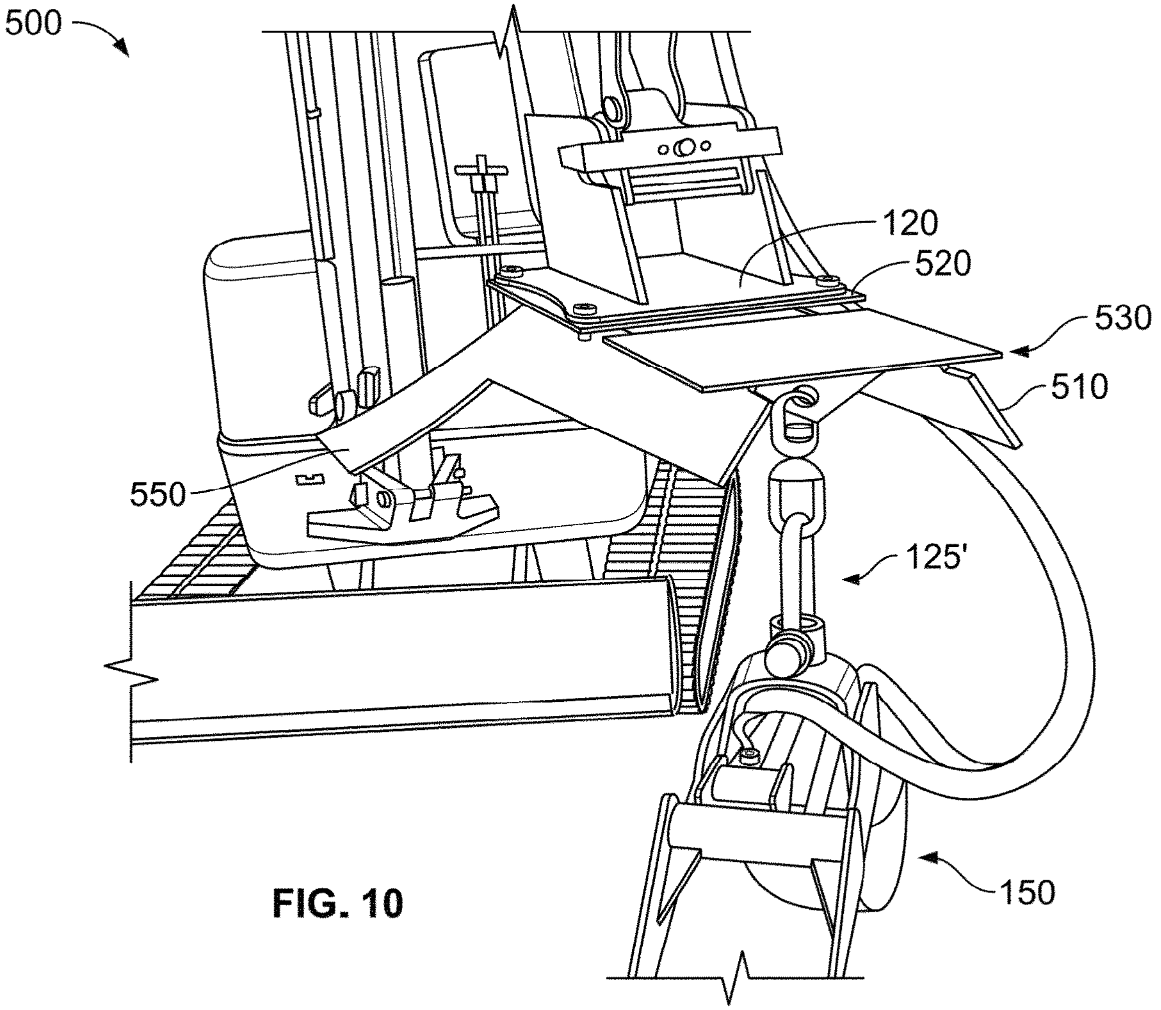
FIG. 10
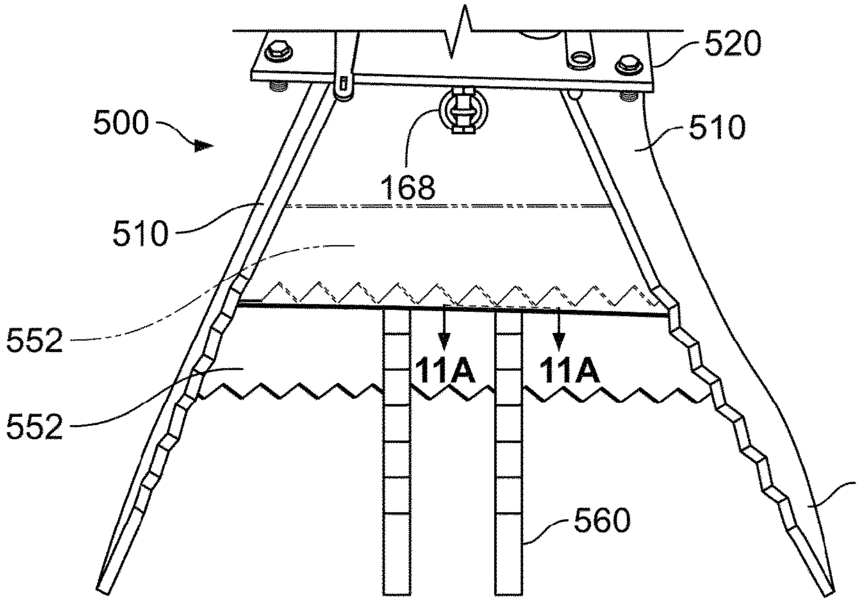
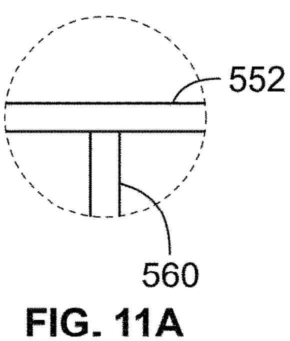
FIG. 11A
FIG. 11

MULTIFUNCTIONAL GRAPPLE-HEEL COMBINATION DEVICE FOR USE WITH A MANIPULATION MACHINE

The present application is a continuation of U.S. patent application Ser. No. 18/266,602, filed Jun. 12, 2023. U.S. patent application Ser. No. 18/266,602 is a nation stage application, filed under 35 U.S.C. § 371, of international PCT Application Number PCT/IB2021/053174, filed Apr. 16, 2021, that claims benefit of U.S. Provisional Patent Application No. 63/124,636, filed Dec. 11, 2020. The present application is based on and claims priority from these applications, the disclosures of which are hereby expressly incorporated herein by reference.

TECHNICAL FIELD

The present disclosure describes apparatuses, methods, and/or systems that generally relate to the technical field of a tool that can be used with a manipulation machine (such as an excavator-type machine), and specifically relate to a multifunctional grapple-heel combination device (also referred to as a grapple-heel rack).

BACKGROUND

Sometimes it is necessary to be manipulative on a large scale. For example, sometimes you need to "manipulate" (e.g. grab and lift) "loads" (e.g. trees and shrubbery). For "large-scale" manipulations, "manipulation machines" (e.g. excavators (of all sizes), or other heavy construction equipment) may be used. "Manipulation tools" (e.g. grapples and buckets) can be used to customize the manipulation machines for particular tasks. For example, a grapple that functions similarly to a human hand would enable a manipulation machine to reach out to, grab onto, and lift loads. There is a variety of manipulation machines and manipulation tools available to accomplish tasks depending on the type of task and the scope of the task.

For example, it is sometimes necessary to clear land by removing trees (or other loads) from a plot of land. Clearing-type tasks may be necessary for home builders building houses, commercial developers developing shopping centers, loggers harvesting trees, forestry personnel clearing underbrush to protect trees or homes from forest fires, or firefighters clearing impromptu firebreaks to prevent the devastation of forests. Once the trees have been felled, a manipulation machine may be used to sort the trees/logs, stack the trees/logs into piles, and load the trees/logs onto a truck to be transported to their destination. Smaller "personal" or "mini" manipulation machines may be preferable for some types of manipulations, such as clearing a plot of land for a house, working between trees, or working in environmentally sensitive areas (e.g. protected wetlands) that require a lighter machine to minimize soil disturbance.

Manipulation machines generally include or are associated with a "manipulation tool" (e.g. a grapple or a bucket), a "boom" or "boom support" (e.g. a "hinged boom" (also referred to as a "stick and boom" or a "dipper and boom")), an "operator station" (that may be referred to as a cab if it is enclosed (e.g. by rollover protection structure)), a "rotating platform" (also referred to as a "house"), and an "undercarriage" (also referred to as a "carrier base" that may be, for example, tracked, wheeled, or designed to be trailer mounted). The operator station may be positioned at least generally over the rotating platform that, in turn, is positioned at least generally over the undercarriage. The manipulation tool is at least generally associated with a first end of the boom support and the rotating platform is at least generally associated with the opposite second end of the boom support distal from the manipulation tool. The manipulation tool and boom support may be controlled by the operator from the operator station via hydraulic cylinders and hydraulic motors.

One common type of manipulation tool is a grapple or a clamshell (which will be referred to generally as a grapple). While there are many types of grapples, in general, a grapple functions similarly to a human hand that can grab onto and lift loads. Pulpwood grapples are generally lighter duty grapples, designed to pick up smaller and lighter loads. Log grapples are generally more robust than pulpwood grapples and can be used for heavier loads.

Grapples are sometimes used in combination with a heel. The heel can assist the grapple in handling the loads by protecting the boom and controlling an end of the log. The heel may be either a fixed heel or a live heel. Known live heels sometimes are integrated into the grapple with a separate hydraulic cylinder for increased control over the position of the log. Known fixed heels sometimes are attached to either the grapple or the boom.

Combinations of grapples and live heels (e.g. a grapple and live heel rack) can be used for single and multiple log handling applications (log manipulations). The grapples of these combination manipulation tools feature continuous rotation, high torque hydraulic motors, and high-pressure cylinders and swivels.

Butt-n-top (or butt-on-top) grapples have a heel mounted on either side of the grapple. When used with a standard manipulation machine, the butt-n-top grapple can be used for manipulating (e.g. loading, unloading, sorting, and piling) tree length material in sorting and bunching operations. The heels provide greater control over the load.

U.S. Pat. No. 7,537,428 to Hutchinson et al. describes an adjustably pivotable grapple with a fixed heel. The Hutchinson grapple apparatus has arms that pivot about parallel axes of a frame for grasping and releasing objects. The entire grapple, including the grapple arms, pivots about a pivotal axis transverse to such parallel axes. The grapple is pivotally adjustable about such pivotal axis between first and second positions and can be locked in at least the first and second positions thereof. A heel is fixed to the frame for supporting an object being grasped by the grapple when the grapple is in the first pivotal position thereof. A tooth is also optionally attached to the frame for permitting manipulation of the position of an object when the grapple itself is not being used.

SUMMARY

The present disclosure describes apparatuses, methods, and/or systems that generally relate to the technical field of a tool that can be used with a manipulation machine, and specifically relate to a multifunctional grapple-heel combination device.

According to a first aspect of the invention there is provided a grapple-heel rack for use with a grapple, the grapple-heel rack comprising: a frame having a nose, a heel, and first and second side rails spanning between the nose and the heel; the nose having a grapple attachment for associating the nose with the grapple; a first angle-enabler catch associated with the first side rail, the first angle-enabler catch positioned between the nose and the heel; and a second angle-enabler catch associated with the second side rail, the second angle-enabler catch positioned between the nose and the heel.

The grapple-heel rack may further comprise one or more of the following features, alone or in combination. The grapple-heel rack may comprise a first catch notch formed between the first angle-enabler catch and the first side rail and a second catch notch formed between the second angle-enabler catch and the second side rail. At least one heel bar may be provided associated with the heel, the at least one heel bar spanning between the first and second side rails. The grapple-heel rack may include a nose connector connecting the first and second side rails at the nose, the grapple attachment and/or the grapple supported by the nose connector; and at least one heel bar connecting the first and second side rails at the heel. The grapple-heel rack may have a neutral position, the grapple rotatable around an axis of rotation to a plurality of non-neutral positions, and the grapple-heel rack having a mechanical grapple return system for, in use, returning the grapple from one of the non-neutral positions to the neutral position. The grapple attachment may comprise a universal joint for connecting the grapple to the nose. The mechanical grapple return system may comprise: an expandable/contractible member having a heel end and a nose end, a flexible member having a heel end and a nose end, a heel end fixer, and at least one universal joint link or grapple link associated with the universal joint or the grapple; the expandable/contractible member heel end being associated with the heel end fixer to fix the expandable/contractible member heel end in a position relative to the frame; the expandable/contractible member nose end being associated with the flexible member heel end; and the flexible member nose end being associated with at least one of the universal joint and the universal joint link or grapple link. The first and second angle-enabler catches may be selected from the group consisting of: horizontal wing angle-enabler catches; pointed angle-enabler catches; and vertical wing angle-enabler catches. The first and second side rails being closer together near the nose than near the heel. The frame may have a top and a bottom, the first and second side rails being closer together near the top than near the bottom. The first and second side rails may have a step-like configuration.

In other embodiments, the heel rack may include, separately or in combination with the features listed above any of the following features. A storage sub-rack may be provided projecting at least generally forward from the frame of the grapple-heel rack. The grapple-heel rack may further comprise a rack/machine connector, the rack/machine connector interconnectable with a machine/rack connector of a manipulation machine. The machine/rack connector may be a machine/rack connector of a manipulation machine having a boom support and a thumb. The grapple-heel rack may be self-contained and self-supported. A rack/machine connector may span between the first and second side rails, at least one heel bar may be associated with the heel, the at least one heel bar spanning between the first and second side rails below rack/machine connector; and a corral may be defined between the first and second side rails, rack/machine connector, and the heel bar, the corral for use in a grapple-corral hold. The grapple-heel rack may further comprise at least one grapple brace system suitable for, in use, holding the grapple in a bracing position in which the grapple is held in a braced extended position that would be used in a braced grapple hold. The grapple brace system includes a brace rod and a fastener; and the brace rod may have a brace pivot end and a fastener end, the brace pivot end pivotally associated with the frame, and the fastener end selectively associable with a brace storage fastening structure and, in use, with the grapple.

The grapple-heel rack may further comprise an instrument attachment: the instrument attachment having at least one grapple connection mechanism, at least one heel connection mechanism, and at least one instrument; the grapple associatable with the at least one grapple connection mechanism; and the heel associatable with the at least one heel connection mechanism.

The grapple-heel rack may comprise a rake attachment: the rake attachment having at least one grapple connection mechanism, at least one heel trough connection mechanism, and a plurality of rake tines; the grapple associatable with the at least one grapple connection mechanism; and the heel associatable with the at least one heel trough connection mechanism.

According to another aspect of the invention there is provided a method for using a grapple-heel rack with a grapple and a manipulation machine, the manipulation machine having a boom support and a thumb. The method comprising: providing the grapple-heel rack (the grapple-heel rack comprising a frame having a nose, a heel, and first and second side rails spanning between the nose and the heel) and the grapple (the grapple associated with the nose); and implementing a hold in which a load is handled by the grapple-heel rack.

The step of implementing a hold may comprise one or more of: implementing a grapple hold by gripping the load with the grapple; implementing a thumb-heel hold by gripping the load between the thumb and the heel and implementing a combined grapple hold and thumb-heel hold by both gripping the load with the grapple and gripping the load between the thumb and the heel.

Providing the grapple-heel rack may further comprise providing a grapple-heel rack having a heel bar associated with the heel, the heel bar spanning between the first and second side rails; and implementing a hold may further comprise implementing a grapple-heel bar hold by gripping the load with the grapple and resting another part of the load against the heel bar. Optionally implementing the hold may comprise implementing a vertical grapple-heel bar hold by resting another part of the load against the heel bar with the grapple-heel rack in a vertical position, and positioning a load securer (e.g. a securing chain) to secure the load to the grapple-heel rack.

The method may comprise one or more of the following:

Providing a grapple-heel rack further comprises the grapple-heel rack further comprising: the rack/machine connector spanning between the first and second side rails; at least one heel bar associated with the heel, the at least one heel bar spanning between the first and second side rails below the rack/machine connector; and a corral defined between the first and second side rails, the rack/machine connector, and the heel bar; and the method comprises implementing a grapple-corral hold by gripping the load with the grapple and positioning the load within the corral.

Providing the grapple-heel rack further comprises the grapple-heel rack further comprising: a grapple brace system including a brace rod and a fastener; and the brace rod having a brace pivot end and a fastener end, the brace pivot end pivotally associated with the frame, and the fastener end selectively associable with a brace storage fastening structure and with the grapple; the method comprising implementing a braced grapple hold by gripping the load with the grapple and bracing the grapple in a braced position using the grapple brace system.

Providing the grapple-heel rack further comprises the grapple-heel rack further comprising: a first angle-enabler catch associated with the first side rail, the first angle-enabler catch positioned between the nose and the heel; and a second angle-enabler catch associated with the second side rail, the second angle-enabler catch positioned between the nose and the heel; and the method further comprising the step of implementing a hold further comprising implementing an angled-catch hold by gripping the load with the grapple and tucking the load under at least one of the first angle-enabler catch or the second angle-enabler catch. The step of providing the grapple-heel rack may further comprise providing a grapple-heel rack further comprising a first catch notch formed between the first angle-enabler catch and the first side rail; and a second catch notch formed between the second angle-enabler catch and the second side rail; and the step of implementing an angled-catch hold may comprise tucking the load into at least one of the first catch notch or the second catch notch.

The method may further comprise providing a grapple-heel rack further comprising a forward storage sub-rack; and implementing a storage hold by gripping the forward storage sub-rack with the grapple.

According to a further aspect of the invention there is provided a grapple-heel rack for use with a grapple, the grapple-heel rack comprising: a frame having a nose, a heel, and first and second side rails spanning between the nose and the heel; a nose connector connecting the first and second side rails at the nose; a universal joint connecting the grapple to the nose connector via the universal joint; and the grapple having a neutral position, the grapple rotatable to a plurality of non-neutral positions, a mechanical grapple return system for returning the grapple from one of the non-neutral positions to the neutral position.

The mechanical grapple return system may comprise: an expandable/contractible member having a heel end and a nose end, a flexible member having a heel end and a nose end, a heel end fixer, and at least one universal joint link or grapple link associated with the universal joint or the grapple; the expandable/contractible member heel end being associated with the heel end fixer to fix the expandable/contractible member heel end in a position relative to the frame; the expandable/contractible member nose end being associated with the flexible member heel end; and the flexible member nose end being associated with at least one of the universal joint link or grapple link.

The grapple-heel rack may comprise a pulley associated with at least one of the first and second side rails, the flexible member runs forward and backward over the pulley. A protection tube may be provided, at least part of the expandable/contractible member extending through and protected by the protection tube. Optionally the expandable/contractible member and the flexible member are a single or unitary expandable/contractible/flexible member.

At least one heel bar may be associated with the heel, the at least one heel bar spanning between the first and second side rails, the at least one heel bar connecting the first and second side rails. Optionally a storage sub-rack may project at least generally forward from the frame of the grapple-heel rack.

In an embodiment the grapple-heel rack of may further comprise: a first angle-enabler catch associated with the first side rail, the first angle-enabler catch positioned between the nose and the heel, a first catch notch being formed between the first angle-enabler catch and the first side rail; and a second angle-enabler catch associated with the second side rail, the second angle-enabler catch positioned between the nose and the heel, a second catch notch being formed between the second angle-enabler catch and the second side rail.

According to an aspect of the invention there is provided a grapple-heel rack for use with a grapple, the grapple-heel rack comprising: a frame having a nose, a heel, and first and second side rails spanning between the nose and the heel; a nose connector connecting the first and second side rails at the nose; a universal joint, the grapple connected to the nose connector via the universal joint; the grapple having a neutral position, the grapple rotatable to a plurality of non-neutral positions, a mechanical grapple return system for returning the grapple from one of the non-neutral positions to the neutral position, the mechanical grapple return system comprising: an expandable/contractible member having a heel end and a nose end, a flexible member having a heel end and a nose end, a heel end fixer, and at least one universal joint link or grapple link associated with the universal joint or the grapple; the expandable/contractible member heel end being associated with the heel end fixer to fix the expandable/contractible member heel end in a position relative to the frame; the expandable/contractible member nose end being associated with the flexible member heel end; and the flexible member nose end being associated with at least one of the universal joint link or grapple link; at least one heel bar associated with the heel, the at least one heel bar spanning between the first and second side rails, the at least one heel bar connecting the first and second side rails; a first angle-enabler catch associated with the first side rail, the first angle-enabler catch positioned between the nose and the heel, a first catch notch being formed between the first angle-enabler catch and the first side rail; and a second angle-enabler catch associated with the second side rail, the second angle-enabler catch positioned between the nose and the heel, a second catch notch being formed between the second angle-enabler catch and the second side rail.

According to a further embodiment of the invention there is provided a manipulation machine having a boom support and a grapple-heel rack defined hereinabove attached to the boom support. The grapple-heel rack may comprise a rack/machine connector, and the boom support may comprise a machine/rack connector, the rack/machine connector and the machine/rack connector being interconnectable. Optionally the boom support or the machine/rack connector may have a movable thumb associated therewith, the thumb movable relative to the grapple-heel rack.

In any of the embodiments described hereinabove having a mechanical grapple return system, the grapple may be pivotable about an axis of rotation and the mechanical return system arranged to exert a return force on one of the grapple and the grapple attachment, which may be a universal connector, at a location offset from the axis of rotation so that the exerted force causes the grapple to rotate about the axis of rotation.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

DESCRIPTION OF THE DRAWINGS

The accompanying drawings illustrate various exemplary multifunctional grapple-heel combination devices, components of various exemplary multifunctional grapple-heel combination devices, and/or provide teachings by which the various exemplary multifunctional grapple-heel combination devices are more readily understood.

FIG. 10 is a front perspective view of a fourth preferred grapple-heel rack.

FIG. 11 is a back perspective view of a similar fourth preferred grapple-heel rack, this variation showing an optional second heel bar and heel prongs.

FIG. 11A is a partial enlargement taken from line 11A-11A looking down at the perpendicular connection between the second heel bar and a heel prong.

Figure 1:
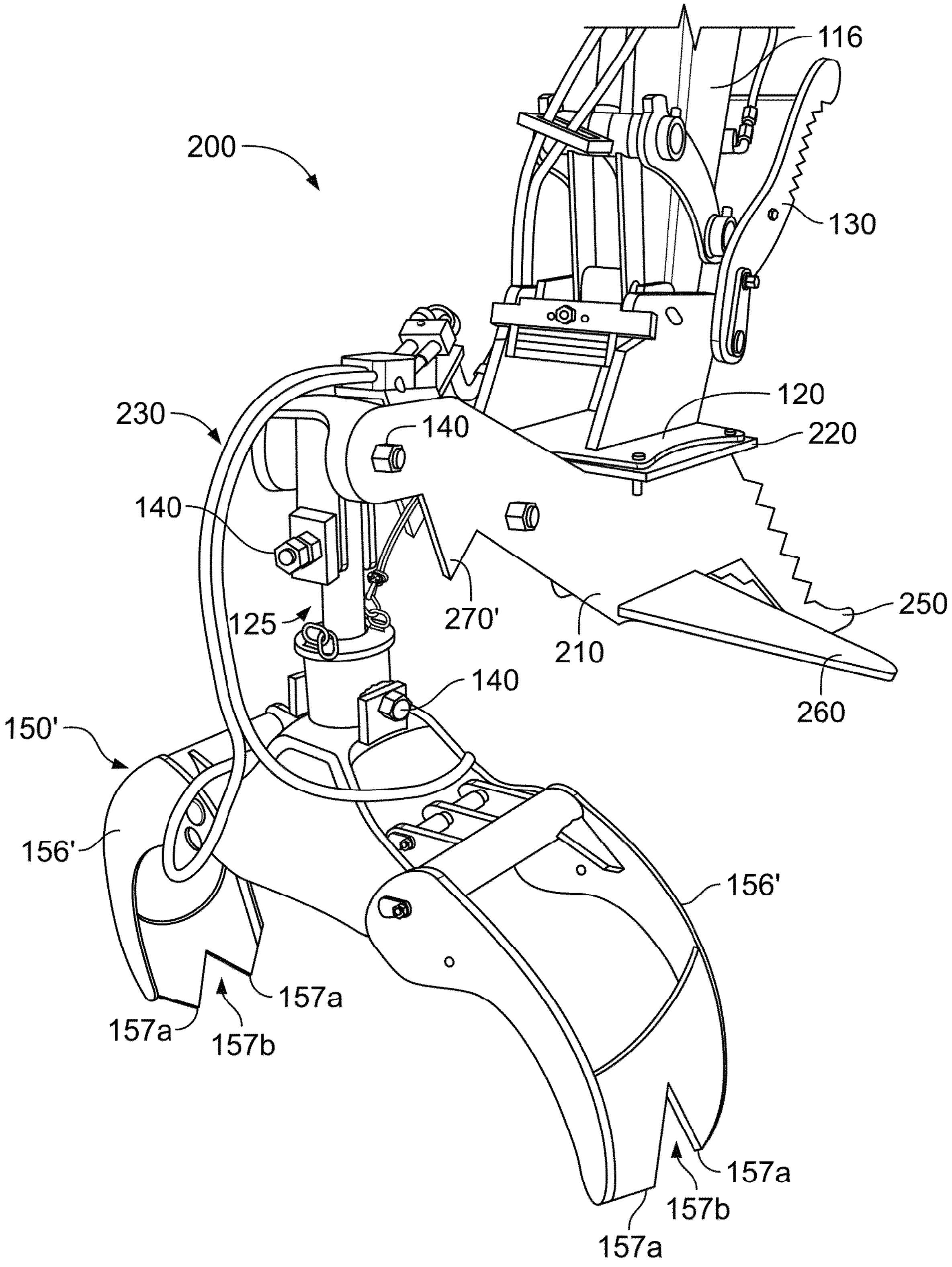
FIG. 1 is a front perspective view of a first preferred grapple-heel rack with horizontal wing angle-enabler catches.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION

Disclosed herein are apparatuses, methods, and/or systems that generally relate to a multifunctional grapple-heel combination device (also referred to as a grapple-heel rack) that can be used to manipulate a load 100 when used in combination with a manipulation machine 110. Exemplary grapple-heel racks 200 (FIGS. 1-3), 300 (FIGS. 4-6), 400 (FIGS. 7-9), 500 (FIGS. 10-12), and 600 (FIGS. 25, 30, 37-38, and 40-43) are disclosed herein, although variations to these grapple-heel racks are contemplated as discussed. A self-contained and self-supported grapple-heel rack can be thought of as an independent unit. The grapple 150 is preferably suspended by a universal joint 125 (FIGS. 13-20). A grapple return system 160 (FIGS. 17-20) is shown as a mechanical grapple return system that returns the grapple 150 to a neutral position (which may also be or may be thought of as the original position, the starting position, or 0 degree rotation).

Each grapple-heel rack is preferably self-contained and self-supported in that it incorporates a grapple 150 (which, unless otherwise specified, may be substituted with alternative grapple 150' (FIG. 1)) and a heel bar 252, 352, 452, 552, 652 attached to and/or supported by side rails 210, 310, 410, 510, 610. Grapple-heel racks 200, 300, 400, 600 are shown as incorporating angle-enabler catches 260, 360, 460, 660, respectively, that are attached to, supported by, or otherwise associated with their respective side rails 210, 310, 410, 610. For example, each side rail 210, 310, 410, 610 (e.g. first and second side rails) may have a respective angle-enabler catch 260, 360, 460, 660 (e.g. a first angle-enabler catch associated with a first side rail, and a second angle-enabler catch associated with a second side rail). The angle-enabler catches 260, 360, 460, 660 (in combination with the side rails 210, 310, 410, 610) create catch notches 260' (FIG. 3), 360' (FIG. 6), 460' (FIG. 9), 660' (FIG. 37), into which a load 100 may be positioned.

Using positions and holds shown in FIGS. 21-30, the grapple-heel racks described herein may be used, for example, for logging, tree felling, tree harvesting, and clearing (e.g. to create firebreaks). The grapple-heel rack adds useful functions and capabilities to a manipulation machine 110. This can save an owner money by reducing the need to purchase a specialized log handling machine (e.g. a "shovel") for tree, brush, and log handling needs.

Exemplary grapple-heel racks may be better understood with reference to the drawings, but these grapple-heel racks are not intended to be of a limiting nature. The same reference numbers will be used throughout the drawings and description in this document to refer to the same or like parts. In addition, the 200, 300, 400, 500, and 600 series have several "similar reference numbers" that, except for their first digit, are the same. For example, the side rails of the five grapple-heel racks have the reference numbers 210, 310, 410, 510, and 610, the nose of the five grapple-heel racks have the reference numbers 230, 330, 430, 530, and 630, and the heel of the five grapple-heel racks have the reference numbers 250, 350, 450, 550, and 650. Parts indicated by the similar reference numbers may be identical, similar, and/or perform the same or similar functions. Further, parts indicated by the similar reference numbers may be interchangeable. The shown shapes and relative dimensions are preferred, but are not meant to be limiting unless specifically claimed, in which case they may limit the scope of that particular claim.

Before describing the grapple-heel racks and the figures, some of the terminology should be clarified. Please note that the terms and phrases may have additional definitions and/or examples throughout the specification. Where not specifically defined otherwise, words, phrases, and acronyms are given their ordinary meaning in the art. The following paragraphs provide basic parameters for interpreting terms and phrases used herein.

The term "load" 100 (when used as a noun), as it is used herein, generally is meant to describe one or more objects that may be heavy, cumbersome, or otherwise difficult to lift. Technically, any object could be a load. Exemplary loads include, but are not limited to, trees, logs, shrubs, poles, pipes, bushes, stumps, roots, rocks, and other unwieldy and/or heavy items. (Load 101 is a thin or delicate load such as a bundle of sticks.) The loads may be made of any material (e.g. wood, steel, or composite material). "Elongate loads" are loads that would generally be considered "long" such as trees, logs, shrubs, poles, or pipes of varying lengths. While some elongate loads may be heavy, some "heavy loads" (e.g. rocks) may not be elongate. As a typical load is at least one log, logs will be used throughout the description as an example of a load. Unless specified otherwise, the use of an exemplary load (shown as a log 100) is not meant to limit the type of load that may be manipulated.

The terms "manipulate," "manipulations," and "manipulating" (and variations thereof) are meant to describe actions that the grapple-heel rack may perform on a load. Exemplary manipulations include, but are not limited to, grabbing, lifting (picking up), lowering (putting down), loading, unloading, stacking, piling, sorting, handling, lowering, rolling, twisting, spinning, pulling, dragging, adjusting, raking, and otherwise moving a load. Preferably, manipulations are controlled.

The phrase "grapple-heel manipulation system" refers to the combination of a "manipulation machine" and a "multifunctional grapple-heel combination device."

The phrase "manipulation machine" 110 is meant to describe a machine with a boom support (e.g. a boom 114 and a stick 116). A manipulation machine 110 may be, for example, an excavator, a log-loader, other machines described herein, known, or yet to be discovered. The manipulation machine 110 may be tracked (e.g. a track-type excavator, such as a track hoe), wheeled (e.g. a wheel-type excavator), or designed to be trailer mounted. The boom support may be powered/controlled using hydraulics, electronics, mechanical mechanisms, and/or other power/control means. Manipulation machines 110 are connectable and/or disconnectable with various types of attachments (including, but not limited to, grapples, digging buckets, jackhammers, rolling or vibratory compactors) using a "machine/rack connector" 120. The grapple-heel rack could be attachable in the same manner as other attachments. It should be noted that a manipulation machine 110 may have an integral (or permanent) attachment such as a grapple-heel rack. Although particularly useful for smaller "small," "compact," "personal," and/or "mini" manipulation machines, the manipulation machines described herein may be of any size. Manipulation machines disclosed herein are not meant to be limited to any specific model of manipulation machines or any specific manufacture, although examples of specific models/manufactures may be provided.

The phrase "multifunctional grapple-heel combination device" and the phrase "grapple-heel rack" are used to describe a device, tool, implement, and/or equipment that can be integral with or attached/attachable to a manipulation machine 110. (Exemplary grapple-heel racks are referenced individually using reference numbers 200, 300, 400, 500, and 600. If not specifically indicated otherwise, the phrase grapple-heel racks covers all of the shown and/or described grapple-heel racks.) The grapple-heel racks described herein may be used with or adapted for use with varying types and models of manipulation machines made by any manufacturer. The grapple-heel rack includes a "frame" that has side rails 210, 310, 410, 510, 610 that span the distance between a nose 230, 330, 430, 530, 630 (front) and a heel 250, 350, 450, 550, 650 (back). A "rack/machine connector" 220, 320, 420, 520, 620 is shown as associated with the frame (spanning the frame side rails). A grapple 150 is associated with the nose. At least one heel bar 252, 352, 452, 552, 652 is associated with the heel. Three of the grapple-heel racks 200, 300, 400 are shown as having angle-enabler catches 260, 360, 460 associated with the frame side rails 210, 310, 410. Grapple-heel racks are preferably designed in weight, size, configuration, classes, and categories involving structural, strength, and technical engineering changes to accommodate the power and lifting potentials of the various manipulation machines described herein, known, or yet to be discovered.

The phrases "machine/rack connector" 120 and "rack/machine connector" 220, 320, 420, 520, 620 are meant to describe structure used to interconnect the grapple-heel rack 200, 300, 400, 500, 600 with the manipulation machine 110. The phrase "interconnection structure" is meant to refer to the combination of the machine/rack connector, the rack/machine connector, and temporary and/or permanent connectors (e.g. welding and/or bolts) to temporarily and/or permanently connect the machine/rack connector with the rack/machine connector. These connectors may include the power/control connectors (e.g. hydraulics, electronics, mechanical mechanisms) as well as the physical connectors (e.g. bolts, welds, clamps). The interconnection structure disclosed herein may be replaced with known or yet to be discovered connection and disconnection structure. If the grapple-heel rack is integrated (or integral) with the stick 116 of the manipulation machine, then whatever structure (e.g. a pivot) is between the grapple-heel rack and the stick could be considered the interconnection structure. In addition to the shown and described interconnection structure, exemplary interconnection structure that could be used with or adapted to be used with the grapple-heel rack include, but are not limited to, those described in U.S. Pat. No. 3,237,795 to Kromer, U.S. Pat. No. 3,964,622 to Blair et al., U.S. Pat. No. 4,397,604 to McCain, U.S. Pat. No. 4,963,071 to Larwin et al., U.S. Pat. No. 6,108,951 to Renfrow et al., U.S. Pat. No. 6,539,650 to Kaczmarski et al., U.S. Pat. No. 6,964,122 to Cunningham et al., U.S. Patent Application Publication No. 2009/0007465A1 to Robl et al., and any interconnection structure means known (e.g. quick change or easy connect and disconnect attachment systems) or yet to be discovered structures that are suitable for connecting a grapple-heel rack to a boom support.

The term "grapple" 150 (when used as a noun) or the phrase "grapple tool" are used to describe a tool that may be used to catch hold of or seize something. Grapples 150 are generally claw-like devices that can open and close. Exemplary grapples 150 have a hinge body 152 having a hingedly (i.e. using a hinge 154, pivot, and/or axis point) attached first arm 156 and a hingedly (i.e. using a hinge 154, pivot, and/or axis point) attached second arm 156. Put another way, the first and second arms 156 are attached to the hinge body 152 on opposite sides of the hinge body 152 using respective hinges 154. (Theoretically, the grapple could include two arms hingedly attached to each other.) While there are many types of grapples, in general, a grapple functions similarly to a human hand that can grab onto, lift, and/or hold loads 100. Pulpwood grapples are generally lighter duty grapples, designed to pick up smaller and lighter loads. Log grapples are generally more robust than pulpwood grapples and can be used for heavier loads. In addition to the shown and described grapples, exemplary grapples that could be used with or adapted to be used with the grapple-heel rack include, but are not limited to, those described in U.S. Pat. No. 3,102,752 to Jenkins, U.S. Pat. No. 3,231,303 to Le Tourneau, U.S. Pat. No. 3,759,564 to Seaberg, U.S. Pat. No. 3,802,731 to La Bounty, U.S. Pat. No. 4,005,894 to Tucek, U.S. Pat. No. 4,212,577 to Swanson, U.S. Pat. No. 4,426,110 to Mitchell et al., and any grapples known or yet to be discovered that are suitable for manipulating a load. FIG. 1 shows an alternative grapple 150' (which may be used in place of any of the other shown or described grapples 150) which has first and second arms 156', each arm 156' ending in at least two distinct points 157*a* separated by a V-shaped gap 157*b*. When the arms 156' pivot together, the points 157*a* can be used to help grip large items therebetween. Also, when the arms 156' pivot together, the V-shaped gaps 157*b* can form a small diamond-shaped hole (each V-shaped gap 157*b* forming two sides of the diamond) that can be used to pull fence posts. In addition, if at least the edges of the V-shaped gaps 157*b* are sharp, when the V-shaped gaps 157*b* come together on either side of an item (e.g. brush or small trees), the sharp edges can cut the surrounded (sandwiched) item.

The term "thumb" 130 is meant to describe a manipulatable appendage that works much like a human thumb in that it helps in picking up and holding. Thumbs 130 are often present in manipulation machines and particularly in smaller manipulation machines. They can also be added to manipulation machines. Many thumbs 130 are hydraulically powered and controllable via actuators positioned in the operator station 112 near the operator(s) of the manipulation machines 110. In addition to the shown and described thumbs 130, exemplary thumbs that could be used with or adapted to be used with the grapple-heel rack include, but are not limited to, those described in U.S. Pat. No. 4,519,739 to Risch, U.S. Pat. No. 4,804,309 to Risch, U.S. Pat. No. 6,148,254 to Barden, U.S. Pat. No. 6,385,870 to Webel et al., U.S. Pat. No. 7,383,681 to Connolly et al., U.S. Pat. No. 7,533,481 to McCoy, and U.S. Patent Application Publication No. 2009/0290966 to King.

It should be noted that some terms used in this specification are meant to be relative. For example, the terms "top," "bottom," "front," "back," and "sides" are used to describe a grapple-heel rack. Rotation of the grapple-heel rack might change the terminology, but not the concept.

The term "associated" is defined to mean integral or original, retrofitted, attached, connected (including functionally connected), positioned near, and/or accessible by. For example, a grapple-heel rack 200, 300, 400, 500, and 600 may be associated with a stick 116 by being attached as shown (using a machine/rack connector 120 and a rack/machine connector 220, 320, 420, 520, 620) or they could be integral. Another example is that the grapple 150 is shown as being indirectly associated (attached to or supported by) with the grapple-heel rack 200, 300, 400, 500, and 600 (and, more specifically, the nose connector 140) via the grapple attachment (universal joint 125). The grapple 150 could also be directly associated (attached to or supported by) with the grapple-heel rack 200, 300, 400, 500, and 600 (and, more specifically, the nose connector 140).

The term "substantially," when used as a modifier, is defined "not exactly," "not completely," and/or "not perfectly." For example, the phrase "substantially held" means that the hold is not necessarily perfectly firm, but allows some movement. For example, the phrases "substantially vertical/horizontal orientation" or "substantially vertical/horizontal position" mean that the orientation or position (e.g. of grapple-heel rack) is not perfectly vertical/horizontal, but can be angled.

It should be noted that relative terms are meant to help in the understanding of the technology and are not meant to limit the scope of the invention. Similarly, unless specifically stated otherwise, the terms "first," "second," "third," and "fourth" are meant solely for purposes of designation and not for order or limitation. For example, the "first preferred grapple-heel rack 200" has no order relationship with the "fourth preferred grapple-heel rack 500."

Terms such as "may," "might," "can," and "could" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type.

It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

General

The grapple-heel racks 200, 300, 400, 500, 600 described herein preferably are associated with the end of a boom support that is distal from the operator station 112 of the manipulation machine 110. This is the at least approximate location of where a bucket would normally be mounted for digging purposes. The grapple-heel racks are attachable to the manipulation machines 110 using interconnection structure such as a machine/rack connector 120 (associated with the manipulation machine 110) and a rack/machine connector 220, 320, 420, 520, 620 (associated with the grapple-heel racks). The interconnection structure may allow grapple-heel racks to be interchanged between different types and sizes of manipulation machines 110. Alternatively, the interconnection structure may be designed (proprietary) such that a grapple-heel rack with a particular rack/machine connector will only connect with a manipulation machine 110 having an associated machine/rack connector 120 (e.g. size-specific and/or make-specific mounting systems). While the shown interconnection structure is shown as an attachment collar system with sturdy material (e.g. steel) and connection structure (e.g. bolts and/or welds), alternative interconnection structures are described herein and, further, could be any interconnection structure means known (e.g. easy connect and disconnect attachment systems) or yet to be discovered that is suitable for connecting a grapple-heel rack to a boom support.

As set forth, a grapple-heel rack includes a frame that has side rails 210, 310, 410, 510, 610 that span the distance between a nose 230, 330, 430, 530, 630 (front) and a heel 250, 350, 450, 550, 650 (back). The frame is preferably made of sturdy and durable material (e.g. steel). The shown shapes of the frames are meant to be exemplary, but have advantages. The side rails 210, 310, 410, 510, 610 are preferably connected at the nose 230, 330, 430, 530, 630 (front) by a connector 140 (a "nose connector" that may function as a grapple support pin) and at the heel 250, 350, 450, 550, 650 (back) by a heel bar(s) 252, 352, 452, 552, 652. Exemplary frames include side rails that are angled front-to-back (nose-to-heel), side rails that are angled top-to-bottom (A-shaped or upside-down V-shaped), and/or side rails that are "step-like" (having different levels separated by connecting lengths).

As mentioned, the side rails are preferably front-to-back (nose-to-heel) angled such that they are closer together at the nose and farther apart at the heel (shown as being spread apart by at least one heel bar 252, 352, 452, 552, 652). Put another way, the distance (a first distance) between the side rails at the nose is shorter than the distance (a second distance) between the side rails at the heel. It can be seen in figures such as FIGS. 3, 4, 8, and 10. This front-to-back angling of the side rails has been shown to be effective. One reason that the front-to-back angling of the side rails is preferred is that it makes the frame more rigid and stronger at the stress point of the first pivot-like connector 140 (that is shown as functioning as both a "nose connector" and a grapple support pin). Another reason that the front-to-back angling of the side rails is preferred is that the narrowed nose is able to get the grapple into confined spaces.

As can be seen in FIGS. 2, 5, 8, and 11, the side rails are preferably also top-to-bottom angled such that they are closer together at the top of the frame and farther apart at the bottom of the frame. Put another way, the distance (a first distance) between the side rails at the top of the frame is shorter than the distance (a second distance) between the side rails at the bottom of the frame. This can be thought of as A-shaped (or upside-down V-shaped). This top-to-bottom angling of the side rails has been shown to be effective. One reason that the top-to-bottom angling of the side rails is preferred is that it strengthens the frame (which could allow thinner gauge metal to be used and thereby reduce the weight of the grapple-heel rack 200, 300, 400, 500, 600. Another reason that the top-to-bottom angling of the side rails is preferred is that it allows frame to get into smaller spaces.

The specific shape of the side rails is also meant to be exemplary. For example, the side rails 210, 310, 410 of grapple-heel racks 200, 300, 400 are shown as "step-like" in that the nose is at a high level, the angle-enabler catches (one on each side rail) are at a middle level, and the heel (and heel bar) are at a low level. The step-like configuration of the side rails 210, 310, 410 imparts the step-like configuration to the frame such that the grapple-heel racks 200, 300, 400 can also be said to have a step-like configuration. The step-like configuration of grapple-heel racks 200, 300, 400 has been shown to be effective. One reason that the step-like configuration of the side rails is preferred is that it allows the grapple-heel rack 200, 300, 400, 500, 600 to use the lifting and maneuverability potential of a manipulation machine 110 to manipulate a load 100 while keeping the load 100 close to the ground for the safety and stability of the operator and the manipulation machine. The angle-enabler catches 260, 360, 460 are associated with the middle section of the frame side rails 210, 310, 410. The angle-enabler catches are preferably set back from the nose and are forward from the heel. Preferably, the angle-enabler catches are within the middle portion (e.g. the middle 60% of the length) of the side rails.

Preferred grapple-heel racks may have one or more heel bar(s) 252, 352, 452, 552, 652 that is/are associated with the heel 250, 350, 450, 550, 650 (back) of the grapple-heel racks. Each heel bar spans the distance between the first and second side rails 210, 310, 410, 510, 610. Put another way, each heel bar has first and second heel bar ends. The first heel bar end is associated with the first side rail and the second heel bar end is associated with the second side rail.

Preferred grapple-heel racks are designed to be used in conjunction with the thumb 130 of its associated manipulation machine 110. (The thumbs 130 may be original to the manipulation machines or may be added thereto as a custom feature.) As will be discussed and as shown in FIGS. 22-27, the thumb 130 is used when implementing the thumb-heel hold to pick up odd-shaped or excessively large loads 100 (e.g. loads 100 that are too big for the grapple 150 to handle). The thumb-heel hold is accomplished by pinching or grabbing such loads 100 between the thumb 130 and the heel bar 252, 352, 452, 552, 652.

Various components of the frame and thumb 130 that come into contact with the load 100 may be serrated or may be an alternative type of gripping surface. For example, the back surface of the heel 250, 350, 450, 550, 650 (which can also be thought of as the back surface of the side rails 210, 310, 410, 510, 610) is shown as being serrated. The lower surface of the heel bar(s) 252, 352, 452, 552, 652 is/are shown as being serrated. The lower surface of the thumb 130 is also shown as being serrated. The serrated surfaces add additional gripping forces when held against a load such as a log.

When mounted to a manipulation machine 110, the grapple-heel rack preferably utilizes the manipulation machine's controls (e.g. the original controls that came with the manipulation machine 110 and/or custom controls that have been added to the manipulation machine 110), power, and hydraulic system (e.g. hydraulic fluid, hydraulic circuits, diverter relays, electrical switches) to allow for powered manipulations. Exemplary manipulation machines may have controls associated with the operator station 112 including, but not limited to, a boom/bucket joystick control, a stick/swing joystick control, a thumb toggle control (e.g. a foot pedal or other type of switch (e.g. a thumb toggle switch) for controlling the thumb 130), a boom control (e.g. a foot pedal or handheld control for controlling the boom 114 (boom swing)), and an operation switch control (e.g. an electric or manual valve switch) that allows at least one of the other controls to toggle between operations. An exemplary boom/bucket joystick control would raise the boom 114 when pulled back, lower the boom 114 when pushed forward, raise (angle upward) the attached tool (e.g. the grapple-heel rack) when moved to the right (or to a first predetermined side), and lower (angle downward) the attachment (e.g. the grapple-heel rack) when moved to the left (or to a second predetermined side). An exemplary boom/bucket joystick control would traditionally control the "bucket curl's" open/close function (e.g. bucket curling in and bucket curling out), but in the grapple-heel manipulation system this joystick control would lift/lower the front and/or back of the grapple-heel rack. An exemplary stick/swing joystick control would push the stick 116 forward when pushed forward, pull the stick 116 back in when pulled back, and swing/rotate the operator station right/left when pushed right/left. An exemplary thumb control (which may be foot pedal or hand control on the joystick control) may raise/lower the thumb 130. An exemplary boom control (which may be foot pedal) may swing the boom support (but not the operator station 112) right and left. There may also be at least one additional operation switch control that allows at least one of the other controls to switch (toggle) between operations. For example, using an additional operation switch or toggle control, the thumb circuit control could perform thumb control operations (controlling the positioning of the thumb 130) or grapple control operations (controlling the opening and closing of the grapple 150). Alternatively, a separate grapple control could be used to control the grapple 150 (although such a grapple control might have to be custom added to the manipulation machine 110).

An operator in the operator station 112 of the manipulation machine 110 may use the manipulation machine's controls to manipulate the grapple-heel rack to manipulate loads 100 using, for example, exemplary preferred positions and holds (discussed in the "Positions and Holds" section). The following examples provide a series of exemplary operator controls for the thumb-heel hold and the grapple hold that can be used independently or together in conjunction with each other to grab/carry two separate loads simultaneously. Actual series of operator controls depend on the operator and/or the controls available for a particular manipulation machine.

- The thumb-heel hold may be implemented using the following series of exemplary operator controls. Using the boom/bucket joystick control and the stick/swing joystick control, the grapple-heel rack can be positioned and angled so that the heel and thumb 130 are over a first load 100. The additional operation switch control is set so that the thumb control is controlling the thumb 130 so that the thumb 130 can be closed (moved toward the heel), which facilitates the grapple-heel rack grabbing the first load 100. Then, using the boom/bucket joystick control and the stick/swing joystick control, first load 100 is moved to an alternative location. The thumb control opens the thumb 130 (moving it away from the heel) so that the grapple-heel rack releases the first load 100 in the desired position.
- The grapple hold may be implemented using the following series of exemplary operator controls. Using the boom/bucket joystick control and the stick/swing joystick control, the grapple 150 can be positioned and angled so that the grapple 150 is over a second load 100. The additional operation switch control is set so that the thumb control is controlling the grapple 150 so that the grapple 150 can be opened and closed, which facilitates the grapple 150 grabbing the second load 100. Then, using the boom/bucket joystick control and the stick/swing joystick control, the second load 100 is moved to an alternative location. The thumb control opens the grapple 150 so that the grapple-heel rack releases the second load 100 in the desired position.

Preferred Grapple-Heel Racks

Figure 2:
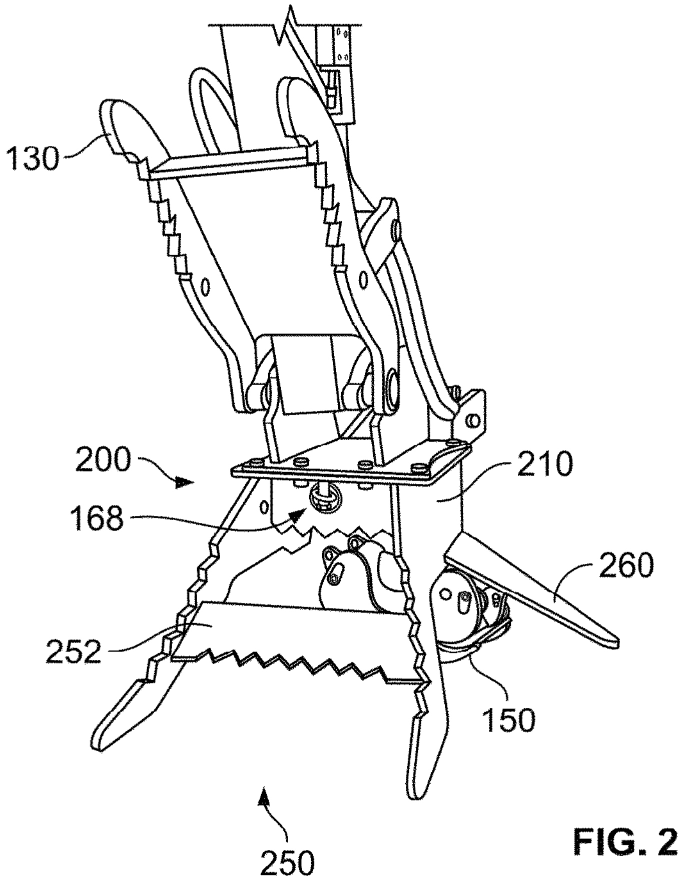
FIG. 2 is a back perspective view of a similar first preferred grapple-heel rack with horizontal wing angle-enabler catches.
Figure 3:
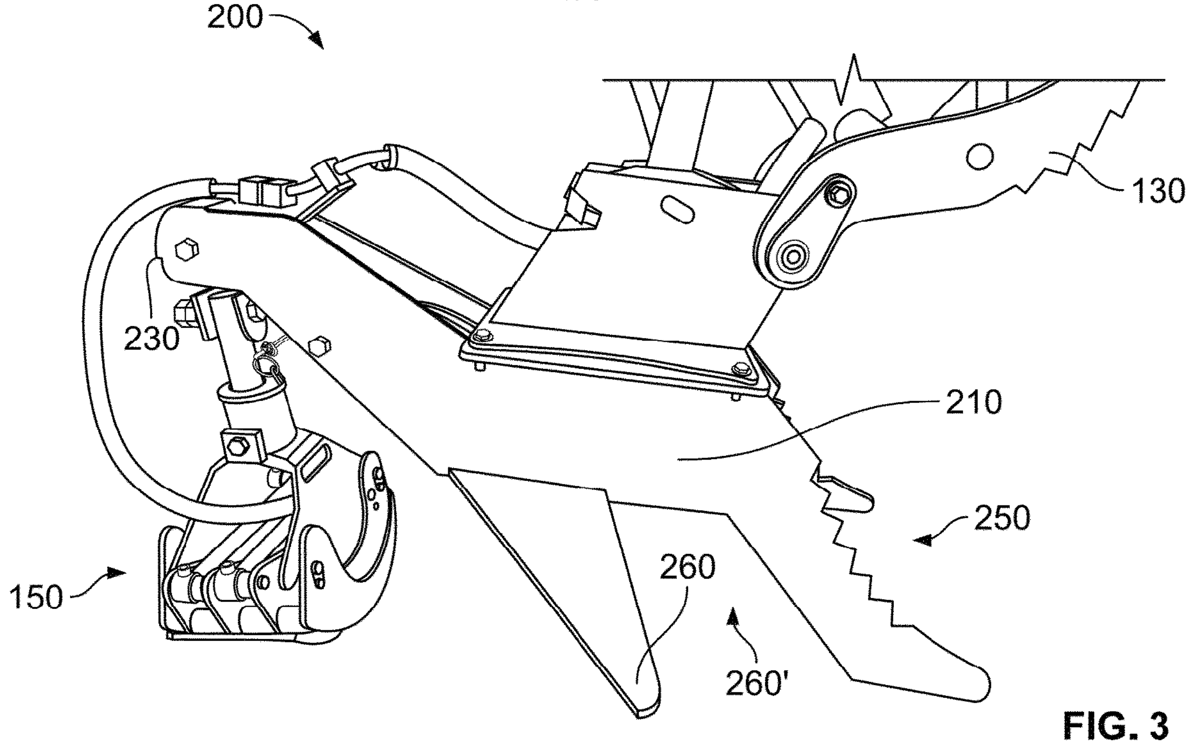
FIG. 3 is a side perspective view of a similar first preferred grapple-heel rack with horizontal wing angle-enabler catches.
Figure 34:
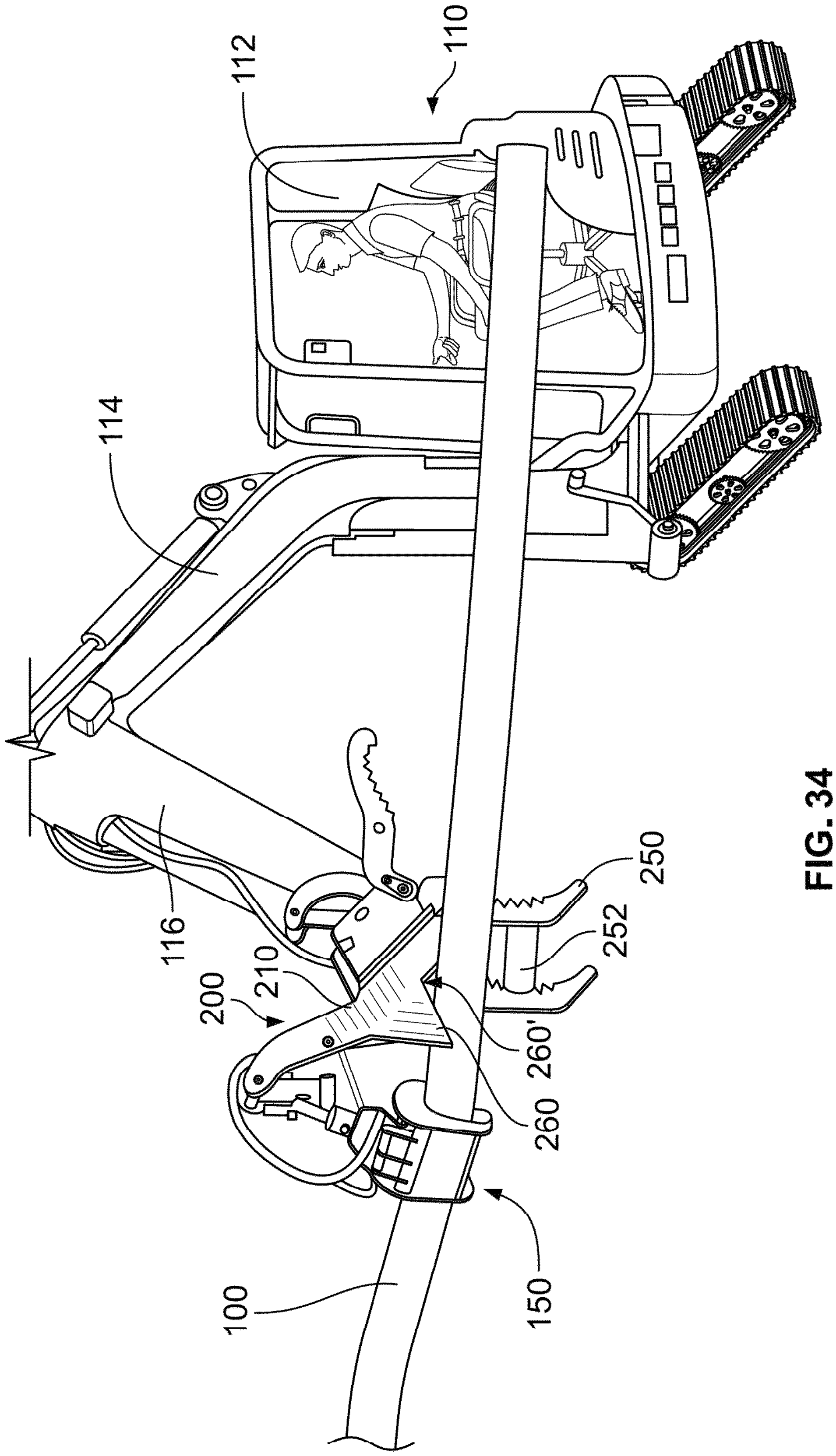
FIG. 34 is a side perspective view of an exemplary grapple-heel rack holding or carrying a load using an angled-catch hold, the exemplary grapple-heel rack shown as the grapple-heel rack with horizontal wing angle-enabler catches.

FIGS. 1-3 show a first preferred grapple-heel rack 200 with horizontal wing angle-enabler catches 260. The grapple-heel rack 200 includes a frame that has a nose 230 (front), a heel 250 (the back surface of which is shown as serrated) with at least one heel bar 252 (shown as having a serrated or gripping surface), and side rails 210 (e.g. first and second side rails 210) that span the distance between the nose 230 and the heel 250. A rack/machine connector 220 is shown as associated with the top of the frame (spanning the frame side rails 210). A grapple 150 is shown as associated via a universal joint 125 with the nose 230. This preferred grapple-heel rack 200 has horizontal wing angle-enabler catches 260 associated with the frame side rails 210. The horizontal wing angle-enabler catches 260 have a wing-like characteristic. Because they are horizontal, the wing angle-enabler catches 260 may provide additional surface when executing an angled-catch hold as shown in FIG. 34. FIG. 34 shows a wing angle-enabler catch 260 (and the catch notch 260' formed at the intersection of the wing angle-enabler catch 260 and the side rail 210) being used to execute an angled-catch hold. A respective catch notch 260' (e.g. first catch notch or second catch notch) preferably is formed at the intersection of each angle-enabler catch 260 and its respective side rail 210.

Figure 4:
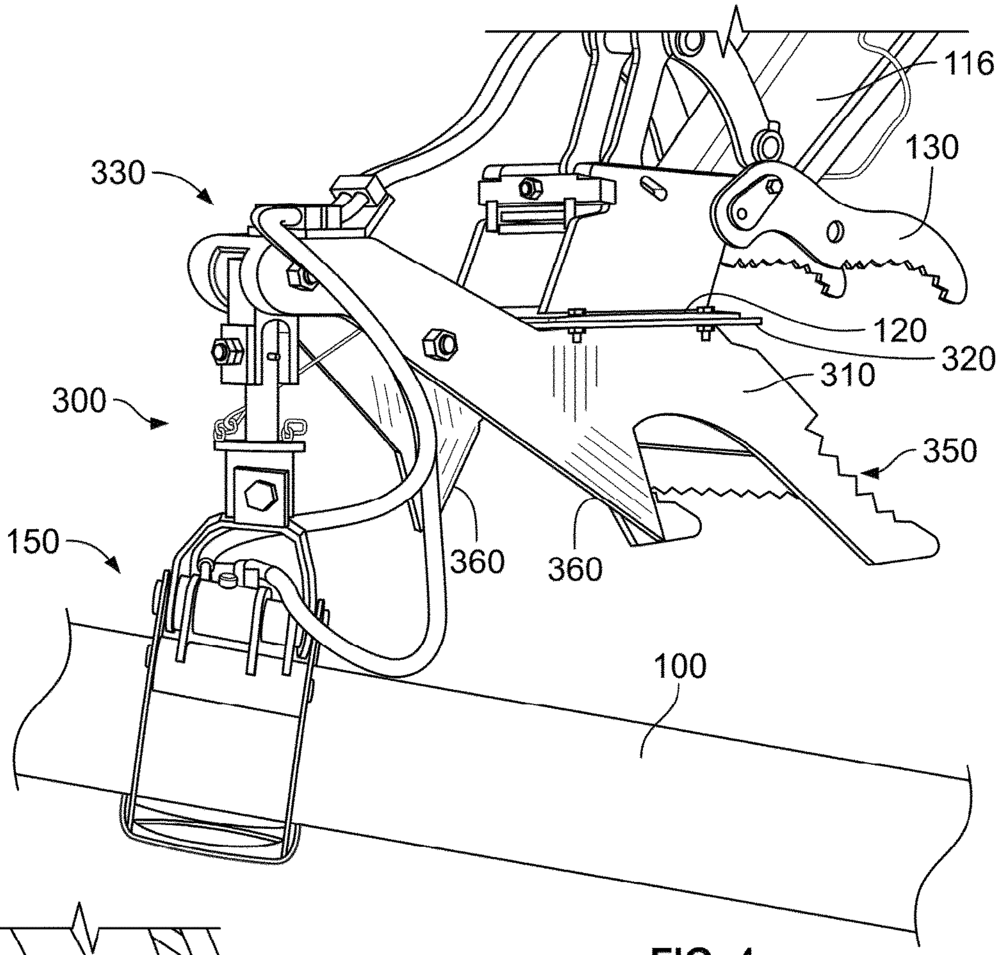
FIG. 4 is a front perspective view of a second preferred grapple-heel rack with pointed angle-enabler catches.
Figure 5:
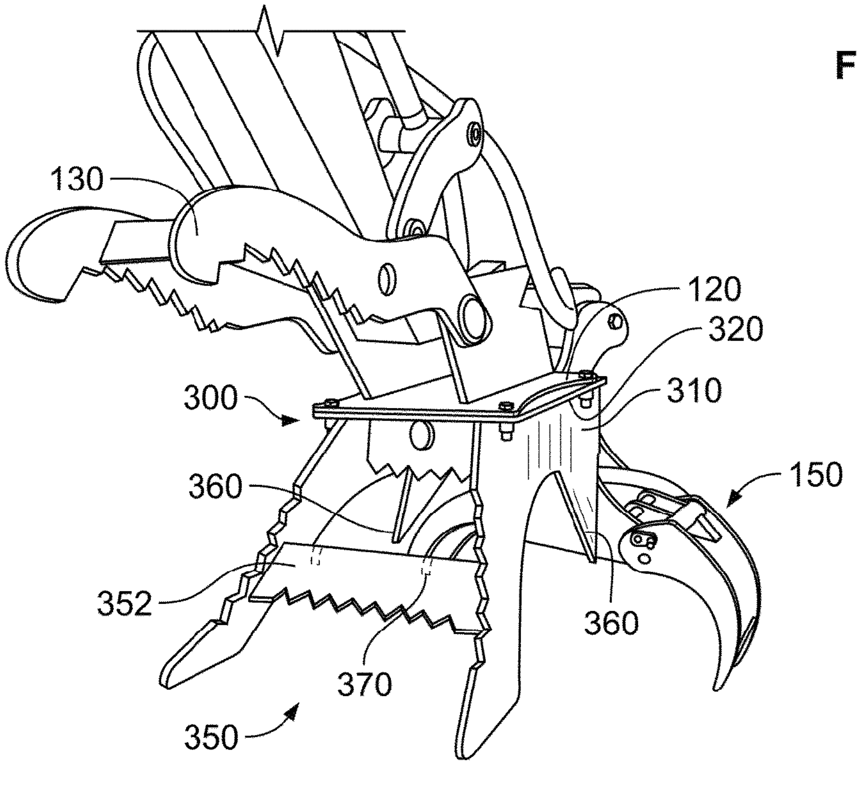
FIG. 5 is a back perspective view of a similar second preferred grapple-heel rack with pointed angle-enabler catches, this variation showing optional slots in the heel bar.
Figure 6:
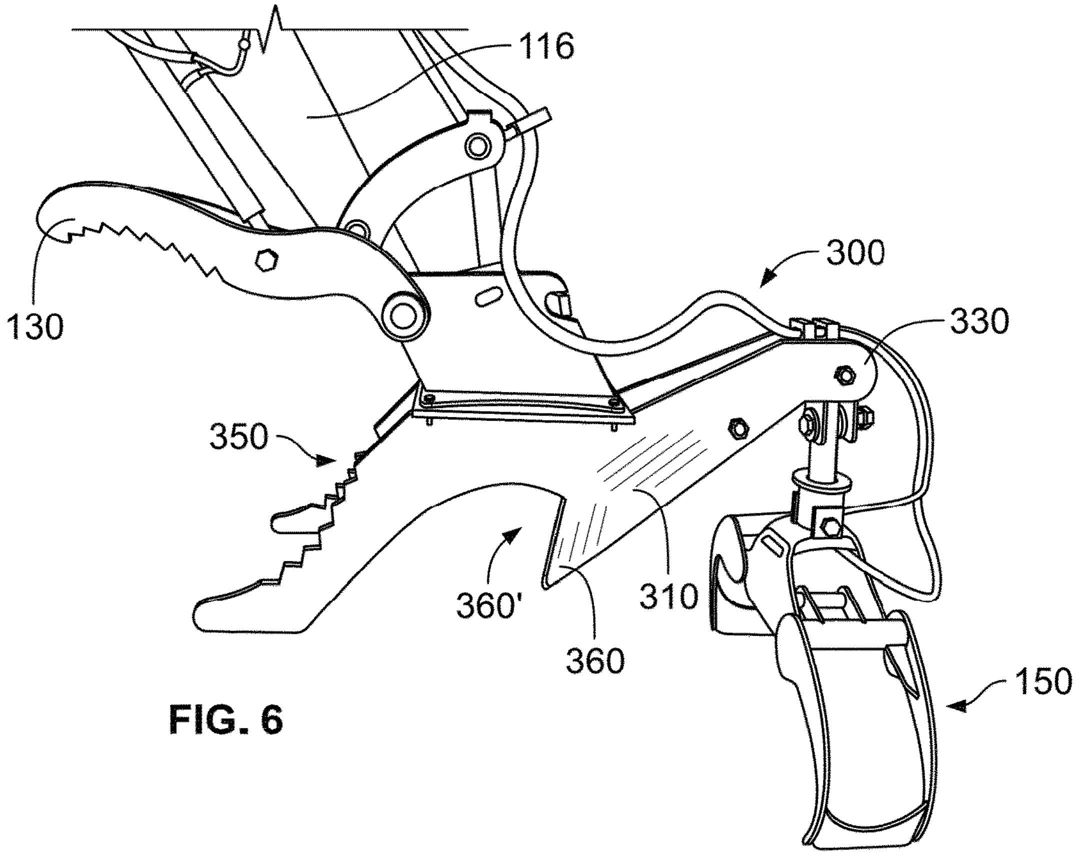
FIG. 6 is a side perspective view of a similar second preferred grapple-heel rack with pointed angle-enabler catches.
Figure 29:
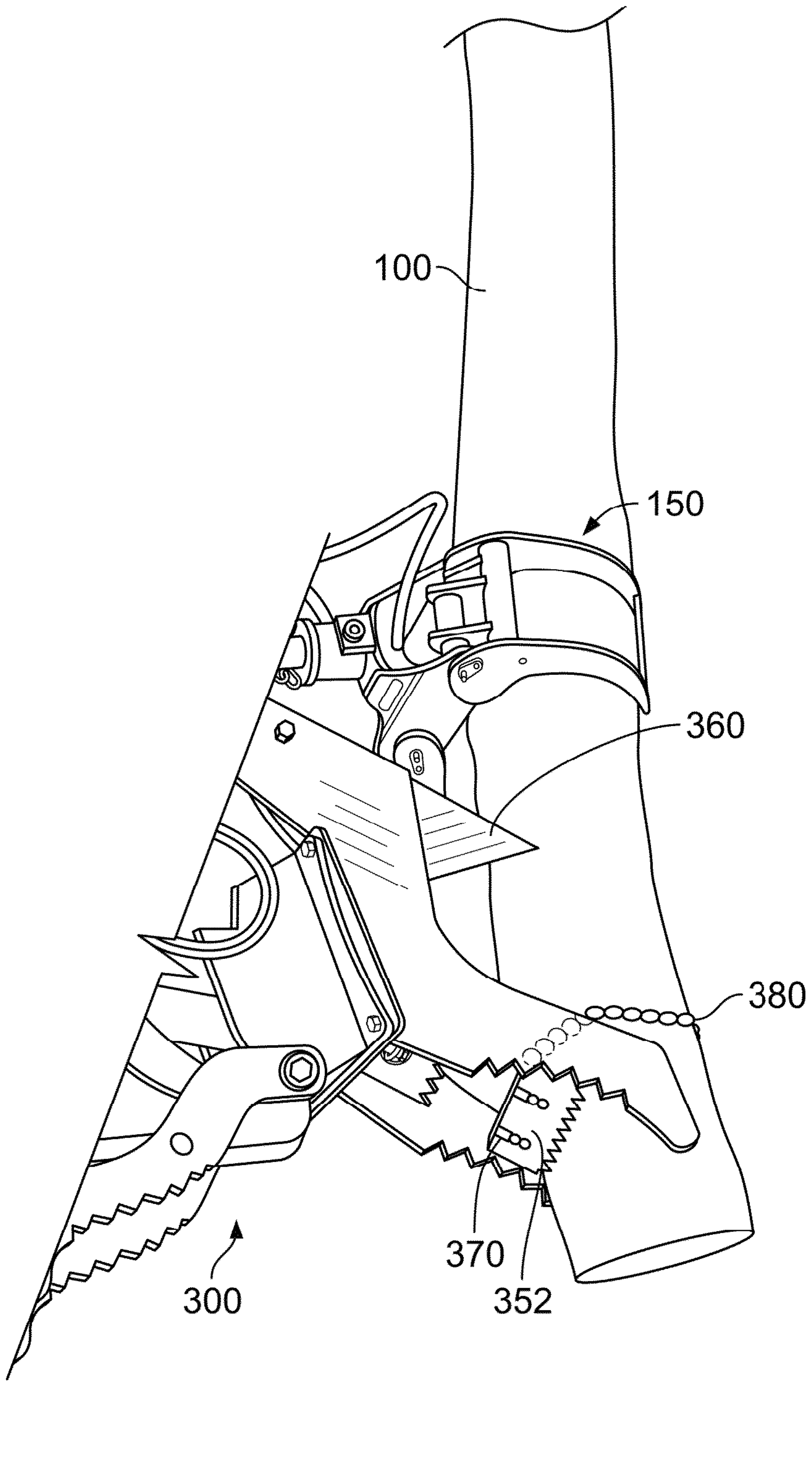
FIG. 29 is a side perspective view of an exemplary grapple-heel rack holding or carrying a load using a vertical grapple-heel bar hold (which is the grapple-heel rack using a grapple-heel bar hold in an at least substantially vertical position), a load securer (shown as a securing chain) wrapped around the load.
Figure 35:
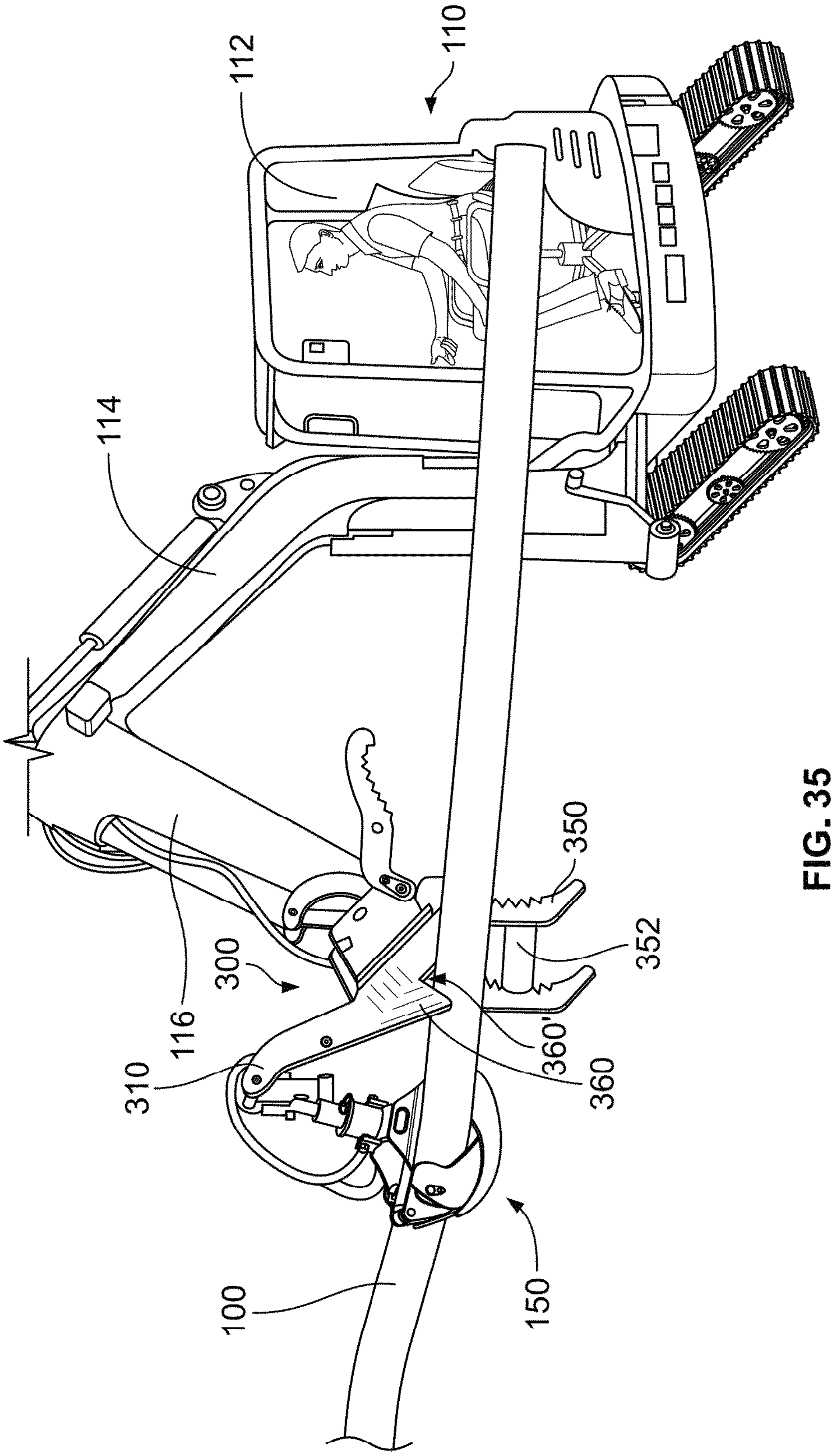
FIG. 35 is a side perspective view of an exemplary grapple-heel rack holding or carrying a load using an angled-catch hold, the exemplary grapple-heel rack shown as the grapple-heel rack with pointed angle-enabler catches.

FIGS. 4-6 show a second preferred grapple-heel rack 300 with pointed angle-enabler catches 360. The grapple-heel rack 300 includes a frame that has a nose 330 (front), a heel 350 (the back surface of which being shown as serrated) with at least one heel bar 352 (shown as having a serrated or gripping surface), and side rails 310 (e.g. first and second side rails 310) that span the distance between the nose 330 and the heel 350. A rack/machine connector 320 is shown as associated with the top of the frame (spanning the frame side rails 310). A grapple 150 is shown as associated via a universal joint 125 with the nose 330. This preferred grapple-heel rack 300 has pointed angle-enabler catches 360 associated with the frame side rails 310. The pointed angle-enabler catches 360 may be angled outward beyond the plane of the side rails 310. The pointed angle-enabler catches 360 may be relatively sharp so they may be used to puncture the outer bark of a log load if necessary. One of the pointed angle-enabler catches 360 (and the respective catch notch 360' formed at the intersection of the pointed angle-enabler catch 360 and the side rail 310) is shown in FIG. 35 as being used to execute an angled-catch hold. A respective catch notch 360' (e.g. first catch notch or second catch notch) preferably is formed at the intersection of each side rail 310 and its respective angle-enabler catch 360. FIG. 5 also shows load securer connection mechanisms (shown as chain slots 370) that can be used to secure ends of a load securer (e.g. a securing chain). The chain slots 370 may be used as simple chain connectors for attaching the ends of a chain 380 as shown in FIG. 29 to secure a load 100 in a vertical grapple-heel bar hold. It should be noted that alternative load securers may be used in place of the chain 380 including, but not limited to, webbing, straps, or cables. It should be noted that alternative load securer connection mechanisms may be used in place of the chain slots 370 including, but not limited to, hooks, clamps, or ties.

Figure 7:
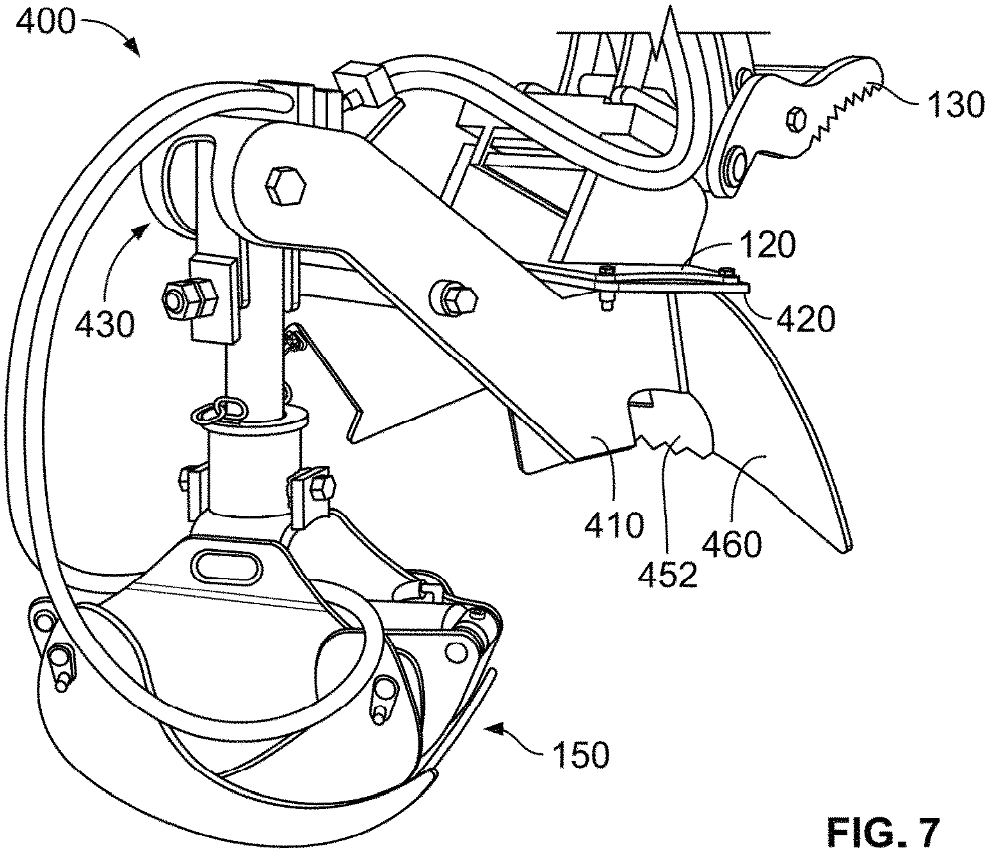
FIG. 7 is a front perspective view of a third preferred grapple-heel rack with vertical wing angle-enabler catches.
Figure 8:
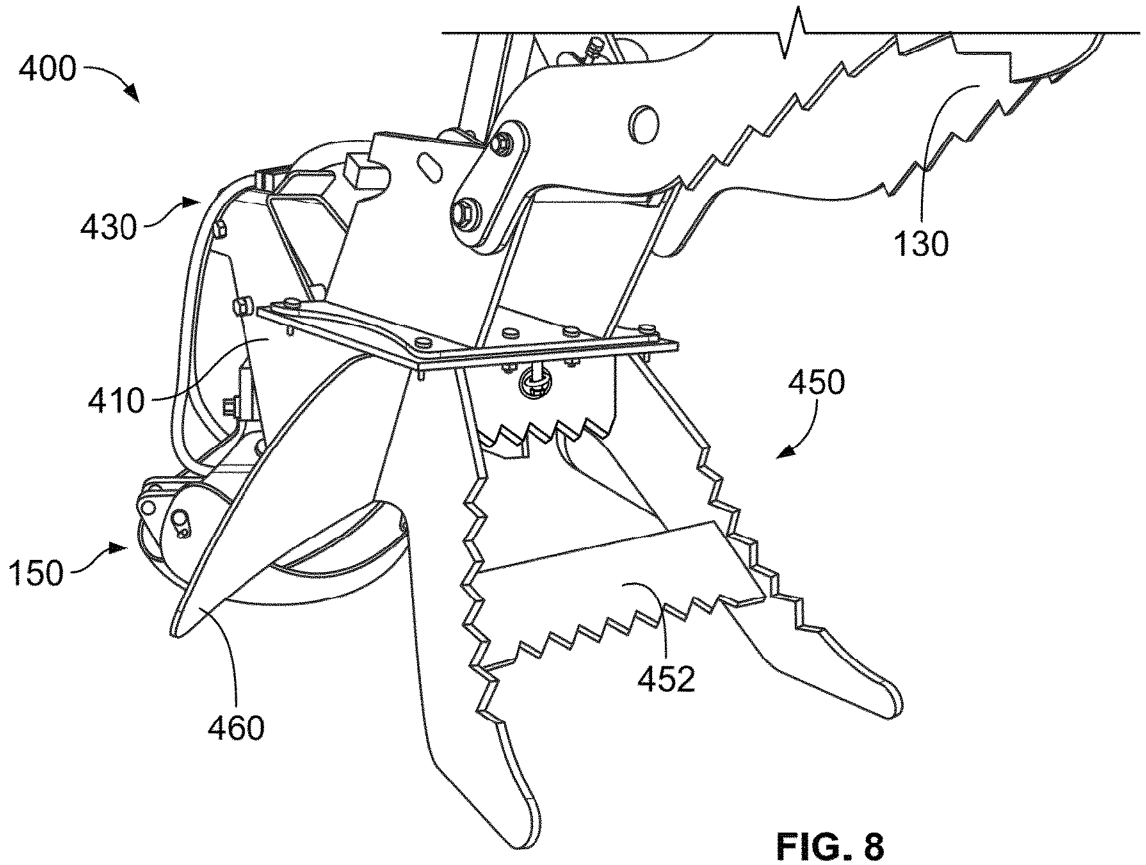
FIG. 8 is a back perspective view of a similar third preferred grapple-heel rack with vertical wing angle-enabler catches.
Figure 9:
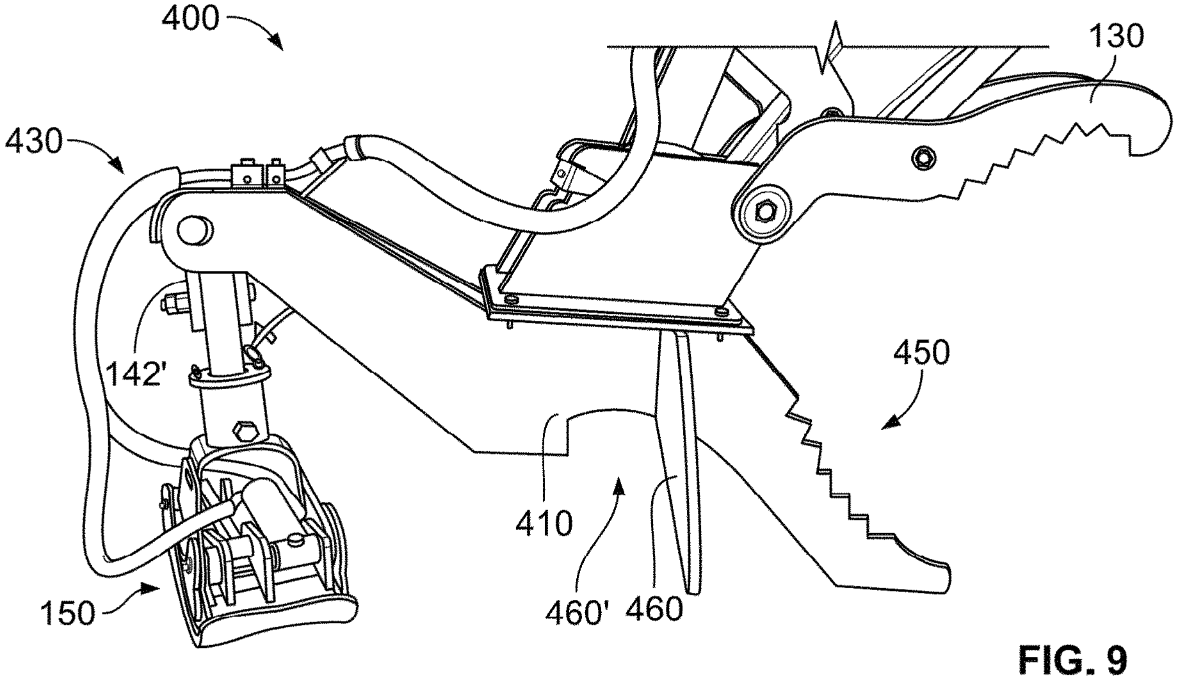
FIG. 9 is a side perspective view of a similar third preferred grapple-heel rack with vertical wing angle-enabler catches.

FIGS. 7-9 show a third preferred grapple-heel rack 400 with vertical wing angle-enabler catches 460. The grapple-heel rack 400 includes a frame that has a nose 430 (front), a heel 450 (the back surface of which is shown as serrated) with at least one heel bar 452 (shown as having a serrated or gripping surface), and side rails 410 (e.g. first and second side rails 410) that span the distance between the nose 430 and the heel 450. A rack/machine connector 420 is shown as associated with the top of the frame (spanning the frame side rails 410). A grapple 150 is shown as associated via a universal joint 125 with the nose 430. This preferred grapple-heel rack 400 has vertical wing angle-enabler catches 460 associated with the frame side rails 410. A respective catch notch 460' (e.g. first catch notch or second catch notch) preferably is formed at the intersection of each side rail 410 and its respective angle-enabler catch 460. Vertical wing angle-enabler catches 460 (and the respective catch notches 460') may also be used in executing an angled-catch hold.

Figure 12:
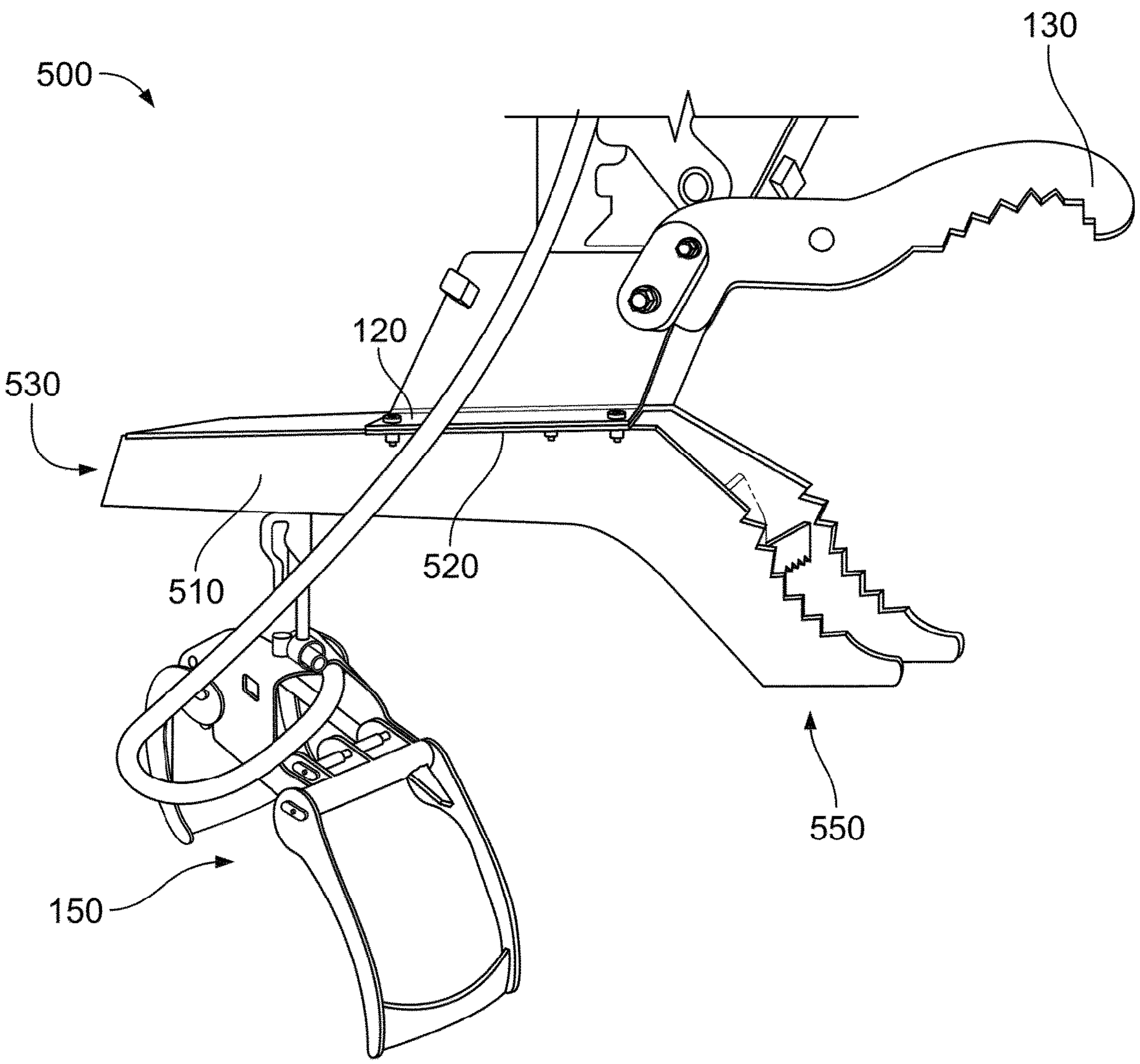
FIG. 12 is a side perspective view of a similar fourth preferred grapple-heel rack.
Figure 13:
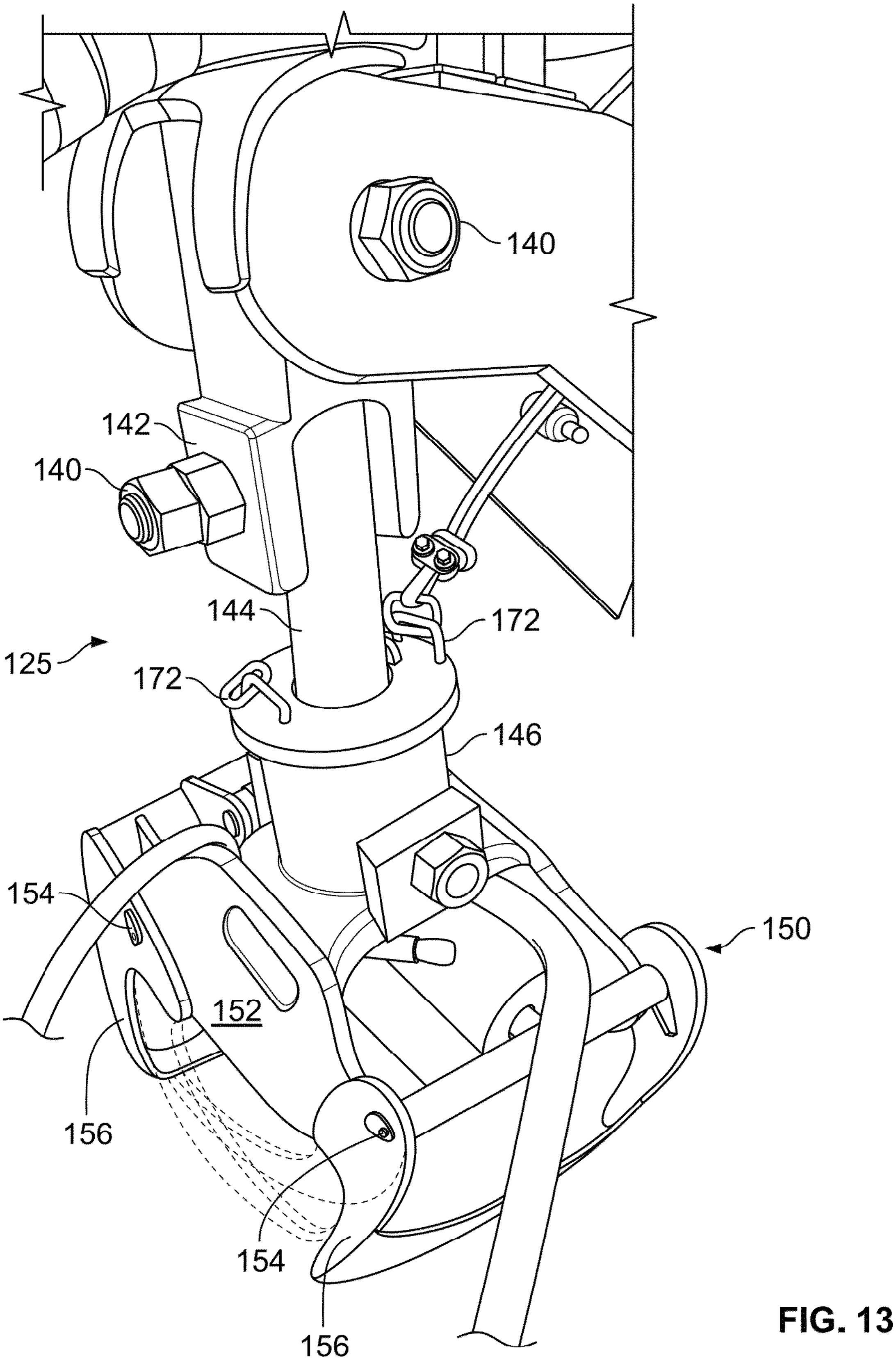
FIG. 13 is a perspective view of an exemplary universal joint and an exemplary grapple in an open position, with a set of arms in dashed lines in a closed position.
Figure 14:
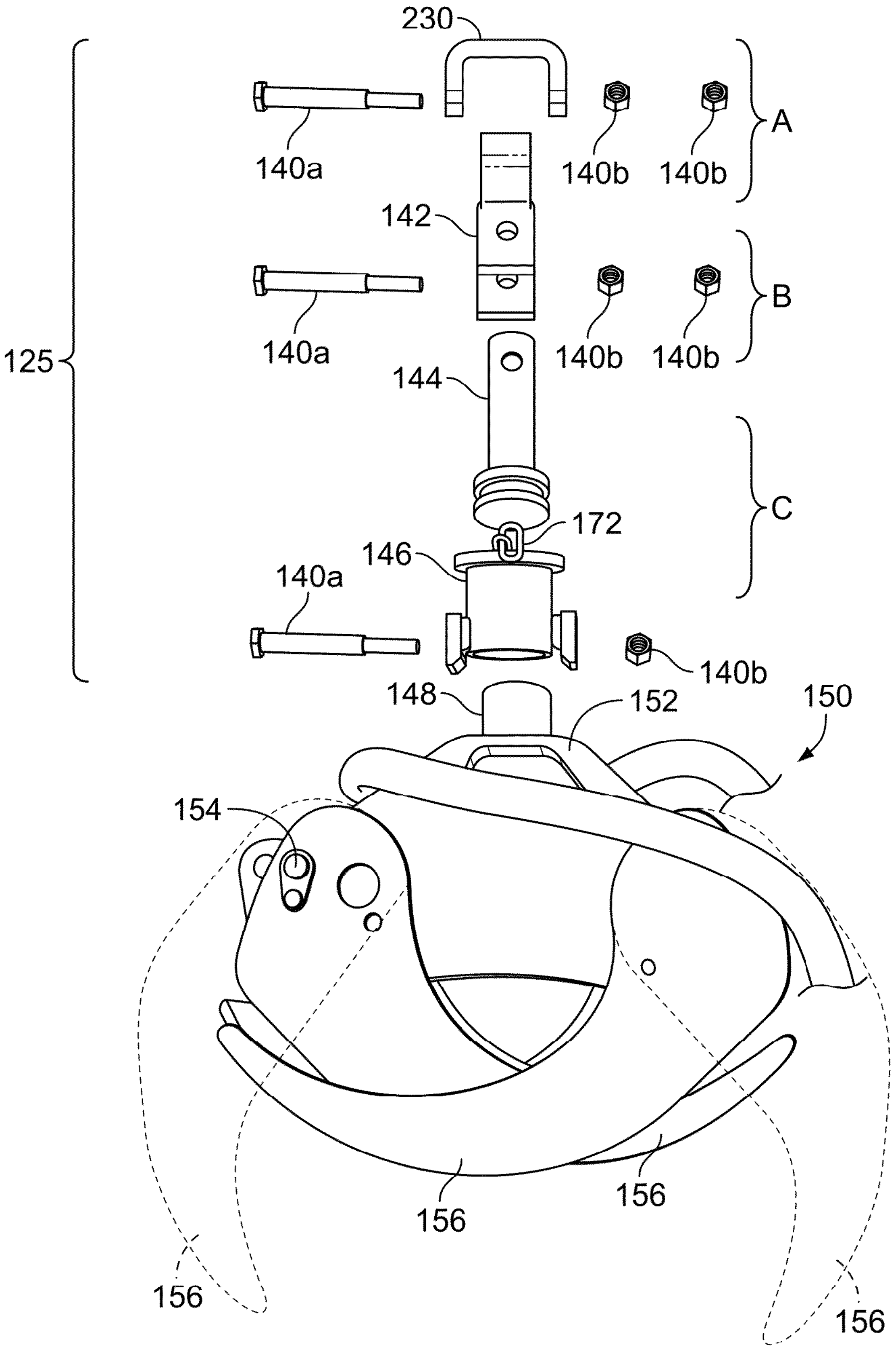
FIG. 14 is a front view of an exploded exemplary universal joint and an exemplary grapple in a closed position, with a set of arms in dashed lines in an open position.

FIGS. 10-12 show a fourth preferred grapple-heel rack 500. The grapple-heel rack 500 includes a frame that has a nose 530 (front), a heel 550 (the back surface of which is shown as serrated) with at least one heel bar 552 (shown as having a serrated or gripping surface), and side rails 510 that span the distance between the nose 530 and the heel 550. One heel bar 552 is shown in phantom to show that it may be optional. A rack/machine connector 520 is shown as associated with the top of the frame (spanning the frame side rails 510). A grapple 150 is shown as associated via a universal joint 125 with the nose 530. FIG. 11 shows an optional heel "rake" feature (that can be used rake) that includes one or more heel prongs 560 attached at spaced intervals along the heel bar 552. The shown optional heel prongs 560 are shown as being attached perpendicular to the heel bar 552 and having a serrated back edge. Alternatively, the heel prongs 560 could be attached parallel to and flush with the heel bar 552. The heel prongs 560 may be attached using known and yet to be discovered methods, at least some of which are temporary (in which the heel prongs 560 may be removed and replaced either individually or as a group). Heel prongs 560 may be used with other grapple-heel racks including grapple-heel racks 200, 300, 400, 600.

Figure 25:
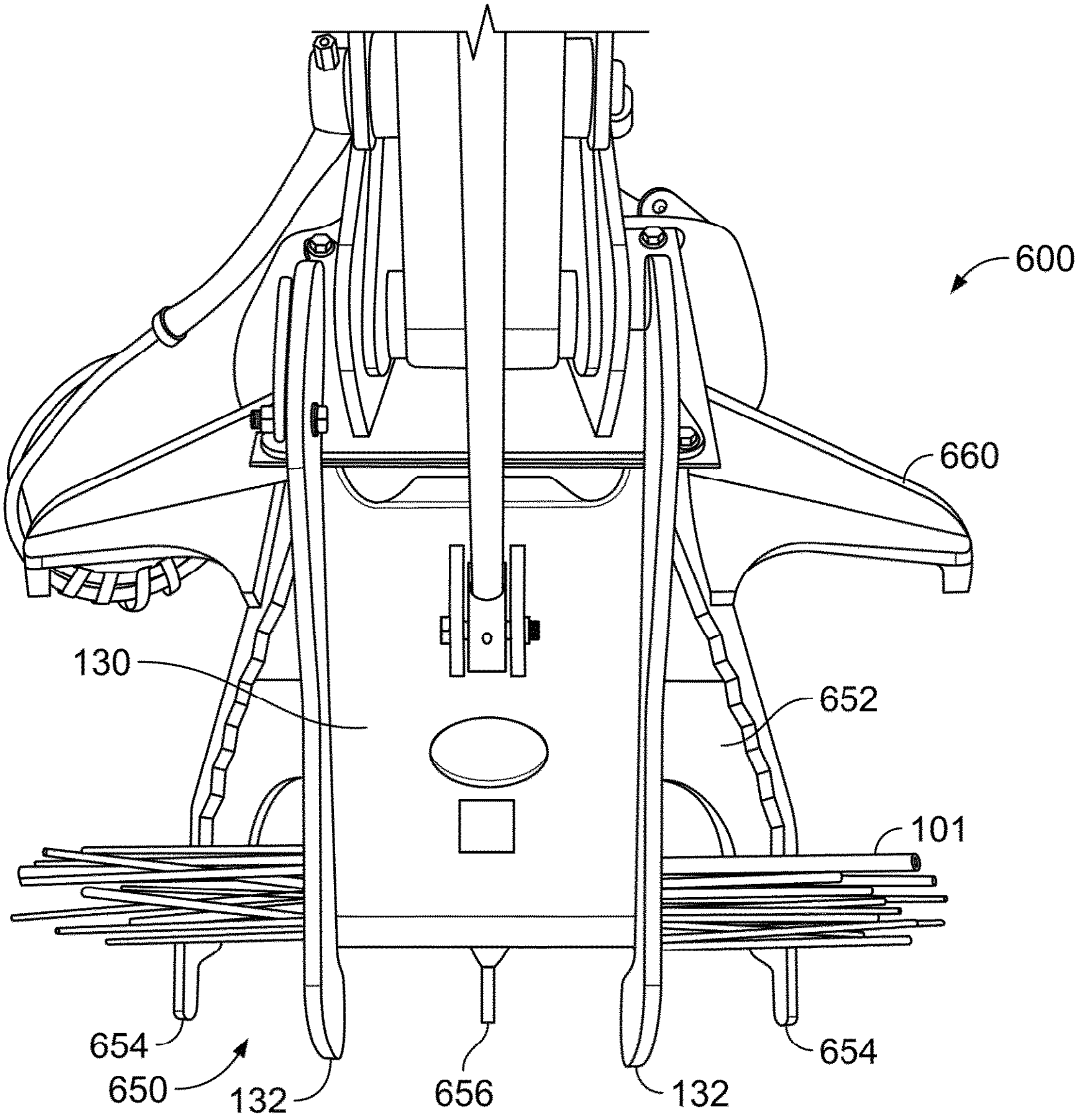
FIG. 25 is a back perspective view of an exemplary grapple-heel rack holding or carrying a load (shown as a bundle of sticks) using a thumb-heel hold.
Figure 26:
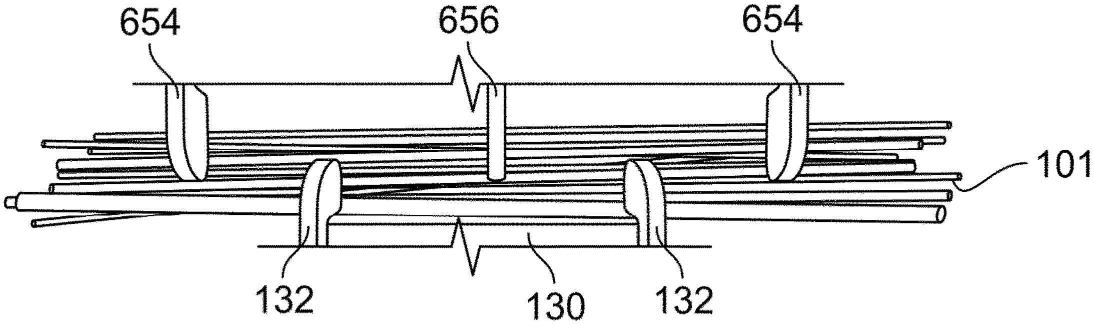
FIG. 26 is a plan view looking up at the interleaved heel prongs and thumb prongs.
Figure 30:
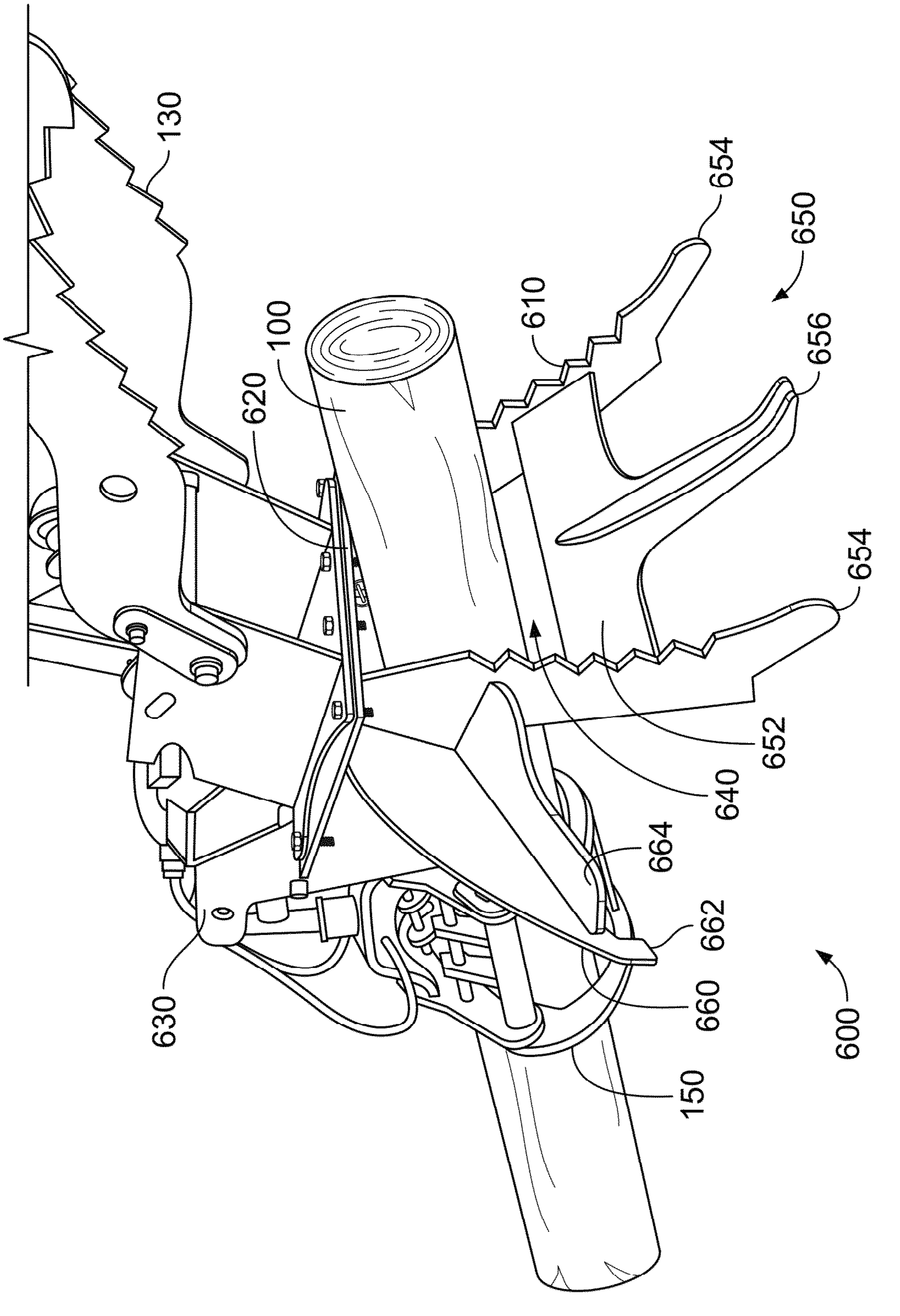
FIG. 30 is a side perspective view of an exemplary grapple-heel rack using a grapple-corral hold, the grapple-heel rack having a corral defined between the side rails, rack/machine connector, and the heel bar.
Figure 31:
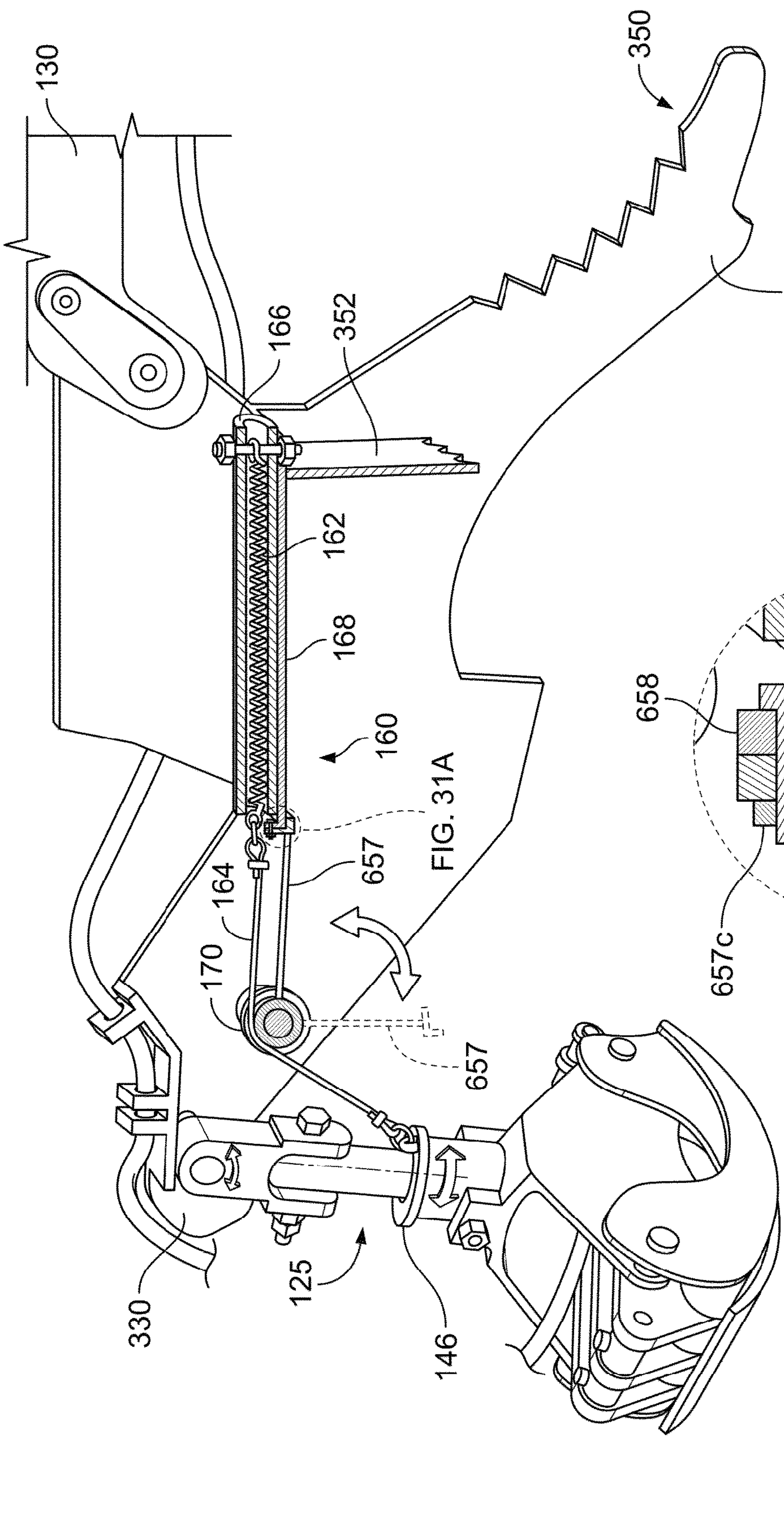
FIG. 31 is a side view of an exemplary grapple-heel rack with one side rail removed to show the internal workings of the grapple brace system, an exemplary grapple brace shown in a stored position (solid) and a mid-way position (dashed), and the grapple hanging in a neutral position.
Figure 31A:
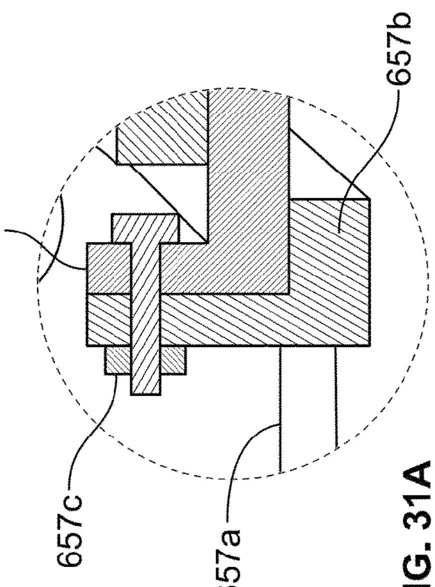
FIG. 31A is a partial enlargement taken from FIG. 31 showing the grapple brace in the stored position with the fastener held to a brace storage fastening structure using a removable and replaceable fastener.
Figure 32:
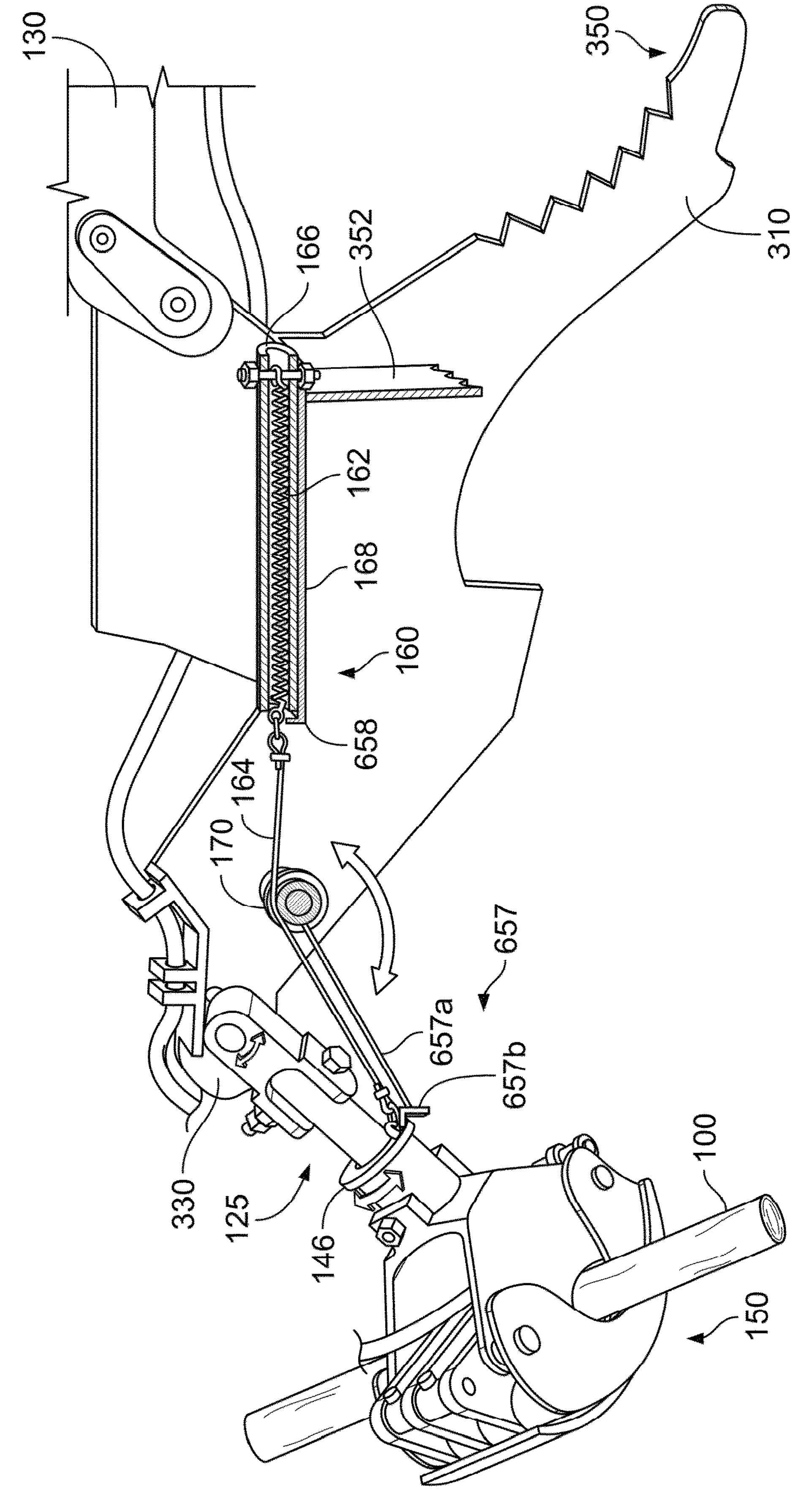
FIG. 32 is a side view of an exemplary grapple-heel rack with one side rail removed to show the internal workings of the grapple brace system, the exemplary grapple brace shown in a bracing position holding the grapple in a braced extended position that would be used in a braced grapple hold.
Figure 33:
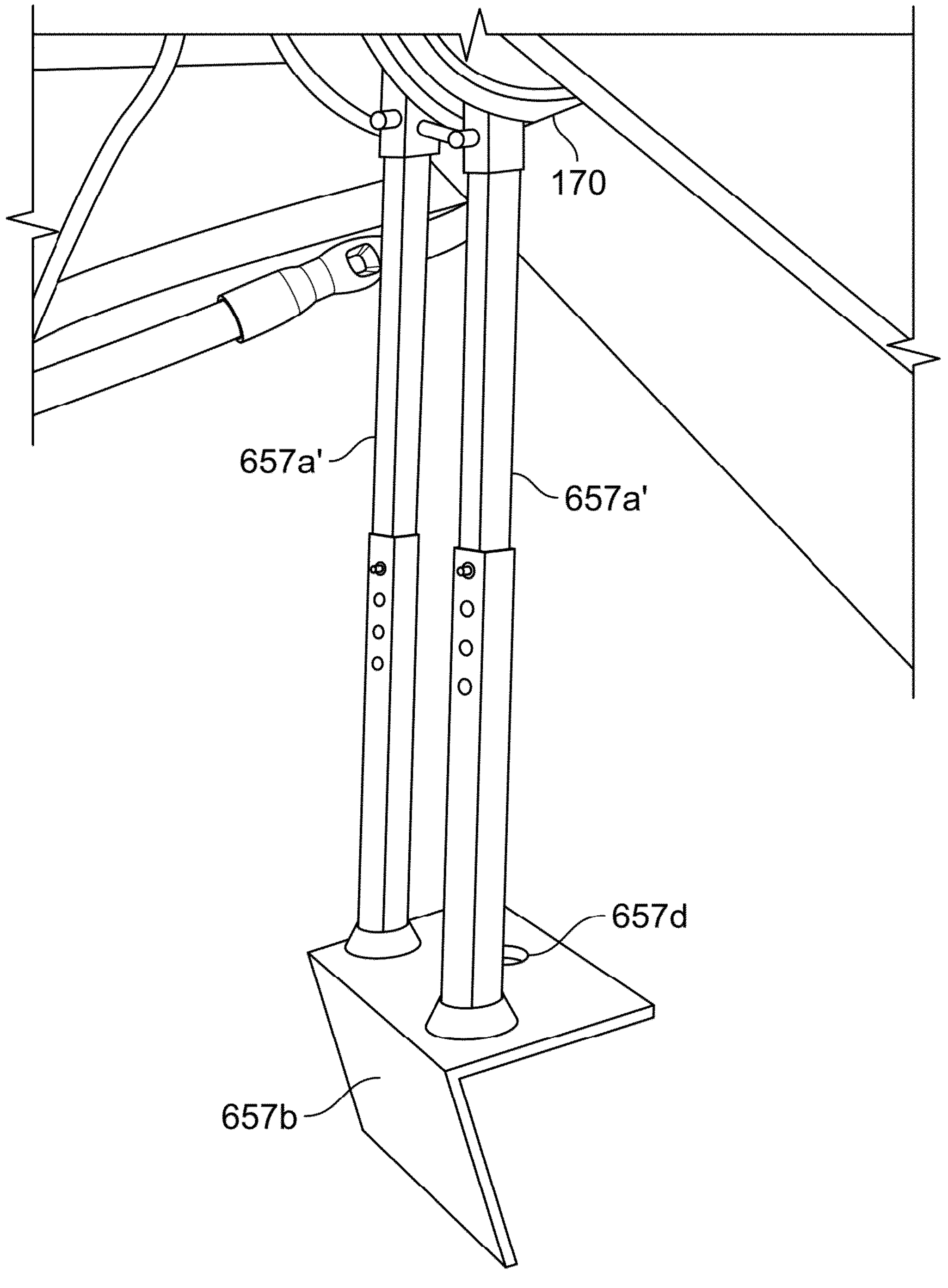
FIG. 33 is an enlarged perspective view of the exemplary grapple brace having a length-adjustable alternative brace rod.
Figure 37:
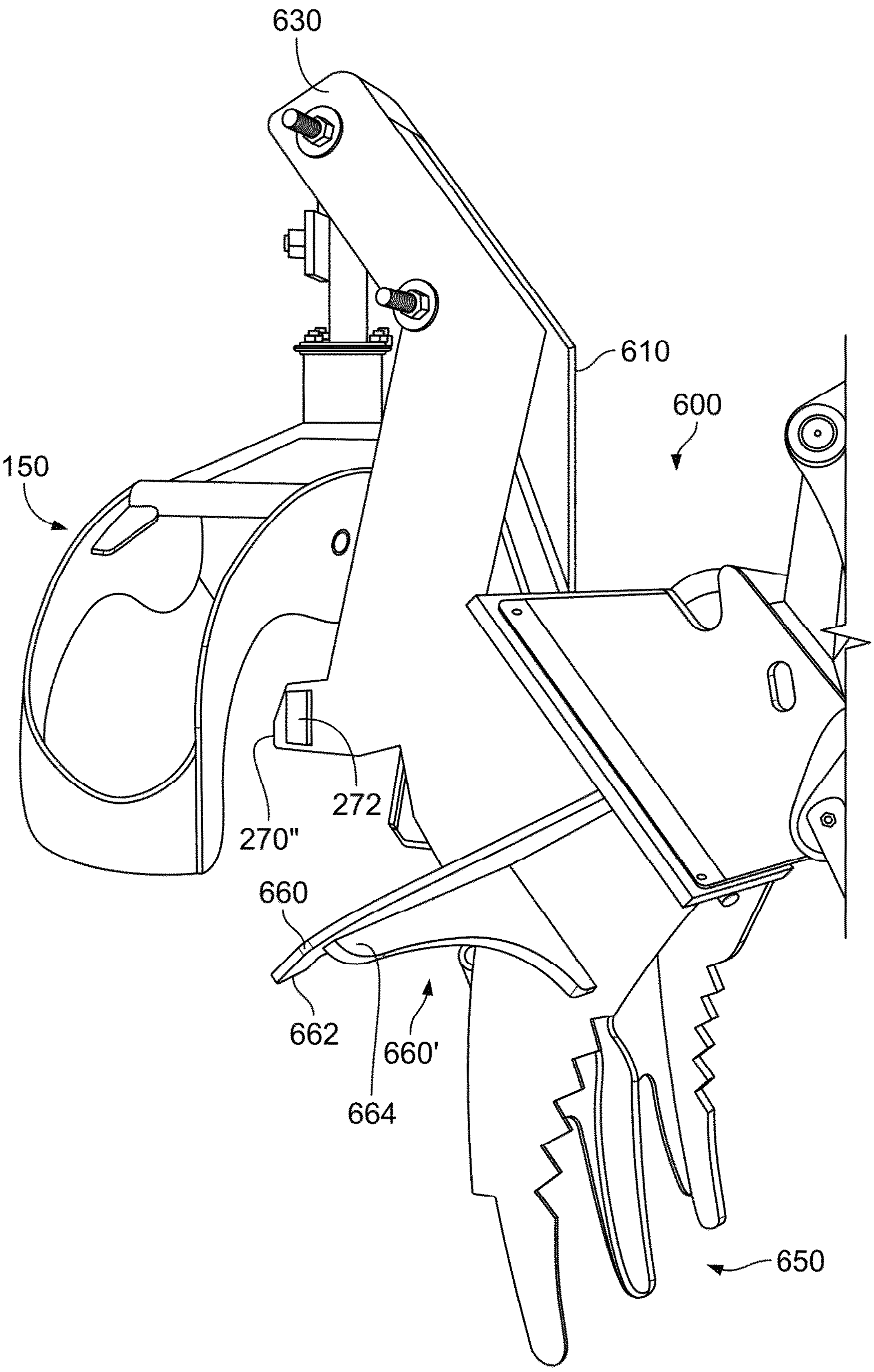
FIG. 37 is a side perspective view of an exemplary grapple-heel rack having an exemplary alternative optional forward storage sub-rack for storing an exemplary grapple in a storage hold when the grapple-heel rack is in an at least substantially vertical position, the grapple in an open position prior to gripping the storage sub-rack.
Figure 38:
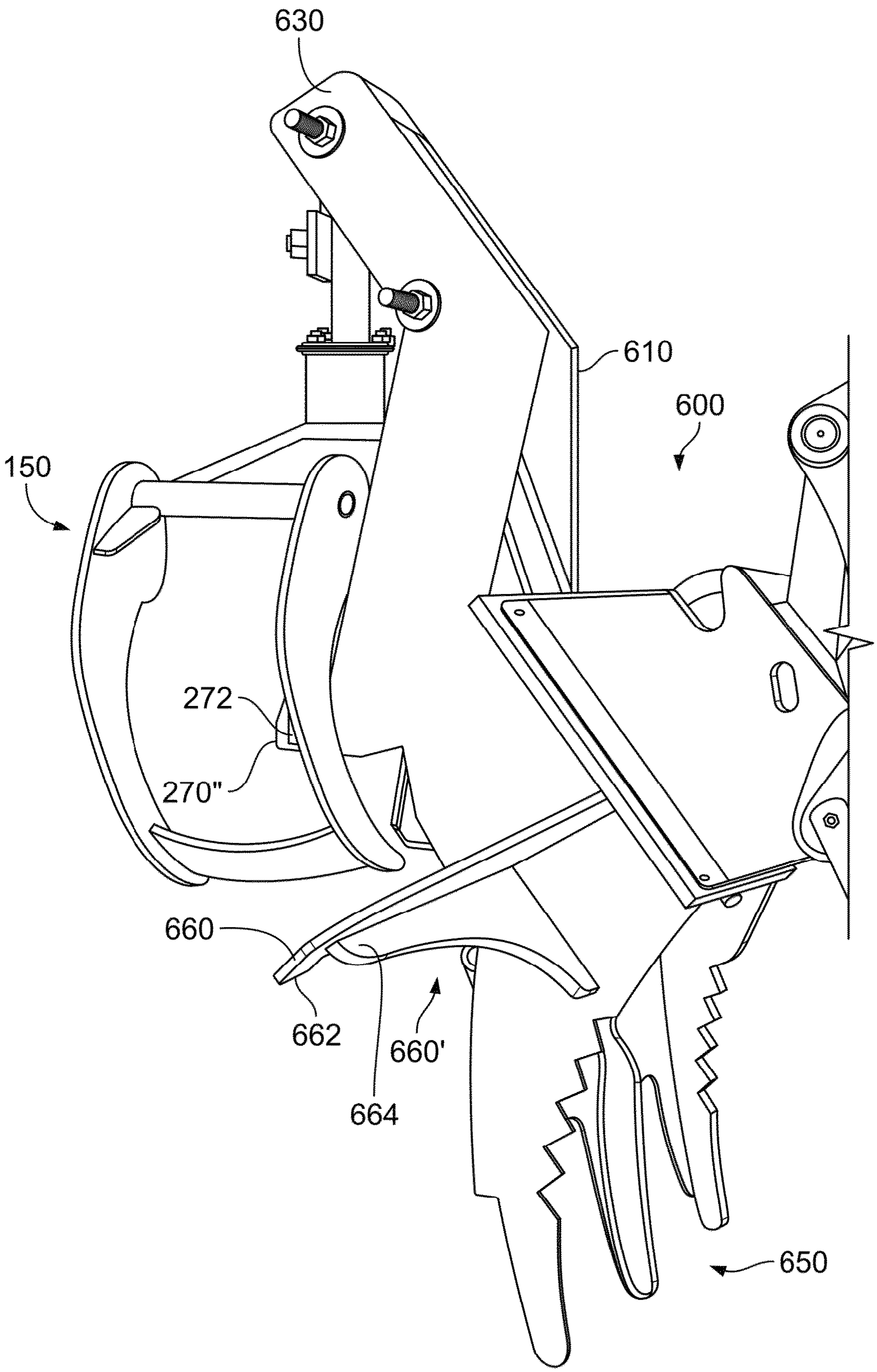
FIG. 38 is a side perspective view of an exemplary grapple-heel rack having an exemplary alternative optional forward storage sub-rack for storing an exemplary grapple in a storage hold when the grapple-heel rack is in an at least substantially vertical position, the grapple in a closed position gripping the storage sub-rack.

FIGS. 25, 30, 37-38, and 40-43 show a fifth preferred grapple-heel rack 600. This grapple-heel rack 600 has several unique features. First, as shown in FIGS. 25-26, the heel 650 (including the heel bar 652) is shown as including three prongs (two outer heel prongs 654 and a central heel prong 656). When the thumb 130 and heel 650 come together, these three heel prongs 654, 656 preferably interleave with the thumb prongs 132 of the thumb 130. This interleaving may make it easier to carry light, delicate, and/or thin loads 101. Second, as shown in FIG. 30, the space defined by the side rails 610, rack/machine connector 620, and the heel bar 652 creates a "corral" 640 that can be used in a grapple-corral hold. Third, as shown in FIGS. 31-33, a grapple brace 657 (which includes a brace rod 657*a* and a fastener 657*b*) may be included. The brace rod 657*a* preferably has a brace pivot end and a fastener end. The at least one brace rod 657*a* may be removable and replaceable so that rods of different length may be used. The brace rod(s) may be at least one alternative brace rod 657*a*' (FIG. 33) that is length-adjustable (e.g. telescoping). The pivot end may be pivotally associated or associable with the pulley 170 or other pivot point on the grapple-heel rack 600 or the frame thereof. In a stored position shown in FIG. 31 and FIG. 31A, the fastener end (which may include or be associated with a removable and replaceable fastener 657*b*) is preferably fastenable to brace storage fastening structure 658 (e.g. a fixed point associated with the grapple-heel rack 600 such as the protection tube 168 or structure at least near the protection tube 168). At least one fastening device 657*c* (e.g. a nut and bolt, at least one hairpin connector, at least one clamp, at least one hook, or at least one magnet (e.g. an electro-mechanical magnet that is remotely operable from the operator station 112)) is preferably used to fasten the fastener end to the brace storage fastening structure 658. The shown nut and bolt fastening device 657*c* may be inserted through an aperture 657*d* in the fastener 657*b* (FIG. 33) and a corresponding aperture in the brace storage fastening structure 658. All or part of the fastening device 657*c* (and/or the aperture 657*d*) may be integral with the fastener 657*b* and/or the fastening structure 658. The grapple brace 657 rotates about the pivot point (e.g. pulley 170) through an intermediary position (shown in dashed lines in FIG. 31) to a braced position as shown in FIG. 32. In the braced position (which may be one of several pre-determined braced positions including the position of FIG. 32), the fastener 657*b* is preferably fastenable directly or indirectly to the grapple 150 (shown as being fastened to the third segment 146 of the universal joint 125). In a braced position, the grapple 150 is held in a particular (usually extended) position that can be useful. Fourth, as shown in FIGS. 30, 37, and 38, angle-enabler catches 660 are shown as having bent or hooked tips 662 to prevent the load 100 from escaping when using a catch hold. In addition, the angle-enabler catches 660 are shown as having respective support gussets 664 that strengthen the angle-enabler catches 660. Some or all of these features may be incorporated in other grapple-heel racks including grapple-heel racks 200, 300, 400, 500.

Universal Joint

The grapple 150 is preferably suspended from the grapple-heel rack nose via a universal joint 125 (which is one preferred type of grapple attachment). FIGS. 13-20 show various aspects of the universal joint 125. It should be noted that one preferred feature of the universal joint 125 is that the segments (e.g. first segment 142, second segment 144, and third segment 146) may be removable and replaceable. This allows for replacement of worn parts. In addition, this allows alterative segments to be used for different purposes. For example, if the universal joint needed to be longer/shorter, any or all of the segments could be exchanged for longer/shorter segments. Similarly, segments could be exchanged for segments that are heavier/lighter, made of alternative materials, or otherwise designed for specific purposes.

Figure 18:
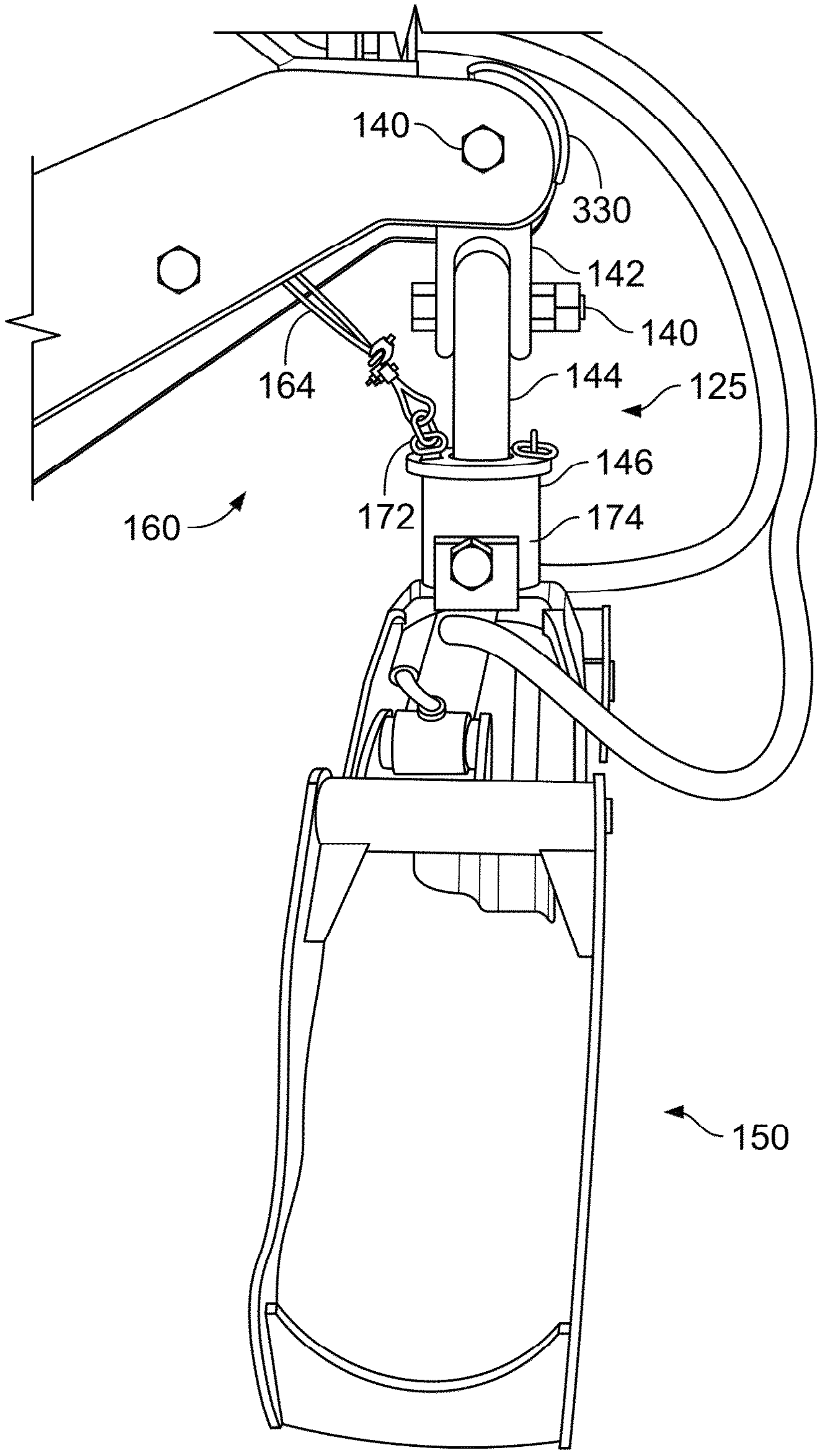
FIG. 18 is a side view of an exemplary grapple of an exemplary grapple-heel rack having a grapple return system, the grapple rotated 0 degrees from neutral (0 degree rotation or neutral).
Figure 19:
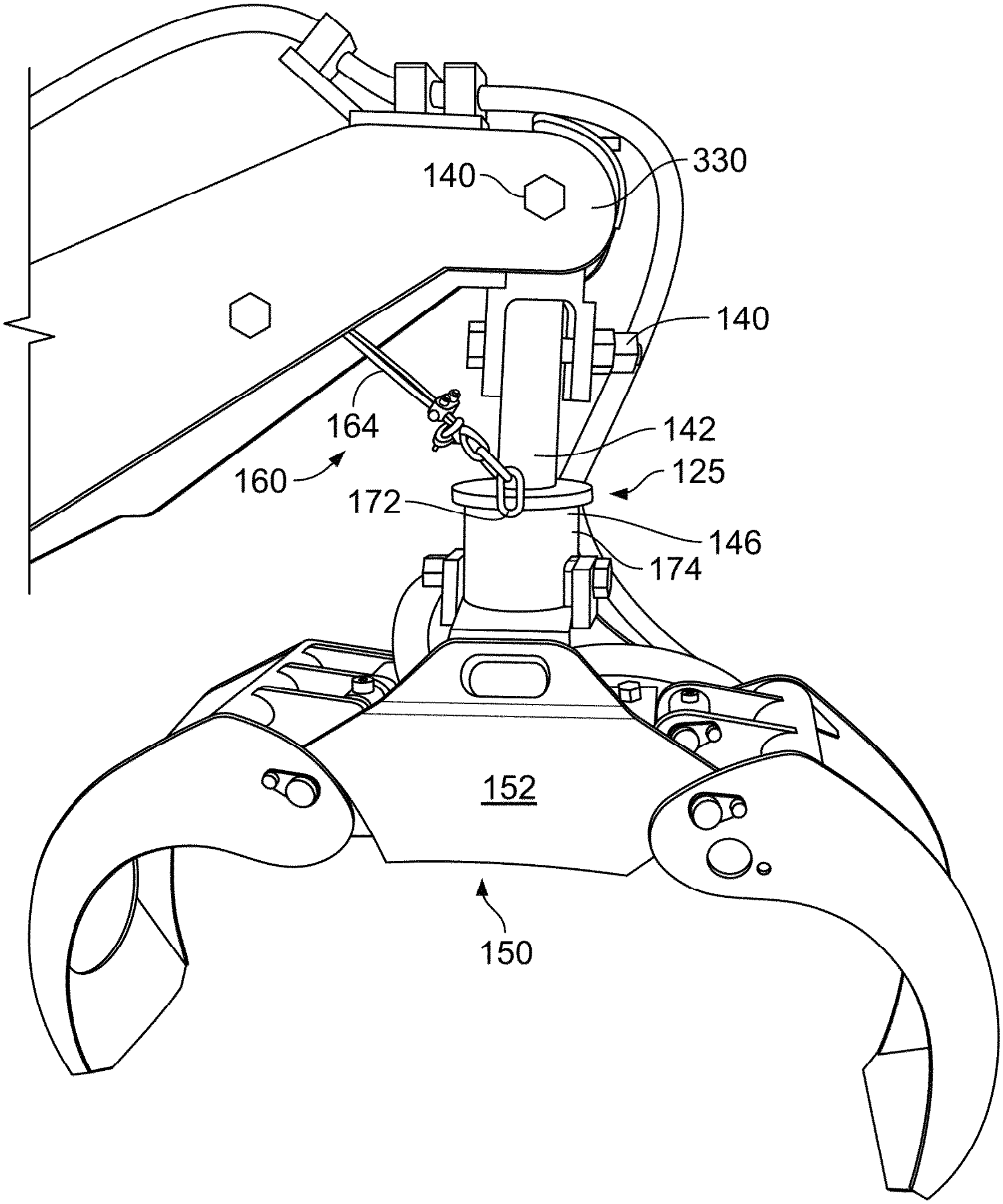
FIG. 19 is a side view of an exemplary grapple of an exemplary grapple-heel rack having a grapple return system, the grapple rotated 90 degrees from neutral (90 degree rotation).
Figure 20:
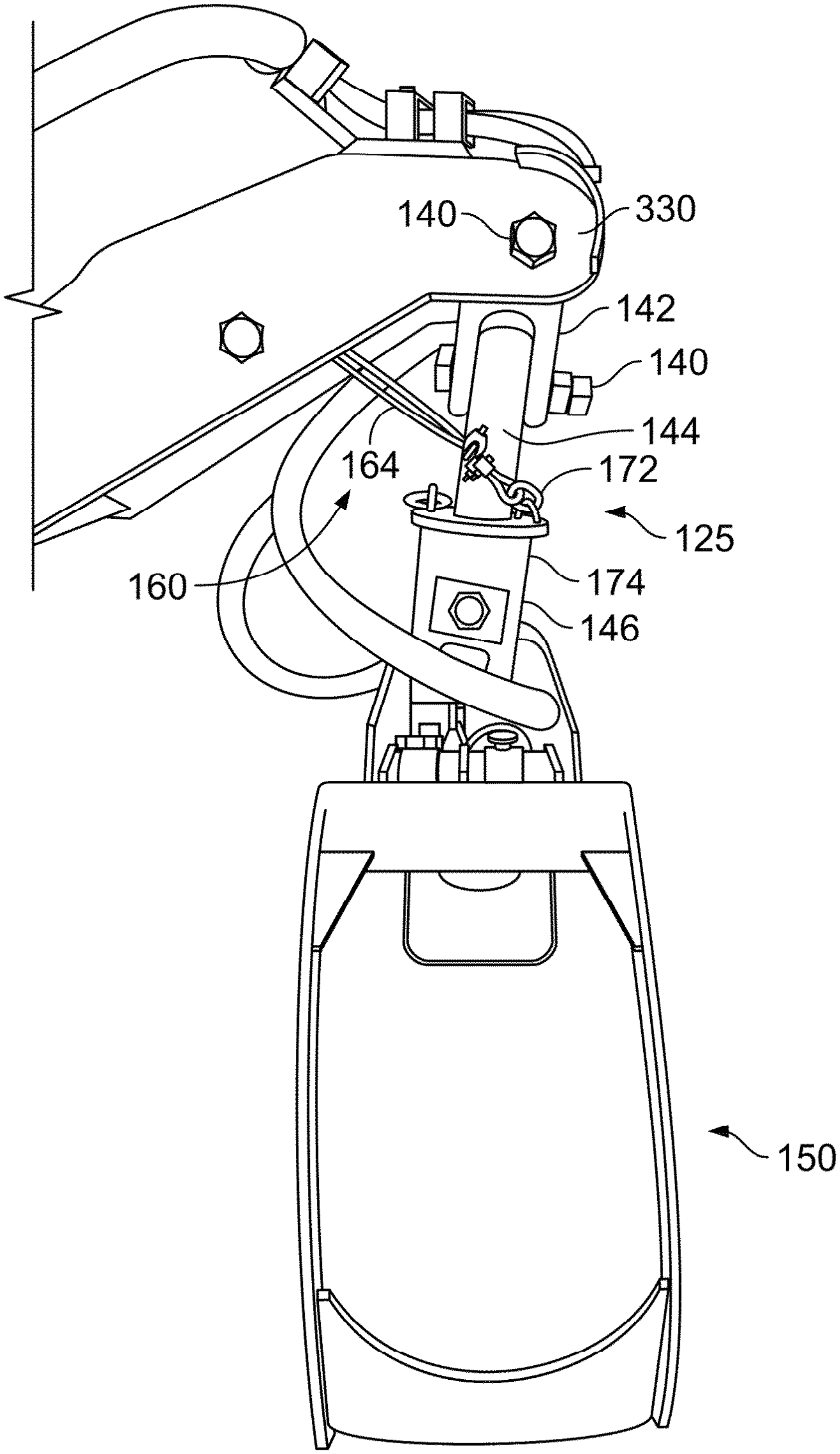
FIG. 20 is a side view of an exemplary grapple of an exemplary grapple-heel rack having a grapple return system, the grapple rotated 180 degrees from neutral (180 degree rotation).

There are three basic movements of the shown universal joint 125: front-to-back movement A (FIG. 15); side-to-side movement B (FIG. 16), and clockwise-counterclockwise rotational movement C (FIGS. 18-20). The front-to-back movement A and side-to-side movement B are facilitated by pivot-like connectors 140 that are shown (e.g. in FIG. 14) as being implemented by a bolt 140*a* and at least one nut 140*b*. The bolt 140*a* and nut(s) 140*b* represent any securable pin or other pivot connection mechanism that creates, provides, and/or allows pivot-like motion.

The motion (front-to-back movement A, side-to-side movement B, and clockwise-counterclockwise rotational movement C) may be initiated by manipulating the boom support rapidly to get the grapple 150 to swing. In addition, the grapple 150 may be leveraged by an outside obstacle (e.g. a load 100, a rock, a tree trunk, or just the ground) such that the grapple 150 is held (or substantially held) in place while the boom support is manipulated. When the leverage is removed, the grapple 150 moves (e.g. swings or rotates). An example of this would be while the grapple 150 is dragging a heavy load 100, the load serves as leverage that slows the movement of the grapple 150 relative to the boom support and position/orientation of the excavator. Even without the grapple return system 160 (discussed herein), the grapple 150 could move independently if the load 100 is dropped, swung, dragged, and/or lifted.

Figure 15:
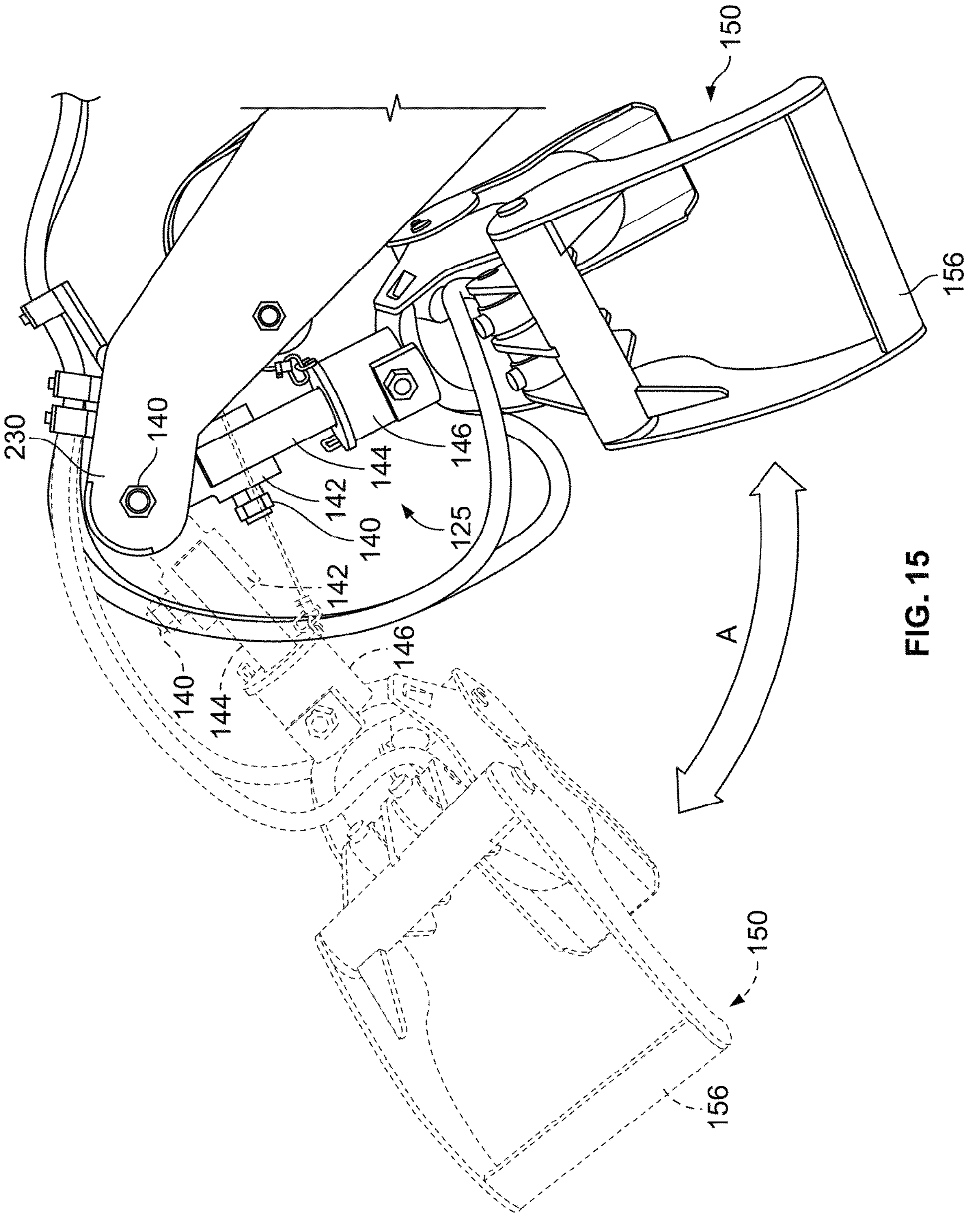
FIG. 15 is a side view showing front-to-back movement of an exemplary grapple in an open position, the grapple shown swung to the back (toward the manipulation machine) in solid lines and swung to the front (away from the manipulation machine) in dashed lines.

FIG. 15 shows the front-to-back movement A of an exemplary grapple 150. The front-to-back movement A is facilitated by a first pivot-like connector 140 (also shown in FIG. 14 as being implemented with a bolt and a nut 140*a*, 140*b*) between a nose 230, 330, 430, 530, 630 of a grapple-heel rack and a first segment 142 of the universal joint 125 (which, unless otherwise specified, may be substituted with alternative first segment 142' (FIG. 9) having uniformly thick legs/sides). The first pivot-like connector 140 (the "nose connector") also preferably acts as a grapple support pin. The nose preferably has a passageway (e.g. a hole near the nose in each of the side rails) therethrough. The first segment 142 may have an enclosed (e.g. square pipe or tube) upper section with a passageway therethrough and a generally upside-down U-shaped lower section with passageways defined through the "legs" of the "U." The lower section may have side extensions that serve as protection. Using the shown configuration of the first segment 142 (including the square tube and the side extensions) has advantages including being structurally stable, rigid, and almost indestructible. A bolt 140*a* passes through the passageways in the nose and the upper section of the first segment. The bolt 140*a* may be secured by the nut 140*b*. This configuration functions as a pivot between the nose and the first segment 142. Wear plates (such as those shown in FIGS. 1 and 7) between the exterior of the sides/legs and the interior of the connector 140 may be used to protect the sides/legs from wear or other injury.

Figure 16:
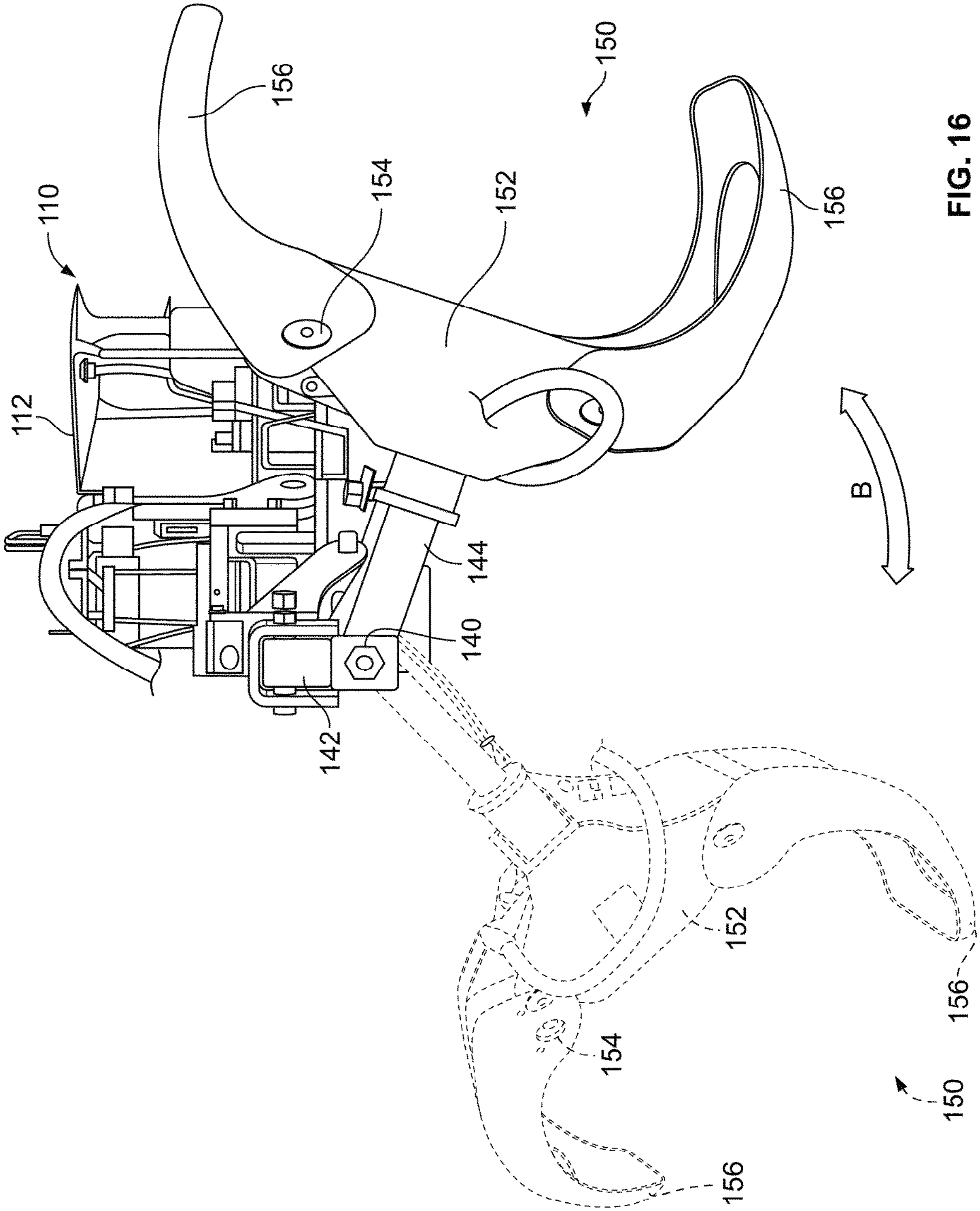
FIG. 16 is a front view showing side-to-side movement of an exemplary grapple in an open position, the grapple shown swung to a first side in solid lines and swung to a second side in dashed lines.

FIG. 16 shows the side-to-side movement B of an exemplary grapple 150. The side-to-side movement B is facilitated by a second pivot-like connection (shown also as being implemented with a bolt and nuts 140*a*, 140*b*) between the first segment 142 of the universal joint 125 and a second segment 144 of the universal joint 125. Although it is difficult to see in the figures, the second pivot-like connection 140 is shown as perpendicular to the first pivot-like connection 140. As mentioned, the first segment 142 may have an enclosed (e.g. square pipe or tube) upper section with a passageway therethrough and a generally upside-down U-shaped lower section with passageways defined through the "legs" of the "U." The second segment 144 may have an upper section with a passageway therethrough and disk-like lower section. A bolt 140*a* passes through the passageways in the lower section of the first segment and the upper section of the second segment. The bolt 140*a* is shown as being secured by two nuts 140*b*. This configuration functions as a pivot between the first segment 142 and the second segment 144.

Figure 17:
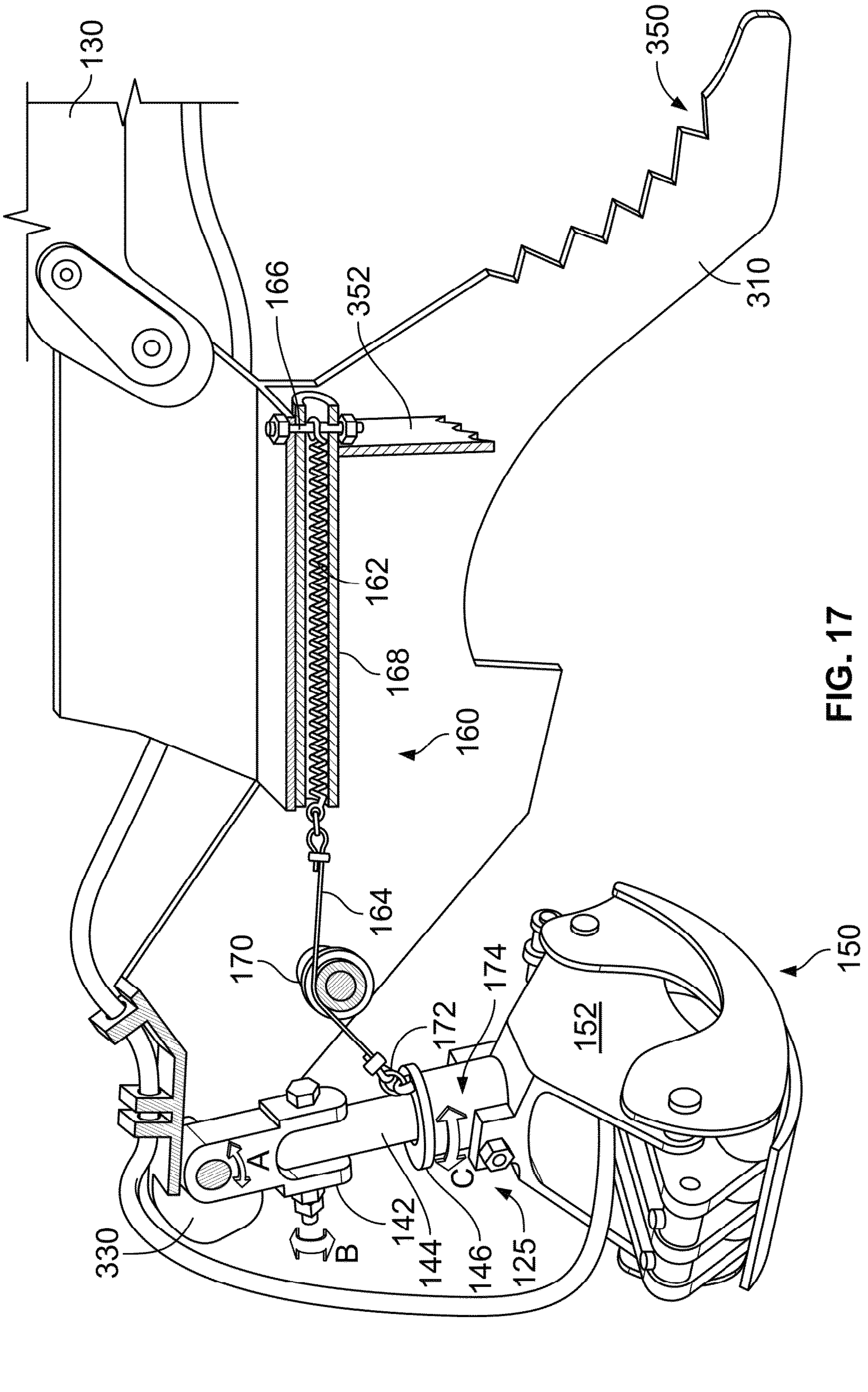
FIG. 17 is a side view of an exemplary grapple-heel rack with one side rail removed to show the internal workings of the grapple return system.

FIGS. 18-20 show clockwise-counterclockwise rotational movement C of an exemplary grapple 150 about an axis of rotation. The clockwise-counterclockwise rotational movement is facilitated by a rotating socket connection between the second segment 144 of the universal joint 125 and a third segment 146 of the universal joint 125. (The axis of rotation (shown as a dashed-dot line in FIG. 31) can be thought of as a centrally located longitudinal axis of the second segment 144 and/or the third segment 146.) More specifically, the disk-like lower section (shown as a double disk) of the second segment 144 is positioned within a socket-like upper section of the third segment 146 to create a rotating socket connection (also referred to as a rotating pivot point 174 which is shown in FIG. 17). An exemplary socket-like upper section may be tubular with an O-shaped lid (which could also be described as an annular inward lip around the upper periphery of the tube). The upper section of the second segment 144 is inserted through the opening of the O-shaped lid until the upper surface of the disk-like lower section of the second segment 144 substantially meets with the lower surface of the O-shaped lid. This creates the rotating pivot point 174. The rotating pivot point 174 preferably allows rotation of the grapple 150 by at least 180 degrees about the axis of rotation in either direction.

The third segment 146 of the universal joint 125 is shown as associated with a connection member 148 (see FIG. 14) of the grapple 150. This connection may be secured using a connector 140 (shown as a bolt 140*a* and a nut 140*b*). (Because of the shape of other components it connects, this connector 140 may not function as a pivot.) On the other hand, the universal joint 125 and the grapple may be connected using any known or yet to be discovered connection method that would be suitable to provide a durable (i.e. able to withstand the forces of the grapple in use) connection. (The connector 140 also prevents downward vertical movement between the disk-like lower section of the second segment 144 within the socket-like upper section of the third segment 146.) Once secured, preferably there would be no movement between the third segment 146 of the universal joint 125 and the connection member 148 of the grapple 150.

In addition to the shown universal joint 125 and a hydraulic rotator (not shown), other types of universal joints could be used or adapted to be used with the grapple-heel manipulation system described herein. For example, U.S. Pat. No. 8,333,526 to Long is directed to a three degree of freedom universal joint. U.S. Pat. No. 2,813,409 to Wolcott is directed to a universal coupling. Assuming sufficient durability, these and other known and yet to be discovered universal joints or other structures that can perform the functions described herein may be used as a universal joint.

Although the shown universal joint 125 is one preferred type of grapple attachment, alternative grapple attachments are possible. These alternative grapple attachments may have advantages and/or disadvantages over the shown universal joint. For example, a ball joint (or variations thereof) or a constant-velocity joint (or variations thereof) could be used as alternative grapple attachments. The grapple attachment may be the shown universal joint or may be alternative universal joints such as a Cardan joint, a Spicer or Hardy Spicer joint, or a Hooke's joint.

Grapple Return System

The grapple return system 160 causes the grapple 150 to transition (rotate or pivot) to return to a neutral position after it transitions away from the neutral position. (The neutral position may be or may be thought of as the original position, the starting position, or 0 degree rotation.) Although the grapple-heel rack described herein may be used with a hydraulic rotator, the grapple return system 160 shown in FIG. 17 (and partially in FIGS. 18-20) provides a mechanical solution (a mechanical grapple return system 160) that allows the grapple 150 to return to its neutral position from any non-neutral position. Mechanical return systems have the advantage over powered return systems because they are more reliable and because they do not require additional hydraulic circuits, operation switches, or toggle controls (which are limited in many manipulation machines 110, although additional circuits, switches, or controls can be added at an owner's expense).

FIG. 17 shows an exemplary grapple-heel rack 300 (although any of the grapple-heel racks could be used) with one side rail 310 removed to show the internal workings of the grapple return system 160. The grapple return system 160 may include an expandable/contractible member 162 (e.g. a spring or bungee) having a heel end and a nose end, a flexible member 164 (e.g. a chain, cable, or wire) having a heel end and a nose end, a heel end fixer 166 (shown as a bolt at or near the heel bar 352), a protection tube 168, a pulley 170, and at least one universal joint link or grapple link 172 (or other connecting device associated with the universal joint or grapple) that, in turn, may be associated with the rotating pivot point 174 (although it could be associated with the hinge body 152 of the grapple 150). At least one extra universal joint link or grapple link 172 (or other connecting device) may be included as backup in case the original link 172 is damaged or disconnected. It is possible for the heel and nose ends to be identical. The heel and nose ends, the heel end fixer 166, and/or the link 172 may have or include holes, loops, hooks, rings, and/or standard connectors to help facilitate connections. The expandable/contractible member 162 and the flexible member 164 may be a single component if the material from which the single component is made can function as a component of the grapple return system 160 as described herein. A simplified grapple return system 160 could include a single expandable/contractible/flexible member connected at one end to the grapple-heel rack (e.g. at or near the heel bar 352) and at the other end to the rotating pivot point 174 (or to the grapple 150 itself).

Preferably, the grapple return system 160 is positioned at a location offset from the axis of rotation of the grapple and/or universal joint. For example, in the shown preferred exemplary grapple return system 160, the shown heel end of the expandable/contractible member 162 is associated with the heel end fixer 166 to fix the expandable/contractible member heel end in a position relative to the frame. The nose end of the expandable/contractible member 162 is associated with the heel end of the flexible member 164. The nose end of the flexible member 164 is connected to the link 172 that, in turn, is shown as associated with the universal joint (e.g. the rotating pivot point 174) or grapple (e.g. the hinge body 152). The expandable/contractible member 162 is preferably threaded through and protected by the protection tube 168. The flexible member 164 preferably runs forward and backward over the pulley 170.

As the grapple 150 turns (e.g. rotates about an axis of rotation such as the one shown as the dashed-dot line in FIG. 31), the rotation of the grapple pulls the flexible member 164 and the expandable/contractible member 162, which causes the expandable/contractible member 162 to expand. This adds tension (a "stored" return force) that, when released (when the expandable/contractible member 162 contracts), causes (by exerting the return force) the grapple 150 to rotate (about the axis of rotation) or pivot to return to its neutral position. In practice, the grapple may return to the neutral position between loads 100. The grapple return system 160 also restricts the grapple 150 from over-rotating on the pivot point 174 (FIG. 17).

FIGS. 18-20 show three snapshots of a grapple 150 being rotated by a grapple return system 160. FIG. 18 shows the grapple 150 in a neutral position (0 degree rotation). At this point, the nose end of the flexible member 164 that is attached to the link 172 is untwisted. FIG. 19 shows the grapple 150 rotated 90 degrees from neutral (90 degree rotation—an exemplary non-neutral position). At this point, the nose end of the flexible member 164 that is attached to the link 172 is partially twisted. FIG. 20 shows the grapple 150 rotated 180 degrees from neutral (180 degree rotation—an exemplary non-neutral position). At this point, the nose end of the flexible member 164 that is attached to the link 172 is twisted so that it crosses over the universal joint 125. If at any point during this rotation the grapple is released from whatever force is causing it to rotate, the expandable/contractible member 162 would pull and cause the rotation to reverse and the grapple 150 will return to the neutral position of FIG. 18.

Another way to describe a preferred mechanical grapple return system that could be used with grapple-heel racks is that the grapple may be pivotable about an axis of rotation. The mechanical return system may be arranged to exert a return force on one of the grapple and the grapple attachment (which may be a universal connector) at a location offset from the axis of rotation so that the exerted force causes the grapple to rotate about the axis of rotation.

Positions and Holds

The exemplary grapple-heel racks disclosed herein can perform both traditional holds (those holds performed using traditional manipulation machines 110 with traditional attachments) and unique holds (those holds performed using a manipulation machine 110 with a grapple-heel rack). The boom support (boom 114 and stick 116), thumb 130, and grapple 150 may be powered/controlled using hydraulics, mechanical mechanisms, or other power/control means located in the operating station 112 of the grapple-heel rack. FIGS. 21-30 show exemplary holds. Unless specifically stated otherwise, the exemplary grapple-heel racks in these figures are meant to be exemplary and other shown and described grapple-heel racks could be used instead of the shown grapple-heel rack.

Figure 21:
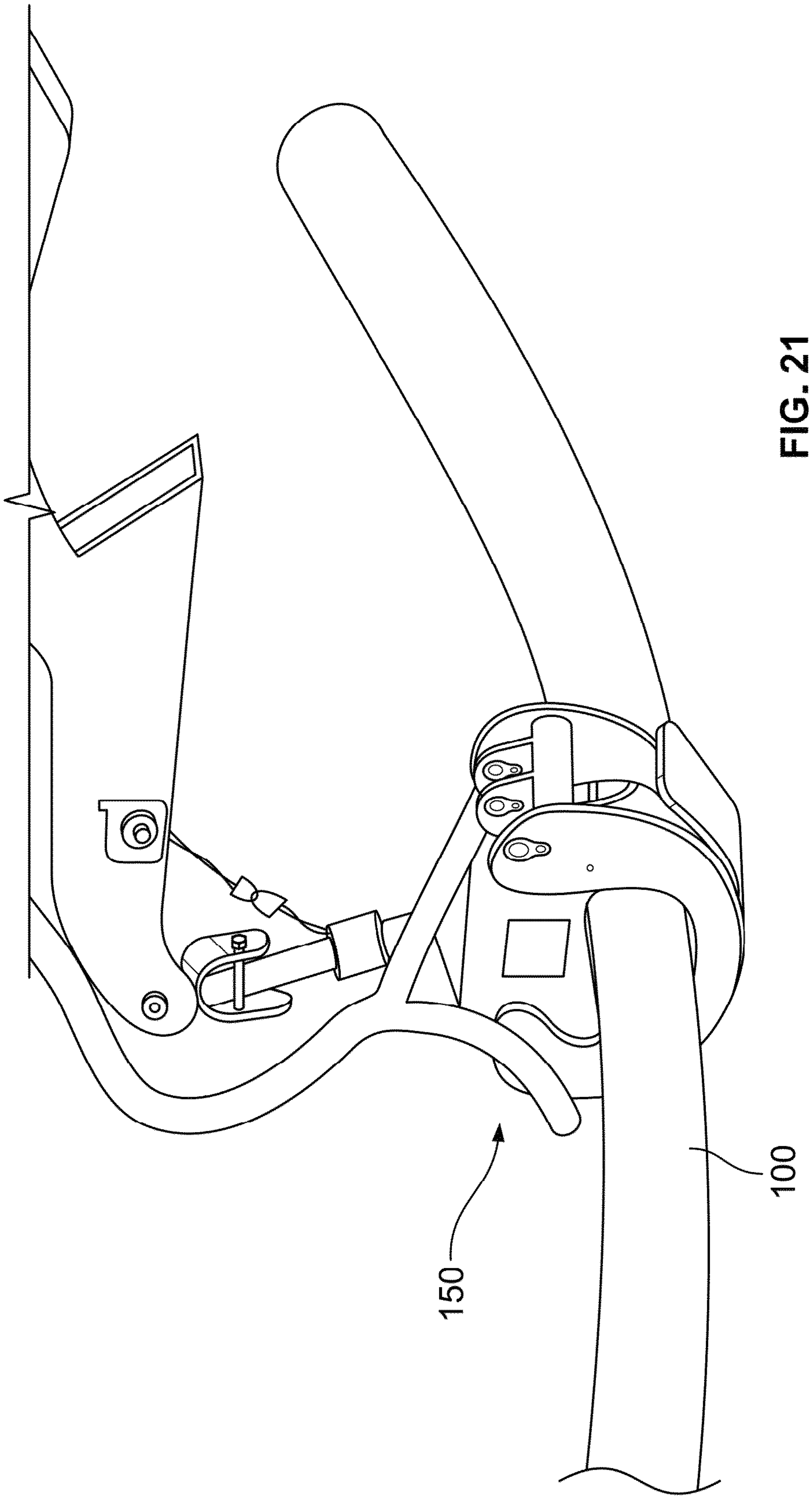
FIG. 21 is a side perspective view of an exemplary grapple-heel rack holding or carrying a load using a grapple hold.

FIG. 21 shows an exemplary grapple-heel rack holding or carrying a load 100 using a grapple hold. For the grapple hold, an operator may open the grapple 150 and manipulate it over a load 100, then lower the grapple 150 until it rests on the load 100. The operator may then close and secure the grapple 150 around the load 100. Then the operator may lift the load 100 and move it to its new destination. Once there, the operator may again open the grapple 150 to release the load 100. The grapple hold is particularly suited for lighter loads 100 that can be lifted easily.

Figure 22:
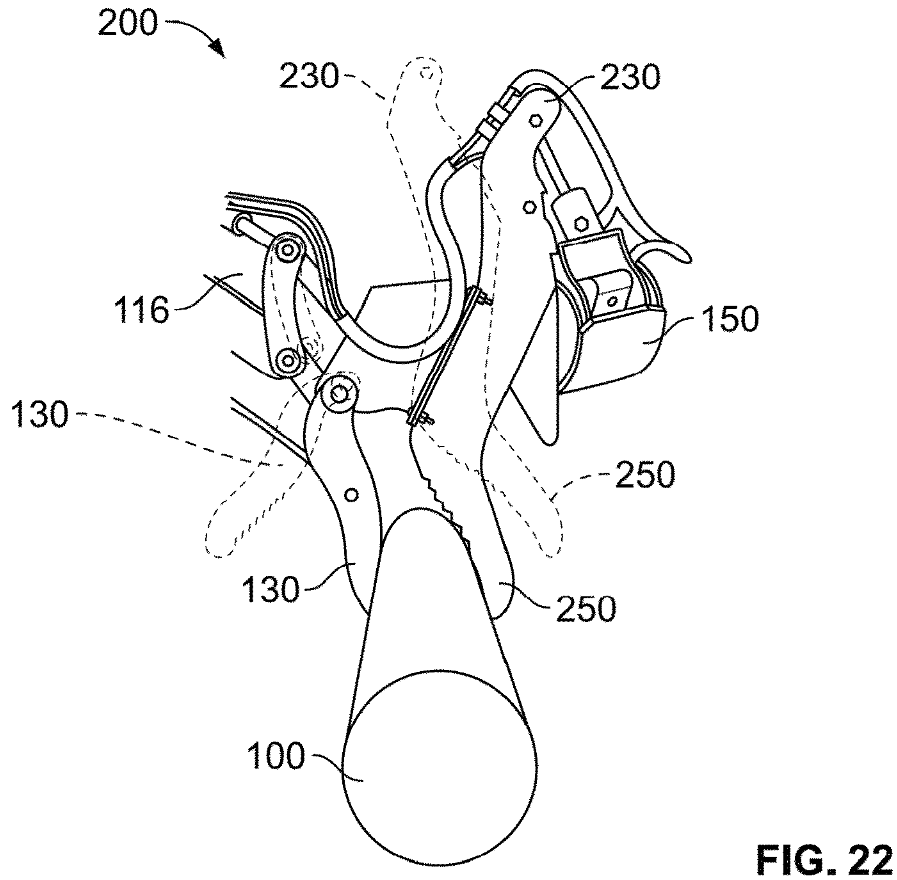
FIG. 22 is a side perspective view of an exemplary grapple-heel rack holding or carrying a load using a thumb-heel hold, the grapple-heel rack in an at least substantially vertical orientation.
Figure 23:
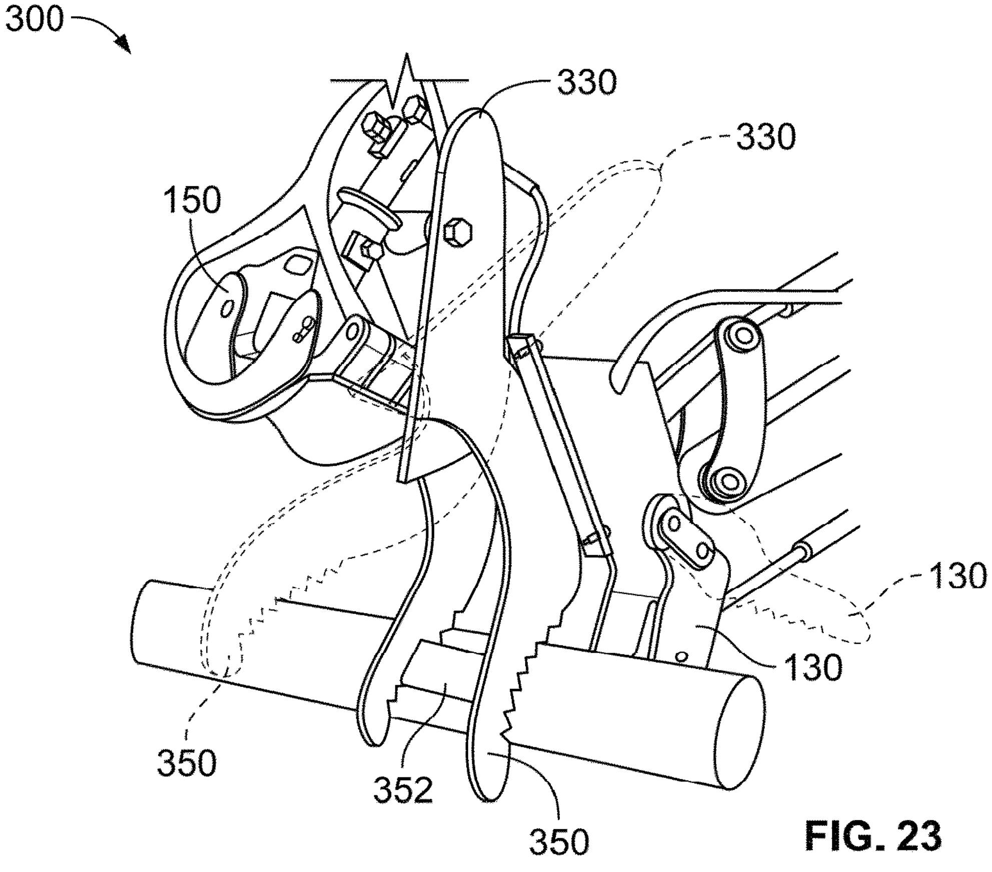
FIG. 23 is a perspective view of an exemplary grapple-heel rack holding or carrying a load using a thumb-heel hold, the grapple-heel rack in an at least substantially vertical orientation.
Figure 24:
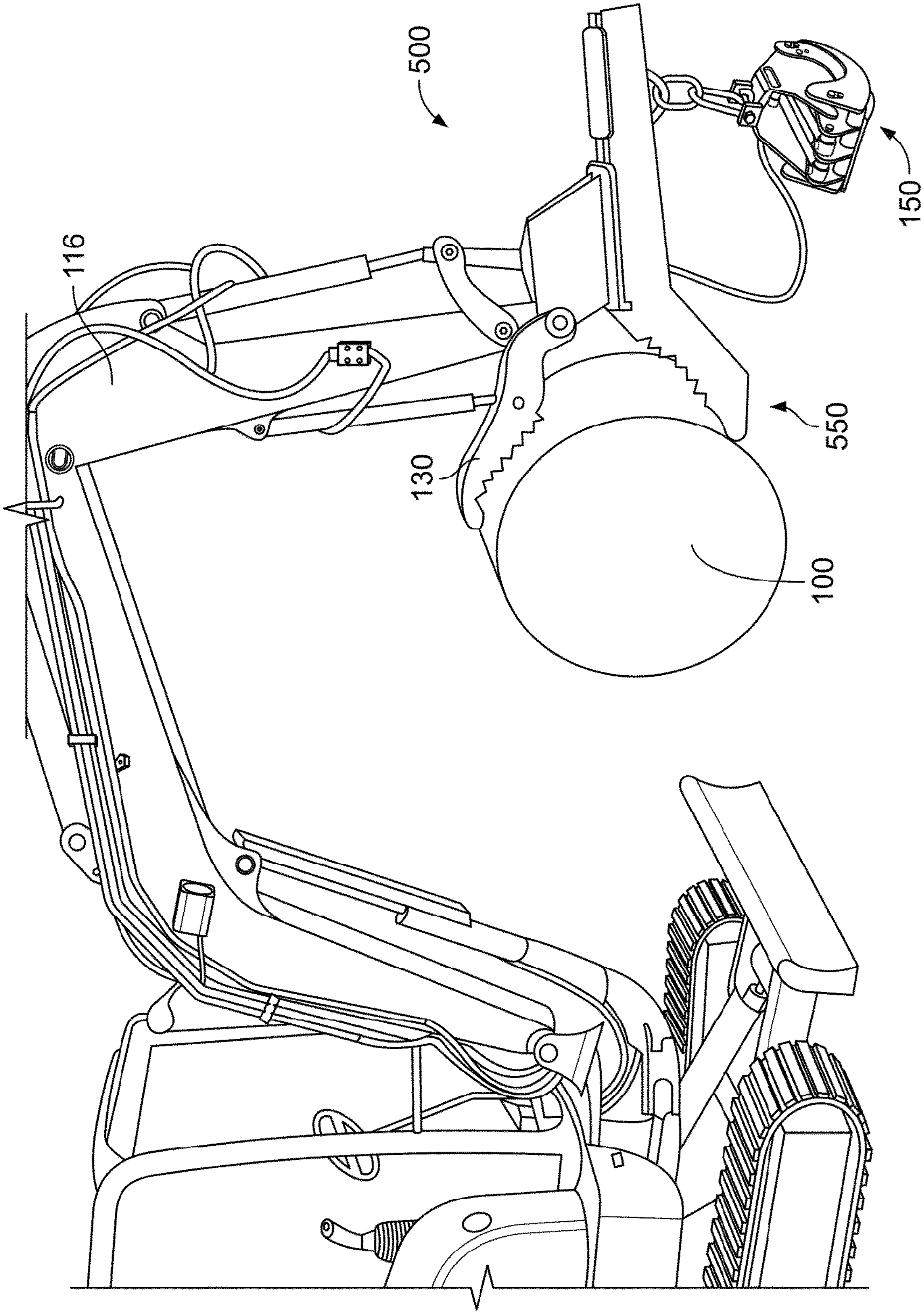
FIG. 24 is a side perspective view of an exemplary grapple-heel rack holding or carrying a load using a thumb-heel hold, the grapple-heel rack in an at least substantially horizontal orientation.

FIGS. 22-24 show exemplary grapple-heel racks holding or carrying a load 100 using a thumb-heel hold. FIGS. 22-23 show the grapple-heel racks in an at least substantially vertical orientation. FIG. 24 shows the grapple-heel rack in an at least substantially horizontal orientation. The thumb-heel hold can be used in other orientations as well. For the thumb-heel hold, an operator may open/close the "jaw" formed between the thumb 130 and the heel bar 252, 352, 452, 552, 652 and then pinch or grab loads 100 using the jaw. The operator manipulates the jaw over (or to the side of) a load 100, then lowers the jaw until it rests on (or next to) the load 100. The operator may close and secure the jaw around the load 100 by raising or lowering the thumb 130 and/or by angling the grapple-heel rack to bring the heel closer to the thumb. Then the operator may lift the load 100 and move it to its new destination. Once there, the operator may again open the jaw to release the load 100. The thumb-heel hold is particularly suited for picking up odd-shaped or excessively large loads 100 (e.g. loads 100 that are too big for the grapple 150 to handle).

FIGS. 25-26 show an exemplary grapple-heel rack 600 holding or carrying a load 101 (shown as a bundle of sticks) using a thumb-heel hold with the grapple-heel rack 600 in an at least substantially vertical orientation that is similar to the hold discussed in relation to FIGS. 22-23. The heel 650 (including the heel bar 652) of the grapple-heel rack 600 has three prongs (two outer heel prongs 654 and a central heel prong 656). These three heel prongs 654, 656 interleave with the thumb prongs 132 of the thumb 130 as shown in FIG. 26. The interleaving makes it easier to carry light, delicate, and/or thin loads 101.

Figure 27:
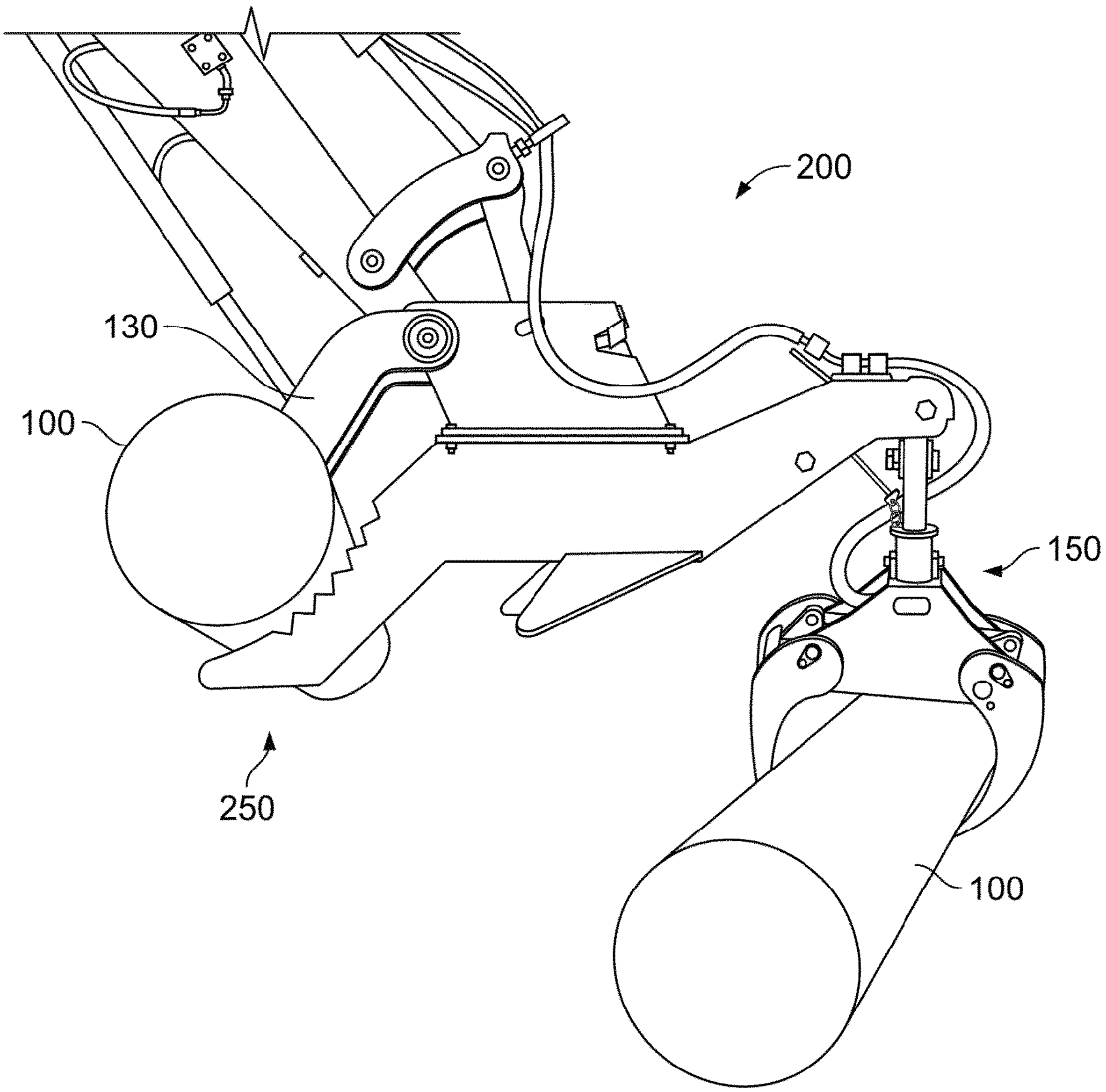
FIG. 27 is a side perspective view of an exemplary grapple-heel rack holding or carrying two loads, a first load being carried using a grapple hold and a second load being carried using a thumb-heel hold.

FIG. 27 shows an exemplary grapple-heel rack holding or carrying two loads 100, a first load 100 being carried using a grapple hold (as set forth herein) and a second load 100 being carried using a thumb-heel hold (as set forth herein). This could be referred to as a combined grapple hold and thumb-heel hold. These holds would be initiated one after another. In other words, the operator could lift a first load 100 using the grapple hold and then lift a second load 100 using the thumb-heel hold. Alternatively, the thumb-heel hold could be performed before the grapple hold. Once both loads are secured, the operator may move them to their new destination(s) and release the loads 100 as described. Either hold could be released first or second. One advantage of this hold is that it can save an operator significant time, particularly if the initial location(s) of the loads is far from the destination(s) because half as many trips need to be made.

Figure 28:
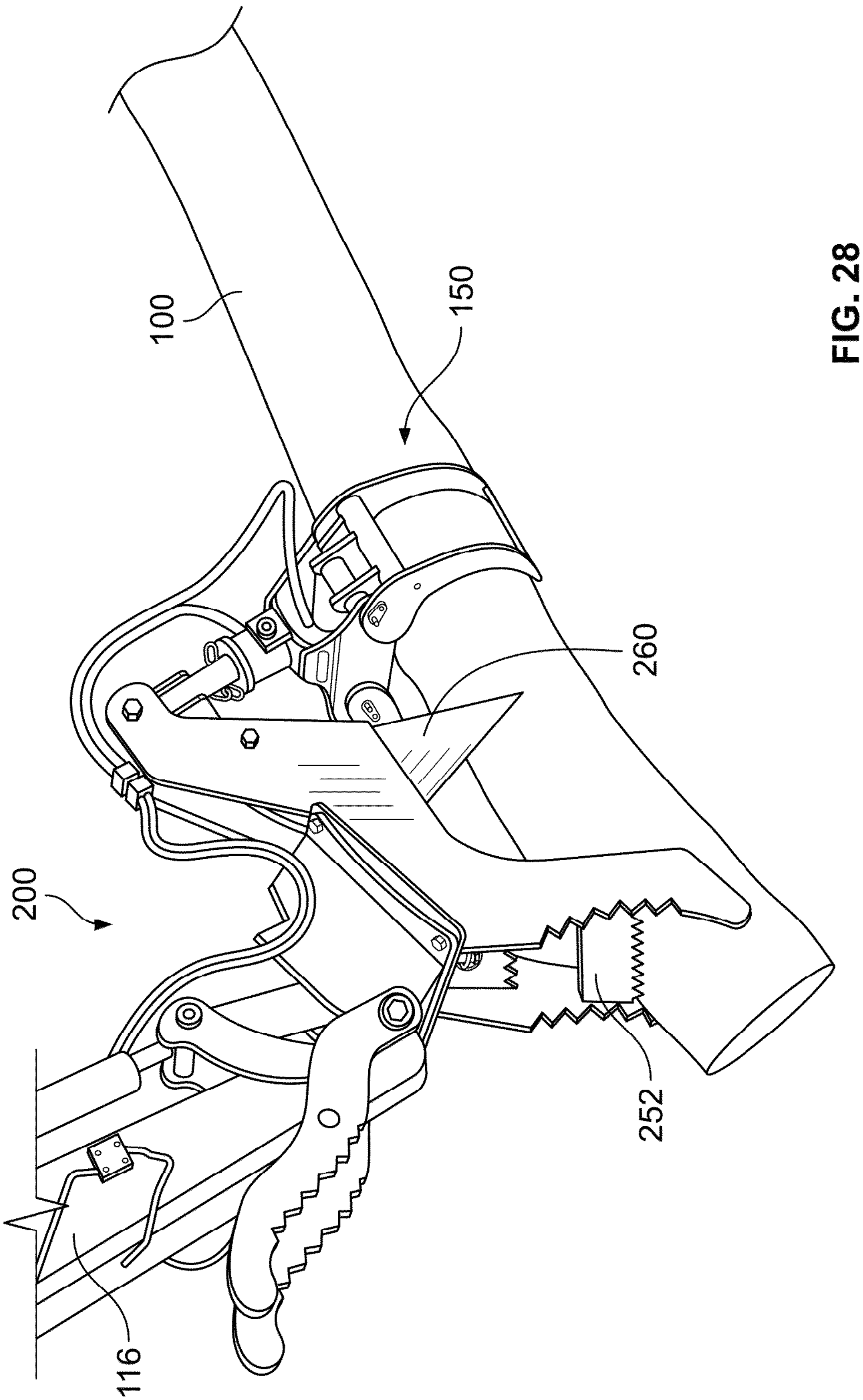
FIG. 28 is a perspective view of an exemplary grapple-heel rack holding or carrying a load using a grapple-heel bar hold.

FIG. 28 shows an exemplary grapple-heel rack 200 holding or carrying a load 100 using a grapple-heel bar hold. For the grapple-heel bar hold, an operator may open the grapple 150 and manipulate it over a load 100, then lower the grapple 150 until it rests on the load 100. The operator may then close and secure the grapple 150 around the load 100. Then the operator may lift the load 100 and rest another part of the load 100 against the heel bar 252. Using the grapple-heel bar hold, the load 100 is substantially parallel to the body of the grapple-heel rack 200 and the longitudinal axis thereof. The heel bar 252 creates another point of contact on the load 100, allowing the operator a higher level of control of the load 100 and creating a safer working environment for the operator and other workers nearby.

FIG. 29 shows an exemplary grapple-heel rack (shown as grapple-heel rack 300) holding or carrying a load 100 using a vertical grapple-heel bar hold. The vertical grapple-heel bar hold is similar to the grapple-heel bar hold of FIG. 6, except the grapple-heel rack is in an at least substantially vertical position. For certain types of jobs, a load securer (e.g. a securing chain 380) may be wrapped around the load 100 with ends secured to the heel 350 or heel bar 352 (e.g. using chain slots 370 to hold the ends of the chain 380). For example, this vertical grapple-heel bar hold could be used to hold a tree before it is cut down. For example, this hold may also be used to hold and secure dangerous and/or hazardous trees to secure them before they are cut by another worker. The grapple-heel rack would be positioned around a vertical tree (load 100) in a vertical grapple-heel bar hold. The securing chain 380 would be placed around the load 100. The cut would be made under the grapple-heel rack. The load 100 would not fall. This would be an especially good hold to use in tight quarters where a falling tree could damage neighboring trees or structures. Another example would be to use the load securer (e.g. a securing chain 380) to secure a non-vertical load 100 and then use the grapple-heel rack to change the position/orientation of the load so that it is at least substantially vertical.

FIG. 30 shows an exemplary grapple-heel rack (shown as grapple-heel rack 600) holding or carrying a load 100 using a grapple-corral hold. In the grapple-corral hold, load 100 is held by the grapple 150 and is threaded through the "corral" 640 (defined between the side rails 610, rack/machine connector 620, and the heel bar 652). The movement of the load 100 is limited by the corral 640.

FIG. 31-33 show a braced grapple hold in which the grapple 150 is held in a "braced" position (shown as extending in a forward direction). The "braced" position is most likely a pre-determined "braced" position. This is accomplished using a storable grapple brace 657 that can be held in a stored position (shown in solid lines in FIG. 31 and FIG. 31A) using a removable and replaceable fastener **657*b* (also referred to as a "releasable storage lock" or a "lock"). Releasing the lock 657*b* that holds the grapple brace 657 in the stored position, the grapple brace 657 can transition from the stored position (FIG. 31) to the braced position (FIG. 32). In the braced position (which may be one of several pre-determined braced positions including the position of FIG. 32), the fastener 657*b* is preferably associated with the grapple 150. For example, the fastener 657*b* may be fastenable directly or indirectly to the grapple 150 (shown as being fastened to the third segment 146 of the universal joint 125). In the braced position, the grapple 150 is held in a particular (usually extended) position that can be useful. The shown grapple brace 657 is meant to be exemplary. The grapple brace may be removable and replaceable so that grapple braces of different lengths can be used. As shown in FIG. 33, the grapple brace can also be adjustable (e.g. telescoping) using at least one alternative brace rod 657*a*'. Depending on the length of the grapple brace, the grapple 150** can be held in different pre-determined braced positions.

FIGS. 34-35 show exemplary grapple-heel racks 200, 300 holding or carrying respective loads 100 using angled-catch holds. For the angled-catch hold, an operator may open the grapple 150 and manipulate it over a load 100, then lower the grapple 150 until it rests on the load 100. The operator may then close and secure the grapple 150 around the load 100. Then the operator may lift the load 100 and manipulate the grapple-heel rack 200, 300 so that the load 100 is tucked under the angle-enabler catch 260, 360 and into the respective catch notch 260', 360' (similarly to/analogously to tucking a package under your arm). Unlike the grapple-heel bar hold in which the load 100 is substantially parallel to the body of the grapple-heel rack 200 and the longitudinal axis thereof, the angled-catch holds purposely angle the load 100 in relation to the grapple-heel rack 200, 300 and the longitudinal axis thereof. This allows the load to be carried alongside the operator station 112 which, in turn, allows longer loads to be carried by small, compact, personal, and/or mini manipulation machines 110. The angle-enabler catch 260, 360 also creates another point of contact on the load 100, allowing the operator a higher level of control of the load 100 and creating a safer working environment for the operator and other workers nearby.

Figure 36:
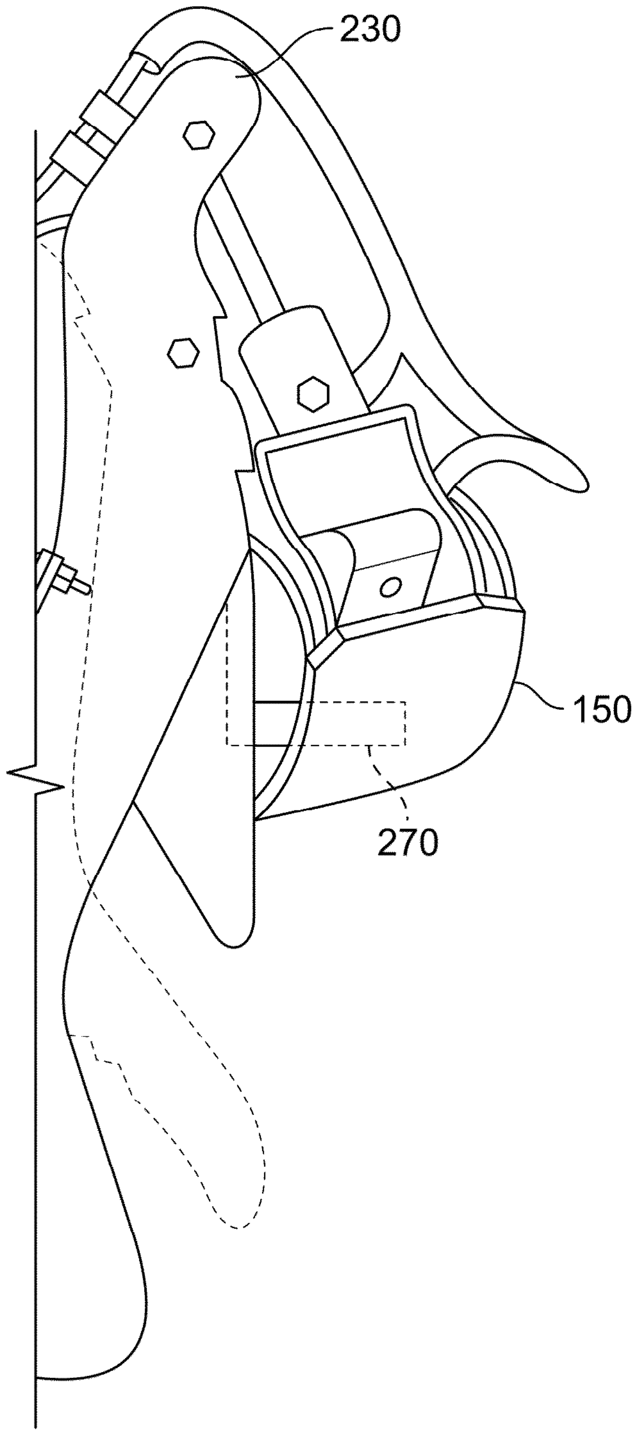
FIG. 36 is a side perspective view of an exemplary grapple-heel rack having an exemplary optional forward storage sub-rack for storing an exemplary grapple in a storage hold when the grapple-heel rack is in an at least substantially vertical position.

FIG. 36 shows an exemplary grapple-heel rack having at least one exemplary optional forward storage sub-rack 270 for securing and/or storing an exemplary grapple 150 in a storage hold. As shown, the storage hold may be implemented when the grapple-heel rack is in an at least substantially vertical position, although once the storage hold is implemented, the grapple-heel rack may be moved in any position. FIG. 1 shows a first alternative storage sub-rack 270' that could be used in place of the storage sub-rack 270. FIGS. 37-38 show a second alternative storage sub-rack 270" that could be used in place of the storage sub-rack 270. The storage sub-racks 270, 270', 270" are shown as protrusions that project at least generally forward from the grapple-heel racks (e.g. projecting from the frame and at least generally toward the grapple 150, 150' and away from the heel 250, 350, 450, 550, 650). The storage sub-racks 270, 270', 270" may be associated with portions of the grapple-heel racks including, but not limited to, the frame and/or the angle-enabler catches. While the storage sub-rack 270 is shown as parallel to the ground when the frame is vertical, it could be angled upward or downward. The storage sub-rack 270" is shown as including storage nubs 272 that project at least slightly outward (shown as perpendicular) from the sub-rack 270" to help prevent the grapple 150 from sliding off the sub-rack 270". (It should be noted that the grapple-heel rack 200 shown in FIG. 1 shows the grapple 150' larger than the grapple-heel rack 200. This is done for effect only, but it results in some components being out of proportion. Even without this distortion, however, the storage sub-rack 270' may need to be positioned closer to the horizontal wing angle-enabler catches 260 and/or the top level of the frame side rails 210 near the nose 230 may need to be elongated.) For the storage hold, an operator may open the grapple 150, and then manipulate the grapple-heel rack into an at least substantially vertical position (the exact necessary position of the grapple-heel rack would be determined by factors such as the shape and balance of the grapple-heel rack, storage sub-rack, and grapple) and the grapple 150 rests on the forward storage sub-rack 270. The operator may close and secure the grapple 150 around the forward storage sub-rack 270 so that the grapple 150 "grips" the storage sub-rack 270. The shape, length, angle, position (relative to the side rails, nose, and/or angle-enabler catches), and/or size of the storage sub-racks 270, 270' may be determined by factors including, but not limited to, the dimensions of the frame, the size and shape of the storage sub-rack, the length of the universal joint 125, and/or the length and size of the grapple 150. Specifically, the grapple 150 should be able to grip the storage sub-rack(s) when the grapple-heel rack is in an at least substantially vertical position. While the storage sub-rack 270 of FIG. 36 is only seen from the side and could be, for example, one wide storage sub-rack or two narrow storage sub-racks, FIG. 1 shows two storage sub-racks 270' (one associated with each side rail 210). The forward storage sub-racks 270, 270' are meant to be exemplary and could have other shapes and/or angles. In addition, the forward storage sub-racks 270, 270' may be used on other grapple-heel racks (e.g. grapple-heel racks 200, 300, 400, 500, 600 or variations thereof). Using the forward storage sub-rack 270 prevents the grapple 150 from swinging around loosely.

Instrument Attachment

FIGS. 39-43 detail an exemplary instrument attachment 670 (also referred to as a reversible instrument attachment 670, reversible rake attachment 670, instrument attachment 670, or rake attachment 670) with at least one instrument (e.g. rake tines 680 or an alternative instrument 680' such as a plow blade (FIG. 43)) that preferably may be used for pulling and/or pushing. The instrument attachment is primarily discussed herein as a rake attachment that has a plurality of rake tine instruments 680, but the instrument attachment may be other types of instrument attachments having one or more other types of instruments (e.g. a plow attachment having a plurality of plow instruments 680' (FIG. 43)). The shown reversible rake 670 has an instrument or rake body 672 (shown with a top, bottom, sides (connecting the front and bottom), front, and back). The instrument attachment preferably associates with a grapple-heel rack 600 (which could be any of the shown and described grapple-heel racks although some modifications may be necessary) using at least one grapple connection mechanism (e.g. knobs 674*a*, 674*b*) and at least one heel connection mechanism (e.g. pocket 678*a*, 678*b*).

Figure 39:
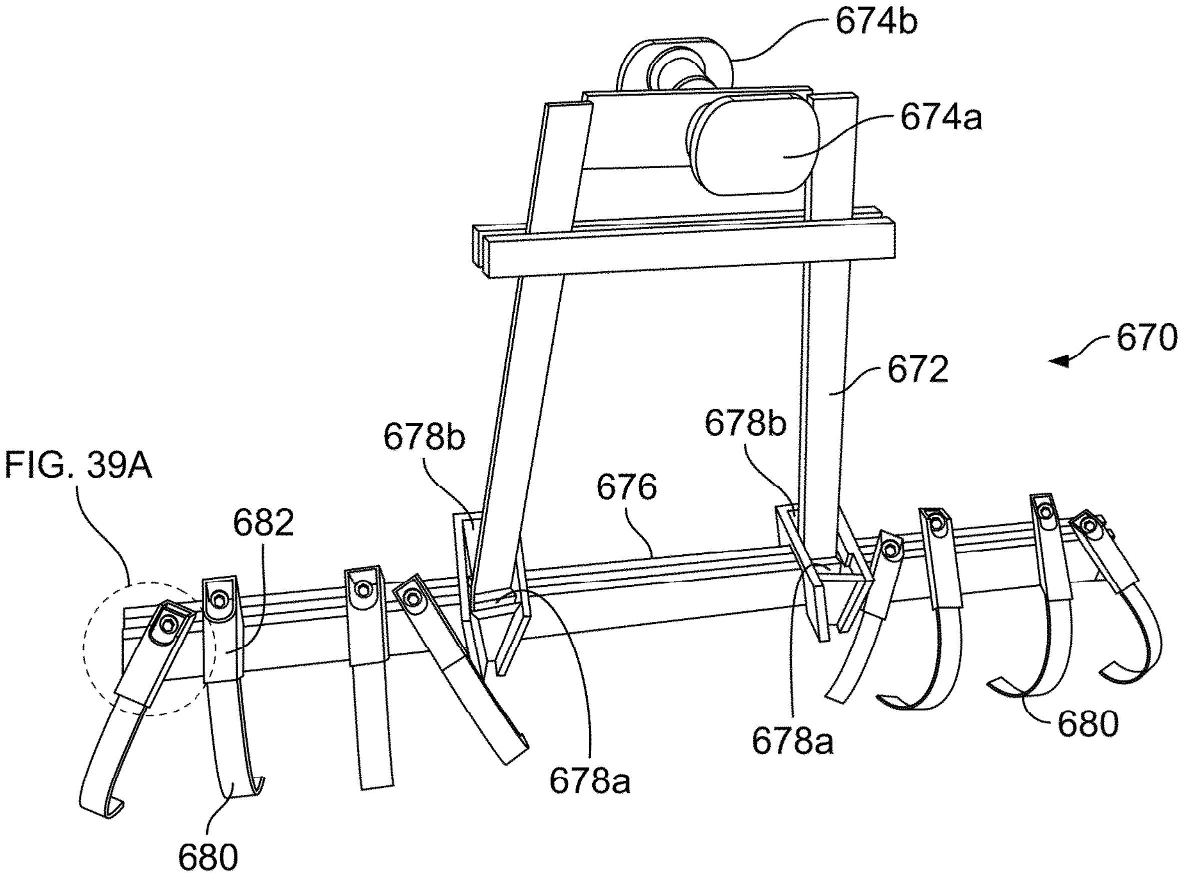
FIG. 39 is a perspective view of an exemplary reversible instrument attachment (shown as a rake attachment).

As shown in FIG. 39, the rake attachment 670 includes a rake body 672 (with a top, bottom, sides, front, and back). The shown elongate rake head 676 extends beyond the sides of the shown rake body 672. (Alternatively, the rake body 672 could be as wide as the elongate rake head 676 and/or part of the elongate rake head 676.) Extending substantially downward from the elongate rake head 676 is at least one instrument (shown as a plurality of rake tines 680 or, in FIG. 43, with at least one plow blade 680').

At least toward the top of the rake body 672 is at least one knob grapple connection mechanism suitable for a grapple 150 to grab. The shown pair of grapple holding knobs 674 (shown as 674*a* and 674*b*) is an example of a grapple connection mechanism. Alternative grapple connection mechanisms include, but are not limited to, loops, hooks, magnets, or any other structure or device that could be grabbed by a grapple 150. As shown, a first knob (e.g. a front knob) 674*a* is preferably associated with a first face (e.g. the front) of the rake body 672 and a second knob (e.g. a back knob) 674*b* is preferably associated with a second face (e.g. the back) of the rake body 672. At the bottom of the shown rake body 672 is an elongate rake head 676. If the rake attachment 670 was single sided (not reversible), the at least one knob grapple connection mechanism could be a single grapple connection mechanism on only one side of the rake body 672.

At least toward the bottom of the rake body 672 there is preferably at least one heel connection mechanism suitable to associate with the heel 650 of the grapple-heel rack 600. The at least one heel exemplary connection mechanism is shown as a pair of two-pocketed heel prong troughs 678 (shown and referred to as front pockets 678*a* and back pockets 678*b*, but referred to in combination as two-pocketed heel prong troughs 678 or "heel trough connection mechanisms"). The two-pocketed heel prong troughs 678 are preferably arranged at or near the rake body 672 and/or the elongate rake head 676. Each pocket 678*a*, 678*b* is preferably arranged to accommodate the tip of a respective heel prong 654. Although shown as a pair of two-pocketed heel prong troughs, additional two-pocketed heel prong troughs could be used if there were additional heel prongs. For example, since there is a central heel prong 656, there could be a central two-pocketed heel prong trough. Similarly, the system could be adapted to a single heel prong interacting with a single two-pocketed heel prong trough. If the rake attachment 670 was single sided (not reversible), the at least one heel exemplary connection mechanism could be a pair of single-pocketed heel prong troughs (referred to in combination as single-pocketed heel prong troughs 678 or "heel trough connection mechanisms").

Figure 39A:
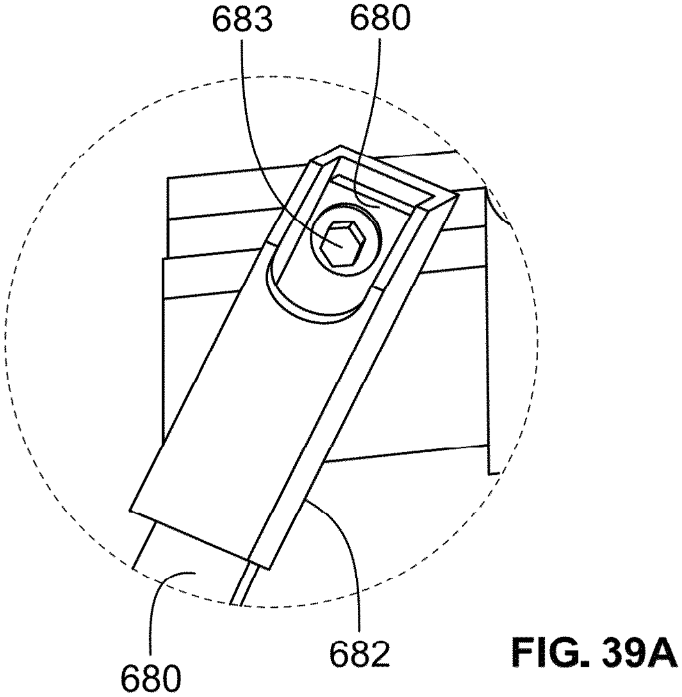
FIG. 39A is a partial enlargement (the circled portion) of FIG. 39 and is a perspective view of an exemplary tine socket having the top of a rake tine secured therein using a temporary fixer.
Figure 43:
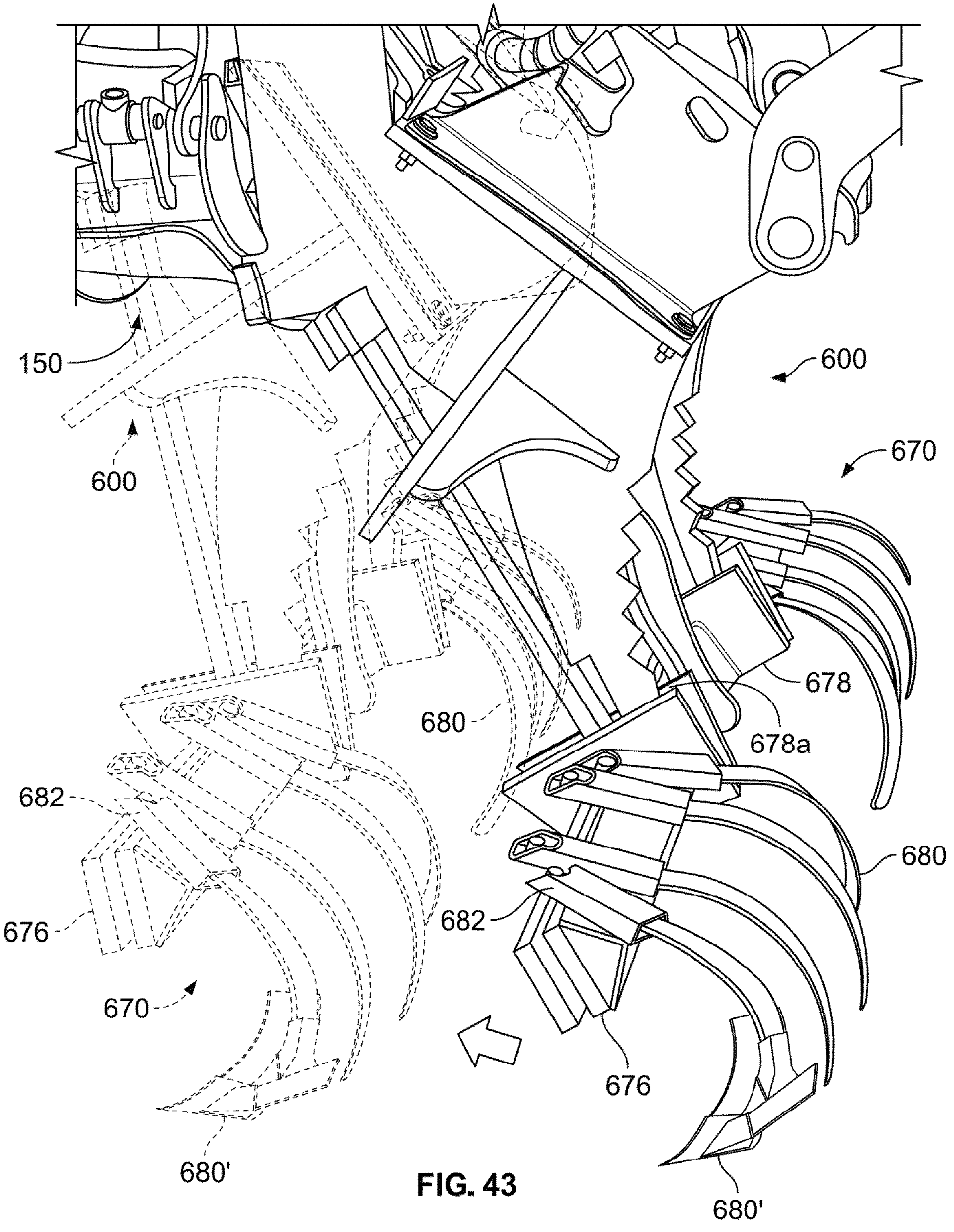
FIG. 43 is a perspective view of the exemplary grapple-heel rack using the exemplary reversible instrument attachment (shown with one rake tine replaced by an alternative instrument) in a pushing motion.

A plurality of rake tines 680 is shown as being arranged on the elongate rake head 676. The rake tines 680 may be associated with the elongate rake head 676 using a plurality of tine channels 682 (shown in detail in FIG. 39A) that are associated with (e.g. integral with or temporarily or permanently fixed thereto) the elongate rake head 676. Each rake tine 680 has an attachment end that is shown as being inserted into a respective tine channel 682. The attachment end is held within the tine channel 682 using one or more temporary (e.g. a nut and bolt) or at least relatively permanent (e.g. welding) fixers 683. The shown temporary fixers 683 are nuts and bolts. The front of the tine channel 682 may have a notch to allow easy access to the bolts so they can be screwed and unscrewed. The shaft of the bolt extends through the rake tine 680 (which may be pre-drilled with one or more holes) and through the back of the tine channel 682 (that also may be pre-drilled with one or more holes) where it is secured by a nut. If the rake tines 680 have multiple holes along the top of their length, by removing the nut and bolt, the length of the rake tines 680 can be adjusted by selecting different holes. One advantage of a temporary fixer is that the rake tines 680 could be easily adjusted, removed, and/or replaced. The rake tines 680 could also be directly affixed to the elongate rake head 676. Although shown as relatively simple individual curved tines, alternative rake tines may be straight, may have some other bends or folds, may have integral fixers, and/or may come in sets of rake tines. The rake tines 680 are preferably constructed from durable and sturdy material (e.g. steel). As shown in FIG. 43, the rake tines 680 may be replaced with alternative instruments 680' such as plow blades.

Figure 40:
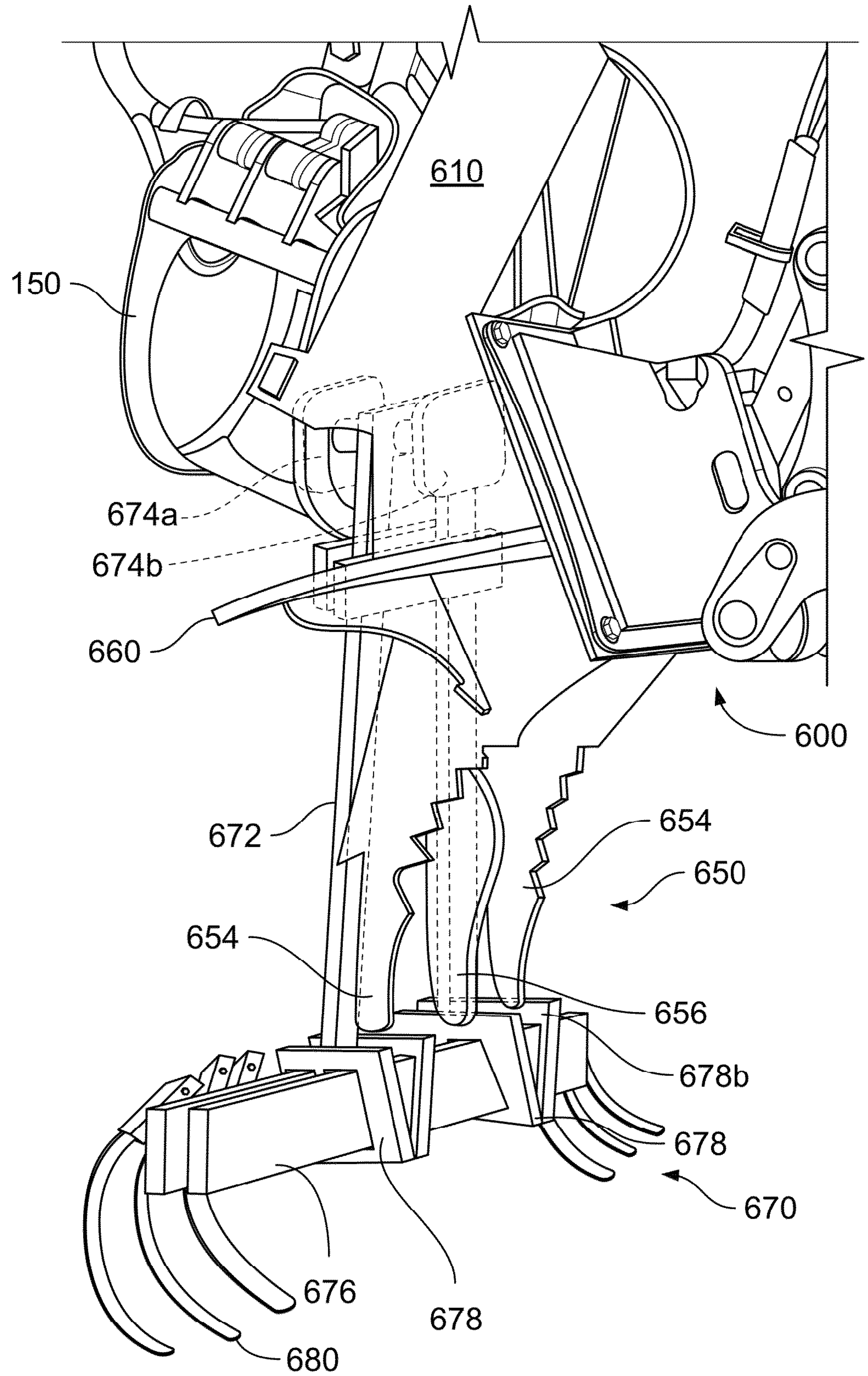
FIG. 40 is a perspective view of the exemplary reversible rake attachment in the process of being mounted on the exemplary grapple-heel rack.
Figure 41:
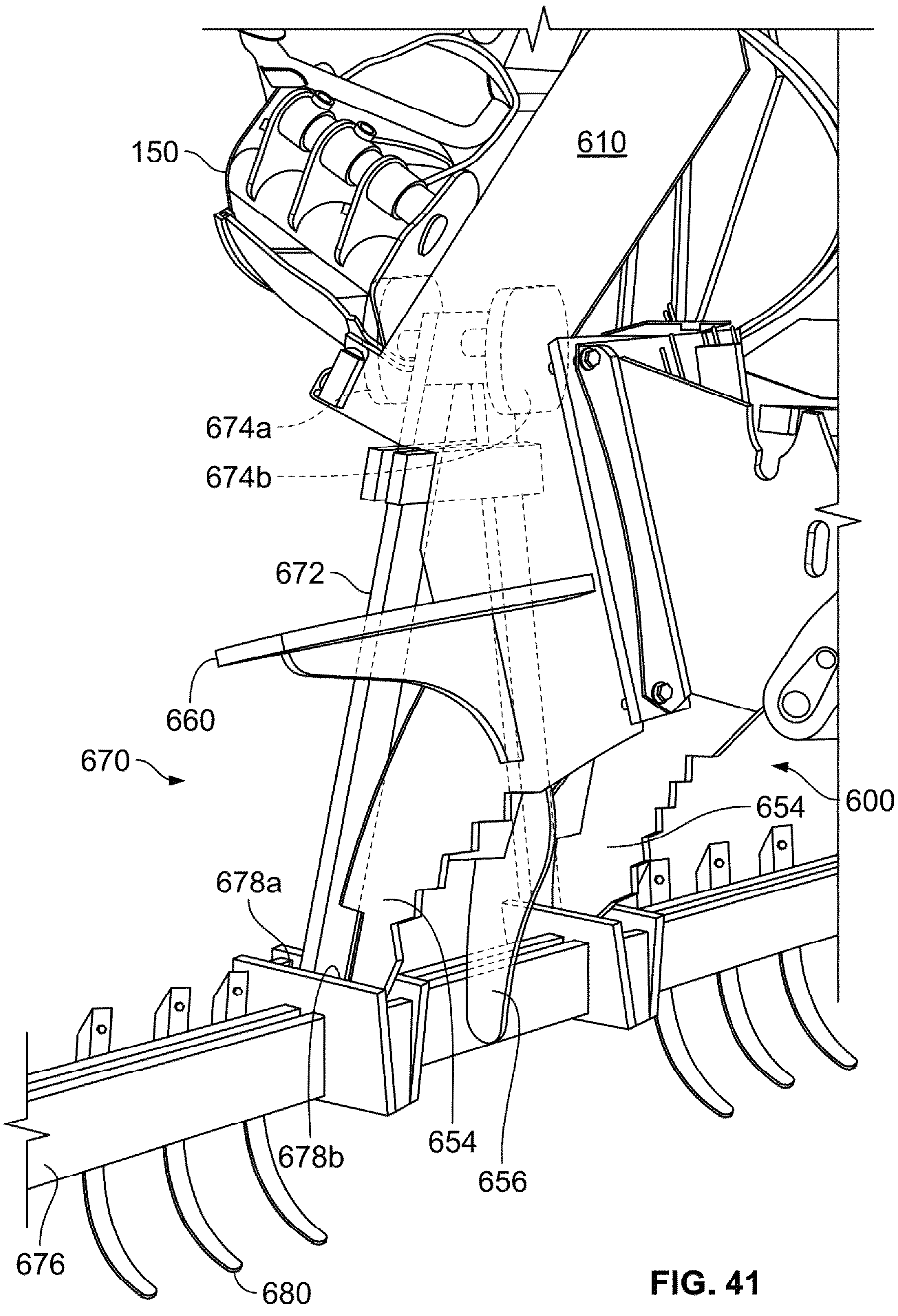
FIG. 41 is a perspective view of the exemplary reversible rake attachment mounted on the exemplary grapple-heel rack.

FIG. 40 and FIG. 41 show a progression of the exemplary reversible rake attachment 670 being installed on the exemplary grapple-heel rack 600. As shown in FIG. 40, the operator (not shown) uses the exemplary grapple-heel rack 600 to manipulate the exemplary reversible rake attachment 670 such that the heel prongs 654 are above the corresponding side of the two-pocketed heel prong troughs 678, the grapple 150 loosely gripping at least one of the grapple holding knobs 674. In this figure, the grapple 150 is not completely closed so that the knobs 674 (and the rest of the rake attachment 670) hang relatively low. This allows one pocket of each of the two-pocketed heel prong troughs 678 (shown in FIG. 40 as the back pockets 678*b*) to be positioned below the tip of each heel prong 654 hovering above the respective back pocket 678*b*. Once properly positioned, the grapple 150 may be closed as shown in FIG. 41. This causes the grapple holding knobs 674 (and the whole reversible rake attachment 670) to rise. The rising reversible rake attachment 670 lifts the two-pocketed heel prong troughs 678 such that the pockets (shown in FIG. 41 as the back pockets 678*b*) rise to cover the tips of their corresponding heel prongs 654. (If the reversible rake attachment 670 were reversed, the heel prongs 654 would be associated with the front pockets 678*a* as shown in FIG. 43.) In this position, the reversible rake attachment 670 is securely attached to the exemplary grapple-heel rack 600 and can be used for pulling (FIG. 42) or, if reversed, pushing (FIG. 43).

Figure 42:
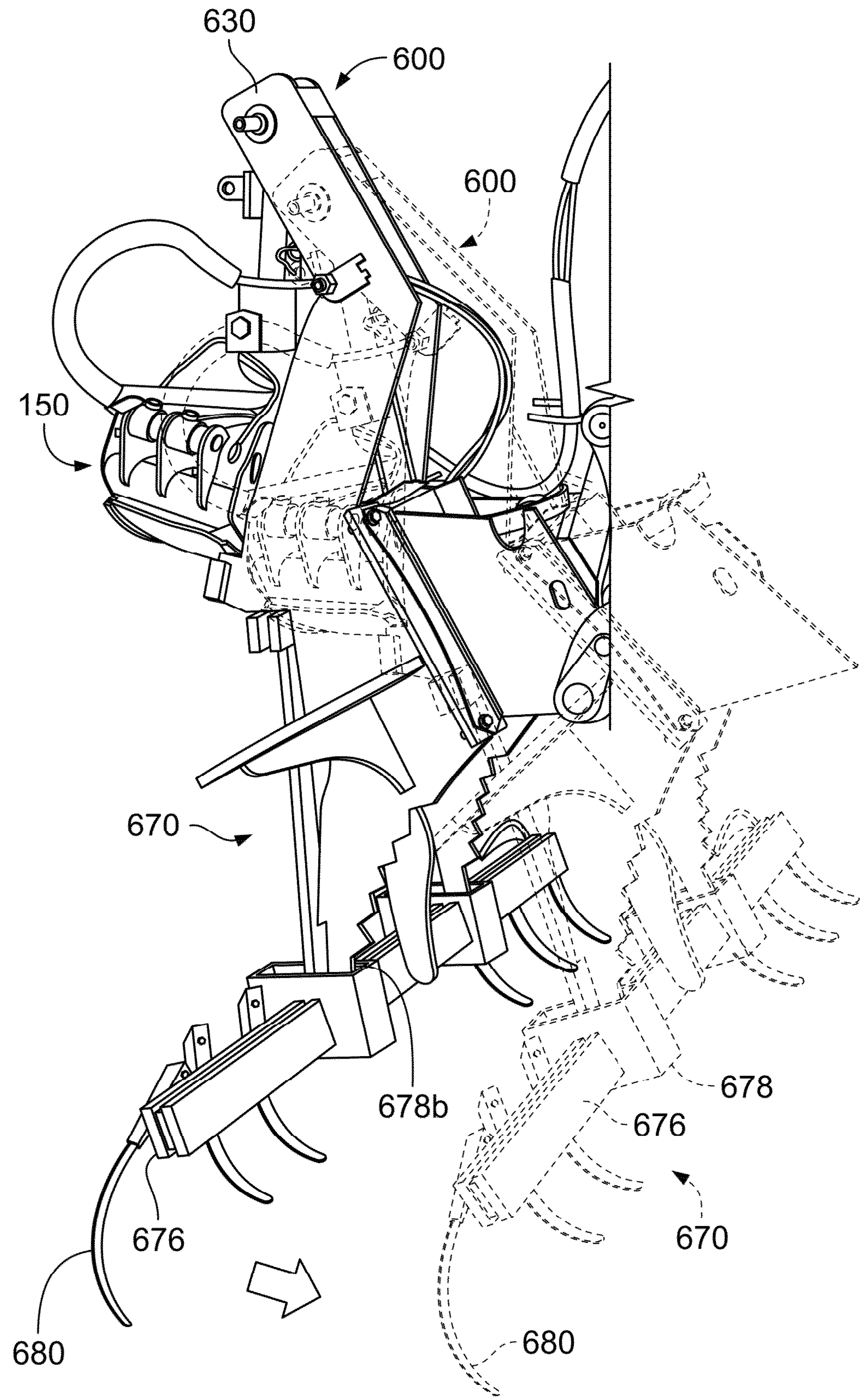
FIG. 42 is a perspective view of the exemplary grapple-heel rack using the exemplary reversible rake attachment in a pulling motion.

FIG. 42 is a perspective view of the exemplary grapple-heel rack 600 with an attached exemplary reversible rake attachment 670 being used in a pulling motion from the solid line rake attachment 670 to the dashed line rake attachment 670. The rake tines 680 of the rake attachment 670 are oriented such that they are curved toward the manipulation machine 110. The pulling motion may be accomplished by manipulation of the grapple-heel rack 600 (which, in turn, manipulates the rake attachment 670) and/or by movement (e.g. backing up) of the manipulation machine 110 (which, in turn, manipulates the rake attachment 670).

FIG. 43 is a perspective view of the exemplary grapple-heel rack 600 with an attached exemplary reversible rake attachment 670 being used in a pushing motion from the solid line rake attachment 670 to the dashed line rake attachment 670. The rake tines 680 of the rake attachment 670 are oriented such that they are curved away from the manipulation machine 110 (in a manner similar to the blade of a bull dozer). The pushing motion may be accomplished by manipulation of the grapple-heel rack 600 (which, in turn, manipulates the rake attachment 670) and/or by movement (e.g. driving forward) of the manipulation machine 110 (which, in turn, manipulates the rake attachment 670). As shown in this figure, the rake tines 680 may be replaced with alternative instruments 680' such as plow blades.

The shown instrument attachments are meant to be exemplary and variations are anticipated. For example, although preferred instrument attachments are reversible, alternative instrument attachments could be mono-directional. Such mono-directional instrument attachments might have a single knob and single-pocketed heel prong troughs.

It should be noted that the instrument attachment could be used with grapple-heel rack without angle-enabler catches.

Conclusion:

It is to be understood that features shown in one grapple-heel rack could be implemented in other grapple-heel racks. For example, features including, but not limited to, the storage sub-rack, the corral, the grapple brace system, and/or the instrument attachment could be adapted to work with other grapple-heel racks beyond the specific grapple-heel rack(s) with which the particular feature(s) are shown. It is to be understood that the shown holds may be performed by any grapple-heel rack having the necessary structure. For example, if a grapple brace system can be added to a grapple-heel rack, the modified grapple-heel rack could perform the braced grapple hold.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A grapple-heel rack for use with a grapple, said grapple-heel rack comprising:

(a) a frame having a nose, a heel, and first and second side rails spanning between said nose and said heel; and (b) a universal joint for associating said nose with said grapple, said universal joint having three axes of non-powered rotation between said nose and said grapple, the three axes all perpendicular to each other.

2. The grapple-heel rack of claim 1 further comprising:

(a) a first angle-enabler catch associated with said first side rail, said first angle-enabler catch positioned between said nose and said heel, a first catch notch formed between said first angle-enabler catch and said first side rail; and (b) a second angle-enabler catch associated with said second side rail, said second angle-enabler catch positioned between said nose and said heel, a second catch notch formed between said second angle-enabler catch and said second side rail.

3. The grapple-heel rack of claim 1 further comprising at least one heel bar associated with said heel, said at least one heel bar spanning between said first and second side rails.

4. The grapple-heel rack of claim 1 further comprising:

(a) a nose connector connecting said first and second side rails at said nose, said universal joint supported by said nose connector; and (b) at least one heel bar connecting said first and second side rails at said heel.

5. The grapple-heel rack of claim 1 further comprising:

(a) a nose connector connecting said first and second side rails at said nose, said grapple supported by said nose connector; and (b) at least one heel bar connecting said first and second side rails at said heel.

6. The grapple-heel rack of claim 1 further including said grapple, said grapple having a neutral position, said grapple rotatable around an axis of rotation to a plurality of non-neutral positions, and said grapple-heel rack comprising a mechanical grapple return system for, in use, returning said grapple from one of said non-neutral positions to said neutral position.

7. The grapple-heel rack of claim 1, a mechanical grapple return system comprising:

(a) an expandable/contractible member having a heel end and a nose end, a flexible member having a heel end and a nose end, a heel end fixer, and at least one universal joint link or grapple link associated with said universal joint or said grapple;

(b) said expandable/contractible member heel end being associated with said heel end fixer to fix the expandable/contractible member heel end in a position relative to the frame;

(c) said expandable/contractible member nose end being associated with said flexible member heel end; and (d) said flexible member nose end being associated with at least one of said universal joint and said universal joint link or grapple link.

8. The grapple-heel rack of claim 1, a mechanical grapple return system arranged to exert a return force on one of said grapple and said universal joint, at a location offset from an axis of rotation so that said exerted force causes said grapple to rotate about said axis of rotation.

9. The grapple-heel rack of claim 1, said first and second side rails being closer together near said nose than near said heel.

10. The grapple-heel rack of claim 1, said frame having a top and a bottom, said first and second side rails being closer together near said top than near said bottom.

11. The grapple-heel rack of claim 1, said first and second side rails having a step configuration with at least three levels separated by connecting lengths.

12. The grapple-heel rack of claim 1 further comprising a storage sub-rack projecting at least generally forward from said frame of said grapple-heel rack.

13. The grapple-heel rack of claim 1 further comprising a rack/machine connector, said rack/machine connector interconnectable with a machine/rack connector of a manipulation machine.

14. The grapple-heel rack of claim 1 further comprising a rack/machine connector, said rack/machine connector interconnectable with a machine/rack connector of a manipulation machine having a boom support and a thumb.

15. The grapple-heel rack of claim 1, said grapple-heel rack being self-contained and self-supported.

16. The grapple-heel rack of claim 1 further comprising a mechanical grapple return system associated at a first end to one of said grapple and said universal joint, and associated at a second end to said frame.

17. The grapple-heel rack of claim 1, said universal joint further comprising a first pivot, a second pivot, and a rotating socket.

18. A method for using a grapple-heel rack with a grapple and a manipulation machine, said manipulation machine having a boom support and a thumb, said method comprising:

(a) providing said grapple-heel rack, said grapple-heel rack comprising:

(i) a frame having a nose, a heel, and first and second side rails spanning between said nose and said heel;

(ii) said grapple attached to said nose using a universal joint; and (iii) a mechanical grapple return system arranged to exert a return force on one of said grapple and said universal joint, at a location offset from an axis of rotation so that said exerted force causes said grapple to rotate about said axis of rotation, said mechanical grapple return system comprising:

an expandable/contractible member having a heel end and a nose end, a flexible member having a heel end and a nose end, a heel end fixer, and at least one universal joint link or grapple link associated with said universal joint or said grapple;

a pulley associated with at least one of said first and second side rails, said flexible member runs forward and backward over said pulley;

said expandable/contractible member heel end being associated with said heel end fixer to fix the expandable/contractible member heel end in a position relative to the frame;

said expandable/contractible member nose end being associated with said flexible member heel end; and said flexible member nose end being associated with at least one of a universal joint link associated with said universal joint and a grapple link associated with said grapple; and (b) implementing a hold in which a load is handled by said grapple-heel rack.

19. The method of claim 18, said step of providing said grapple-heel rack further comprising providing said mechanical grapple return system associated at a first end to one of said grapple and said universal joint, and associated at a second end to said frame.

20. The method of claim 18, said universal joint further comprising, a universal joint for associating said nose with said grapple, said universal joint having three axes of non-powered rotation between said nose and said grapple, the three axes all perpendicular to each other.

21. A grapple-heel rack and a grapple, said grapple-heel rack comprising:

(a) a frame having a nose, a heel, and first and second side rails spanning between said nose and said heel;

(b) a nose connector connecting said first and second side rails at said nose;

(c) a universal joint connecting said grapple to said nose connector via said universal joint, said universal joint having three axes of non-powered rotation between said nose and said grapple, the three axes all perpendicular to each other; and (d) said grapple having a neutral position, said grapple rotatable to a plurality of non-neutral positions, a mechanical grapple return system for returning said grapple from one of said non-neutral positions to said neutral position.

22. The grapple-heel rack of claim 21, said mechanical grapple return system comprising:

(a) an expandable/contractible member having a heel end and a nose end, a flexible member having a heel end and a nose end, a heel end fixer, and at least one universal joint link or grapple link associated with said universal joint or said grapple;

(b) said expandable/contractible member heel end being associated with said heel end fixer to fix the expandable/contractible member heel end in a position relative to the frame;

(c) said expandable/contractible member nose end being associated with said flexible member heel end; and (d) said flexible member nose end being associated with at least one of said universal joint link or grapple link.

23. The grapple-heel rack of claim 22, further comprising a pulley associated with at least one of said first and second side rails, said flexible member runs forward and backward over said pulley.

24. The grapple-heel rack of claim 21, said mechanical grapple return system associated at a first end to one of said grapple and said universal joint, and associated at a second end to said frame.

25. The grapple-heel rack of claim 21, said universal joint further comprising a first pivot, a second pivot, and a rotating socket.

* * * * *